United States Patent
Chandler

(10) Patent No.: US 7,383,128 B2
(45) Date of Patent: Jun. 3, 2008

(54) IMPLEMENTING TWO DIMENSIONAL SEGMENT INVERSIONS WITH INVERSION-CONFORMING DATA SETS PROCESSING BEING RENDERED TO INCLUDE GENERALIZED COMPOSITE WEIGHT FACTORS IN THE PROCESSING OF ERROR-AFFECTED MULTIVARIATE DATA SAMPLES

(76) Inventor: Larry S. Chandler, 1738 Anderson Rd., Falls Church, VA (US) 22043

( * ) Notice: Subject to any disclaimer, the term of this patent is extended or adjusted under 35 U.S.C. 154(b) by 139 days.

(21) Appl. No.: 11/266,224

(22) Filed: Nov. 4, 2005

(65) Prior Publication Data

US 2006/0111844 A1    May 25, 2006

Related U.S. Application Data

(60) Provisional application No. 60/626,856, filed on Nov. 12, 2004.

(51) Int. Cl.
 *G01V 7/00* (2006.01)
 *G01N 31/00* (2006.01)
(52) U.S. Cl. ............................... 702/1; 702/25
(58) Field of Classification Search ............ 702/1–18, 702/25
 See application file for complete search history.

(56) References Cited

U.S. PATENT DOCUMENTS

| | | | | |
|---|---|---|---|---|
| 5,083,283 | A | * | 1/1992 | Imai et al. ................... 702/25 |
| 5,568,400 | A | * | 10/1996 | Stark et al. ................... 702/85 |
| 5,619,432 | A | | 4/1997 | Chandler |
| 5,652,713 | A | | 7/1997 | Chandler |
| 5,884,245 | A | | 3/1999 | Chandler |
| 5,982,943 | A | * | 11/1999 | Hsu et al. ................... 382/270 |
| 6,181,976 | B1 | | 1/2001 | Chandler |
| 7,107,048 | B2 | | 9/2006 | Chandler |

OTHER PUBLICATIONS

Thompson, W. J. et al., "Correcting Parameter Bias Caused by Taking Logs of Exponential Data", American Journal of Physics, Sep. 1991, vol. 59, No. 9, pp. 854-856.

Clutton-Brock, M., "Likelihood Distributions for Estimating Functions When Both Variables are Subject to Error", Technometrics, May 1967, vol. 9, No. 2, pp. 261-269.

(Continued)

*Primary Examiner*—John Barlow
*Assistant Examiner*—Victor J. Taylor
(74) *Attorney, Agent, or Firm*—Crowell & Moring LLP

(57) ABSTRACT

Representations of data inversions are generated by alternate forms of maximum likelihood estimating and associated least-squares and regression analysis which are rendered in correspondence with either single component residual deviations or projections between data samples and inversion-conforming data sets. Deficiencies in representing likelihood as related to errors-in-variables data and heterogeneous precision are compensated by composite weighting of likelihood elements. Composite weight factors employ both normalization to establish non-skewed homogeneous likelihood elements and fundamental weighting to compensate for associated non-linearly and establish common units for combining orthogonal coordinate-oriented data-point projections. Respective weight factors are related to alternately considered fundamental variables. Variance or alternate representation, as related to statistically independent sampling, is utilized as assumed applicable or replaced by composite variability representing single coordinate variations as affected by orthogonal coordinate sampling dispersions. Statistical rendition is generated as a replacement for unquantifiable dependent variable representation.

21 Claims, 28 Drawing Sheets

DATA-POINT PROJECTIONS AND RESPECTIVE INVERSION-CONFORMING DATA SETS

OTHER PUBLICATIONS

Fisher, R. A., "On the Mathematical Foundations of Theoretical Statistics", Royal Society of London, Apr. 1922, vol. 222, pp. 309-368.

York, D., "Least-Squares Fitting of a Straight Line", Canadian Journal of Physics, 1966, vol. 44, pp. 1079-1086.

ISBN 0-521-43064-X, Chapter 15. "Modeling of Data", Numerical Recipes in Fortran 77: The Art of Scientific Computing, Cambridge University Press, New York, copyright 1986-1992, pp. 650-700.

Smyth, G. K., Review of "Exponential Family Nonlinear Models" Bo-Cheng Wei, Austral J. Statist, vol. 42, pp. 500.

Lybanon, M., Comment on "Least Squares When Both Variables Have Uncertainties", American Journal Of Physics, Mar. 1984, vol. 52, No. 3, pp. 276-278.

Press, W. et al., Chapter 14. "Modeling of Data", Numerical Recipes—The Art of Scientific Computing, Cambridge University Press, New York, pp. 498-528.

Deming, W. E., Ph.D., "Statistical Adjustment of Data", John Wiley & Sons, Inc., New York, copyright, 1938, 1943, pp. 22-23 and 130-145.

Barker, D. R. et al., "Simple Method for Fitting Data When Both Variables Have Uncertainties", AJP, Mar. 1974, pp. 224-227.

Orear, J., "Least Squares When Both Variables Have Uncertainties", American Journal of Physics, Oct. 1982, vol. 50, No. 10, pp. 912-916.

Neri, F. et al., "Error-Affected Experimental Data Analysis: Application to Fitting Procedures", Meas. Sci. Technol., 1990, vol. 1, pp. 1007-1010.

Jefferys, W. H., "On The Method Of Least Squares", The Astronomical Journal, Feb. 1980, vol. 85, No. 2, pp. 177-181.

Jefferys, W. H., "On The Method Of Least Squares. II", The Astronomical Journal, Jan. 1981, vol. 86, No. 1, pp. 149-155.

Press, W. H. et al., "Fitting Straight Line Data with Errors in Both Coordinates", Computers in Physics, May/Jun. 1992, vol. 6, No. 3, pp. 274-276.

Picot, A, "Pocket calculator program for least-square fitting of data with variable precision", Am. J. Phys., Apr. 1980, vol. 48, No. 4, pp. 302-303.

Squire, P. T., "Comment on 'Linear least-squares fits with errors in both coordinates', by B. C. Reed [Am. J. Phys. 57, 642-646 (1989)]", Am. J. Phys., Dec. 1990, vol. 58, No. 12, pp. 1209.

Ross, A. W., "Regression line analysis", Am. J. Phys., May 1980, vol. 48, No. 5, pp. 409.

Macdonald, J. R., "Comment on 'Simple method for fitting data when both variables have uncertainties'", American Journal of Physics, Apr. 1975, vol. 43, No. 4, pp. 372-374.

Macdonald, J. R. et al., "Least-squares fitting when both variables contain errors: Pitfalls and possibilities", Am. J. Phys., Jan. 1992, vol. 60, No. 1, pp. 66-72.

Reed, B. C., "Linear least-squares fits with errors in both coordinates. II: Comments on parameter variances", Am. J. Phys., Jan. 1992, vol. 60, No. 1, pp. 59-62.

Lybanon, M., "A better least-squares method when both variables have uncertainties", Am. J. Phys., Jan. 1984, vol. 52, No. 1, pp. 22-26.

Reed, B. C., "Linear least-squares fits with errors in both coordinates", Am. J. Phys., Jul. 1989, vol. 57, No. 7, pp. 642-646.

Neri, F. et al., "An accurate and straightforward approach to line regression analysis of error-affected experimental data", Journal of Physics, 1989, vol. 22, pp. 215-217.

Hull Jr., M. H., "Least-squares method", Encyclopedia of Science, New York, pp. 648-649.

Scharf, L., "Total Least Squares", Addison-Wesley, New York, 1991, pp. 495-496.

Coy, P., "Shades of Isaac Newton?", Science & Technology; Mathematics; No. 3452, pp. 110.

Kyriakides, K. et al., "Adaptive Fuzzy Dominant-Pole Placement Control", Proceedings of the 31st Conference on Decision and Control, Dec. 1992, Tucson, Arizona, pp. 2517-2522.

Tzes, A. et al., "Adaptive Fuzzy-Control for Flexible-Link Manipulators: a Hybrid Frequency-Time Domain Scheme", 1993, pp. 122-127.

Bo, L. et al., "An Inverse-Devlation Threshold Approach in Neural Network Controllers", 1997 IEEE International Conference on Intelligent Processing Systems, Oct. 28-31, Beijing, China, pp. 407-409.

Nagy, G., "Neural Networks—Then and Now", IEEE Transactions on Neural Networks, Mar. 1991, vol. 2, No. 2, pp. 316-318.

El-Masry, E. I. et al., Analog VLSI Current Mode Implementation of Artificial Neural Networks, copyright 1993 IEEE, pp. 1275-1278.

* cited by examiner

AN EXAMPLE OF QBASIC CODE FOR RENDERING LINEARIZED REGRESSION ANALYSIS TO INCLUDE COMPOSITE WEIGHT FACTORS

```
DIM X#(4), Y#(4), CW#(4), SDV#(4)
DIM CWLNX#(4), CWLNX2#(4), CWLNY#(4), CWLNYLNX#(4)
DATA 1#,1#,5#,10#
DATA 1#,1#,1#,1#
READ X#(1), X#(2), X#(3), X#(4) 'READ INDEPENDENT VARIABLE VALUES.
READ SDV#(1), SDV#(2), SDV#(3), SDV#(4) 'READ STANDARD DEVIATION.
FOR I% = 1 TO 4
Y#(I%) = 2# * X#(I%) ^ 6   'SET DEPENDENT VARIABLE VALUES.
NEXT
Y#(1) = Y#(1) - 1 'ADD SIMULATED ERROR TO FIRST TWO DATA POINTS.
Y#(2) = Y#(2) + 1
FOR OVER% = 1 TO 4 'PREPARE FOR THREE ITERATIONS.
SCW# = 0          'SET THE SUM OF THE COMPOSITE WEIGHT FACTOR TO ZERO
SCWLNX# = 0       'Set THE WEIGHTED SUM OF LNX# TIMES LNY# TO ZERO.
SCWLNX2# = 0      'Set THE WEIGHTED SUM OF X#*Y#*LNX#^2 TO ZERO.
SCWLNY# = 0       'Set THE WEIGHTED SUM OF X#*Y#*LNY# TO ZERO.
SCWLNYLNX# = 0 'Set THE WEIGHTED SUM OF X#*Y#*LNX#*LNY# TO ZERO.
FOR I% = 1 TO 4
IF OVER% = 1 THEN ' TEMPORARILY SET WEIGHT FACTOR TO GENERATE
CW#(I%) = 1#      '    INITIAL PARAMETER ESTIMATES.
ELSE 'GENERATE SUCCESSIVE COMPOSITE WEIGHT FACTOR APPROXIMATIONS.
CW#(I%) = LOG(Y#(I%)) - E# * LOG(X#(I%)) - LOG(A#)
CW#(I%) = (Y#(I%) - A# * X#(I%) ^ E#) / CW#(I%) / E# / SDV#(I%)
END IF
SCW# = SCW# + CW#(I%)        'PREPARE ELEMENTS FOR MATRIX EQUATION.
CWLNX#(I%) = CW#(I%) * LOG(X#(I%))
SCWLNX# = SCWLNX# + CWLNX#(I%)
CWLNX2#(I%) = CW#(I%) * LOG(X#(I%)) ^ 2
SCWLNX2# = SCWLNX2# + CWLNX2#(I%)
CWLNY#(I%) = CW#(I%) * LOG(Y#(I%))
SCWLNY# = SCWLNY# + CWLNY#(I%)
CWLNYLNX#(I%) = CW#(I%) * LOG(Y#(I%)) * LOG(X#(I%))
SCWLNYLNX# = SCWLNYLNX# + CWLNYLNX#(I%)
NEXT
DEN# = SCWLNX# ^ 2 - SCW# * SCWLNX2#   'SOLVE MATRIX EQUATIONS.
E# = (SCWLNY# * SCWLNX# - SCW# * SCWLNYLNX#) / DEN#
LNA# = (SCWLNX# * SCWLNYLNX# - SCWLNX2# * SCWLNY#) / DEN#
A# = EXP(LNA#)
PRINT "A#="; A#, "E#="; E#
NEXT
END
```

FIG. 2

**AN EXAMPLE OF QBASIC CODE FOR ILLUSTRATING ICDS
MAXIMUM LIKELIHOOD ERRORS-IN-VARIABLES LINE LSC
INVERSIONS AS RENDERED TO INCLUDE
COMPOSITE WEIGHT FACTOR PROPORTIONS**

```
DIM X#(8), Y#(8), XV#(8), YV#(8)
DATA .5,.5,1.5,1.5,2.5,2.5,3.5,3.5,2,4,2,4,6,8,6,8,0,0
DATA .5,.5,.5,.5,.5,.5,.5,.5,1,1,1,1,1,1,1,1
READ X#(1), X#(2), X#(3), X#(4), X#(5), X#(6), X#(7), X#(8)
READ Y#(1), Y#(2), Y#(3), Y#(4), Y#(5), Y#(6), Y#(7), Y#(8), A#, B#
READ XV#(1), XV#(2), XV#(3), XV#(4), XV#(5), XV#(6), XV#(7), XV#(8)
READ YV#(1), YV#(2), YV#(3), YV#(4), YV#(5), YV#(6), YV#(7), YV#(8)
FOR ITERAT% = 1 TO 10            'PREPARE FOR ITERATIONS
SX# = 0#                 'Set THE WEIGHTED X# PROPORTION SUM TO ZERO.
SY# = 0#                 'Set THE WEIGHTED Y# PROPORTION SUM TO ZERO.
SXX# = 0#                'Set THE WEIGHTED X#^2 PROPORTION SUM TO ZERO.
SXY# = 0#                'Set THE WEIGHTED X#Y# PROPORTION SUM TO ZERO.
SCW# = 0#             'SET THE SUM OF WEIGHT FACTOR PROPORTION TO ZERO.
FOR K% = 1 TO 8                  'CYCLE THROUGH DATA POINTS
YB# = 0#                         'PREPARE TO GENERATE INITIAL ESTIMATES.
WP# = ABS(1# / SQR(XV#(K%) * YV#(K%)))
IF A# <> 0 THEN
YB# = (Y#(K%) - B#) / A#      'PREPARE TO GENERATE MATRIX ELEMENTS.
WP# = ABS(WP# / A#)  'GENERATE COMPOSITE WEIGHT FACTOR PROPORTION.
END IF
SX# = SX# + WP# * (X#(K%) + YB#)          'GENERATE MATRIX ELEMENTS.
SXX# = SXX# + WP# * (X#(K%) ^ 2 + YB# ^ 2)
SXY# = SXY# + WP# * (Y#(K%) - A# * X#(K%) - B#) * (X#(K%) + YB#)
IF A# = 0 THEN WP# = WP# / 2#
SY# = SY# + 2# * WP# * (Y#(K%) - A# * X#(K%) - B#)
SCW# = SCW# + 2# * WP#
NEXT
DEN# = SXX# * SCW# - SX# * SX#               'SOLVE MATRIX EQUATIONS.
DA# = (SXY# * SCW# - SY# * SX#) / DEN#
DB# = (SXX# * SY# - SX# * SXY#) / DEN#
A# = A# + DA#                                'ADD CORRECTIONS TO DATA.
B# = B# + DB#                                'PRINT ITERATION RESULTS.
PRINT "CORRECTIONS TO A"; DA#; "TO B"; DB#
PRINT "         A#="; A#, "B#="; B#
NEXT             'REPEAT CONSECUTIVE ITERATIONS.
END
```

FIG. 4

AN EXAMPLE OF QBASIC CODE FOR QUANTIFYING DEPENDENT OBSERVATIONS

```
'THIS QBASIC PROGRAM IS REFERRED TO BY THE NAME "QUANTIFY". IT'S
'FUNCTION IS TO ESTABLISH DISPLACED RELATIVE FUNCTION DISCRIPTION
'FOR UNQUANTIFIABLE PHENOMENON.  COPYRIGHT 2005, LARRY S. CHANDLER
COMMON X#(), SEQ#(), NS%(), S%(), E%(), N%(), ED#()
COMMON NPTS%, NIV%, MP%(), SP!(), RTIME%, NOWT%
COMMON DA&(), MNCV#(), CVDV#(), CVQD#(), ICDSP$
' X# ARE THE DATA SAMPLES FOR THE INDEPENDIENT VARIABLES.
' SEQ#(1) ARE THE SEQUENCED INDEPENDENT VARIABLE DATA SAMPLES.
' NS% ARE THE NUMBER OF SEGMENTS FOR EACH INDEPENDENT VARIABLE.
' S% ARE THE SEQUENCED DATA START OF SEGMENT LOCATIONS.
' E% ARE THE SEQUENCED DATA END OF SEGMENT LOCATIONS.
' N% ARE THE DATA ORDER MEMORIES.
' NPTS% IS THE NUMBER OF DATA POINTS.
' NIV% IS THE NUMBER OF INDEPENDENT VARIABLES.
' MP% IS THE MINIMUM NUMBER OF POINTS PER SEGMENT.
' SP! IS THE ACCEPTABLE DATA SPREAD FOR ASSUMED CONSTANT X#.
' DA& IS A DIGITAL ARRAY WITH DIGITS DESIGNATING ASSUMED CONSTANT
'  VALUES BEING PLACED IN INDEPENDENT VARIABLE COLUMNS.
' MNCV# ARE MEAN VALUES FOR CONSTANT VARIABLE ESTIMATE.
' CVDV# ARE RMS DEVIATIONS OF CONSTANT VARIABLE ESTIMATES.
' Q# REPRESENTS RELATIVE DISPLACED DEPENDENT VARIABLE VALUES.
' CVQD# ARE RELATIVE DEVIATIONS IN Q# RESULTING FROM DEVIATIONS OF
'  ORTHOGONAL VARIABLES VARIABLE.
' NPT% IS THE NUMBER OF SELECTED SEGMENT DATA POINTS.
REDIM Q#(20), V#(20) 'SET TEMPORARY ARRAY LOCATIONS
CLS
PRINT
INPUT "DESIGATE THE TOTAL NUMBER OF DATA POINTS: 30 TO 1500"; NPTS%
INPUT "DESIGNATE THE NUMBER OF INDEPENDENT VARIABLES: 1 OR 2"; NIV%
PRINT "ENTER A NEGATIVE INTEGER FOR A RANDOM GENERATOR BASE."
INPUT "ENTER ZERO FOR NOT RANDOM, OR SET A POSITIVE  BASE."; RTIME%
   CALL PREP
   FOR VV% = 1 TO NIV%
     FOR SNO% = 1 TO NS%(VV%)
       NPT% = E%(VV%, SNO%) - S%(VV%, SNO%) + 1
       REDIM Q#(NPT%), V#(NPT%)
       CALL QUANTIFY(VV%, SNO%, NPT%, V#(), Q#())
       CLS
       A# = 2    'PRESET REASONABLE INITIAL ESTIMATES FOR A# AND E#.
       E# = 2.5
       PRINT "VARIABLE"; VV%; "SEGMENT"; SNO%
       CALL PROCESS(NPT%, V#(), Q#(), VV%, SNO%, A#, B#, E#, FLG%)
     NEXT
   NEXT
END
```

FIG. 16

AN EXAMPLE OF QBASIC CODE TO PREPARE INDEPENDENT OBSERVATION SAMPLES FOR QUANTIFYING DEPENDENT OBSERVATIONS

```
SUB PREP
'THE SUBROUTINE PREP IS PROVIDED TO SUPPORT MULTIVARIATE PROCESSING
' WHICH IS ASSOCIATED WITH UNQUANTIFIABLE DEPENDENT VARIABLE
' OBSERVATIONS. IT INCLUDES A CALL TO THE SUBROUTINE DESIGNATE
' TO RETRIEVE OR ESTABLISH INDEPENDENT VARIABLE DATA AND PROVIDE
' RELATED DESCRIPTIVE PARAMETERS, SUCH AS THE NUMBER OF INDEPENDENT
' VARIABLES AND THE NUMBER OF DATA SAMPLES THE SUBROUTINE DESIGNATE
' ALSO ARRANGES AND SORTS THE SAMPLES TO DESTINGUISH DATA WHICH
' MIGHT ESTABLISH TWO DIMENSIONAL FUNCTION SEGMENT INVERSIONS.
'                                   COPYRIGHT 2005, LARRY S. CHANDLER.
SHARED X#(), SEQ#(), NS%(), S%(), E%(), N%(), ED#()
SHARED NPTS%, NIV%, MP%(), SP!()
SHARED DA&(), MNCV#(), CVDV#(), CVQD#()
PRINT "WAIT"
CALL DESIGNATE
DIM MNCV#(NIV%, 9), CVDV#(NIV%, 9), CVQD#(NIV%, 9)
IF NIV% = 1 THEN          'SKIP MULTIVARIATE SEGMENTING
ELSE                      ' FOR BIVARIATE APPLICATIONS.
DIM DA&(NIV%, NPTS%)
CALL ALLSEG              'PROVIDE MULTIVARIATE REPRESENTATION
FOR I% = 1 TO NIV%       ' FOR FURTHER DATA SEQUENCING.
  FOR J% = 1 TO NPTS%
    N%(I%, J%) = J%  'INITIATE CONSTANT DATA REPRESENTATION MEMORY.
    SEQ#(I%, J%) = DA&(I%, J%)            'STORE DA& DIGIT DATA.
  NEXT
  CALL SEQUENCE(I%, 1, NPTS%, SEQ#(), N%()) 'SEQUENCE DIGIT DATA.
  CALL SEGMENT(2, I%, 0, 3)        'SEGMENT SEQUENTIAL DA& DATA.
NEXT
END IF
END SUB
```

FIG. 17

AN EXAMPLE OF QBASIC CODE FOR SEGMENTING INDEPENDENT OBSERVATIONS

```
SUB DESIGNATE
'DESIGNATE IS AN EXAMPLE OF A QBASIC SUBROUTINE ROUTINE DESIGNED
' TO DESIGNATE TWO DIMENSIONAL DATA SEGMENTS OF SIMULATED
' MULTIDIMENSIONAL DATA TO PROVIDE AN EXAMPLE OF PROCESSING
' DATA IN THE ABSENCE OF DEPENDENT VARIABLE MEASURMENTS.
'                                      COPYRIGHT 2005 LARRY S. CHANDLER
SHARED X#(), SEQ#(), NS%(), S%(), E%(), N%(), ED#()
' X# ARE THE DATA SAMPLES FOR THE INDEPENDIENT VARIABLES
' SEQ# ARE THE SEQUENCED INDEPENDENT VARIABLE DATA SAMPLES
' NS% ARE THE NUMBER OF SEGMENTS FOR EACH INDEPENDENT VARIABLE.
' S% ARE THE SEQUENCED DATA START OF SEGMENT LOCATIONS.
' E% ARE THE SEQUENCED DATA END OF SEGMENT LOCATIONS.
' N% ARE THE DATA ORDER MEMORIES.
'SET OPTIONAL SETTINGS FOR SEGMENTING DATA:
SHARED NPTS%, NIV%, MP%(), SP!()
'SET OPTIONAL SETTINGS FOR SEGMENTING DATA:
REDIM X!(NIV%, NPTS%), SEQ#(NIV%, NPTS%), NS%(NIV%), MP%(NIV% + 1)
MP%(1) = 5  'SET THE MINIMUM NUMBER OF POINTS PER SEGMENT 1.
MP%(2) = 8  'SET THE MINIMUM NUMBER OF POINTS PER SEGMENT 2.
DIM S%(NIV%, NPTS% / MP%(NIV%)), E%(NIV%, NPTS% / MP%(NIV%))
DIM N%(NIV%, NPTS%), ED#(NIV%, NPTS% / MP%(NIV%)), SP!(NIV% + 1)
SP!(1) = .0075'.02    'SET ACCEPTABLE DATA SPREAD FOR
SP!(2) = .002'.005    ' ASSUMED CONSTANT X#.
IF NIV% = 1 THEN
  CALL SIM2D(NPTS%, X#())  'SIMULATE DATA FOR USE WITH THIS EXAMPLE.
ELSE
  CALL SIM3D(NPTS%, X#())  'SIMULATE DATA FOR USE WITH THIS EXAMPLE.
END IF
FOR I% = 1 TO NIV%
FOR J% = 1 TO NPTS%
N%(I%, J%) = J%              'INITIATE DATA SAMPLE LOCATION MEMORY.
SEQ#(I%, J%) = X#(I%, J%)  'SEQUENCE DATA TO DISTINGUISH ASSUMED
NEXT                         ' REGIONS OF CONSTANT SAMPLE VALUES.
CALL SEQUENCE(I%, 1, NPTS%, SEQ#(), N%())      'SEQUENCE ARRAY X1#.
MIN% = MP%(I%)
SPREAD! = SP!(I%)
IF NIV% = 1 THEN
  REDIM S%(1, 1), E%(1, 1), NS%(1)
  S%(1, 1) = 1
  E%(1, 1) = NPTS%
  NS%(1) = 1
ELSE
  CALL SEGMENT(0, I%, SPREAD!, MIN%)
END IF
NEXT
PRINT "PRESS ANY KEY TO CONTINUE"
END SUB
```

FIG. 18

AN EXAMPLE OF QBASIC CODE TO PREPARE SIMULATED INDEPENDENT OBSERVATION SAMPLES FOR TWO DIMENSIONAL APPLICATION

```
SUB SIM2D (NPTS%, XX#())  '(SIMULATION FOR ONE INDEPENDENT VARIABLE)
'SIM IS A QBASIC SUBROUTINE WHICH MAY BE IMPLEMENTED TO SIMULATE
'SAMPLE UNQUANTIFIABLE DEPENDENT VARIABLE DATA OF THE FORM.
'Y=P0+P2*X1^P.                    COPYRIGHT 2005 LARRY S. CHANDLER
SHARED RTIME%
IF RTIME% < 0 THEN RTIME% = INT(TIMER / 10)
                    'SET RTIME%=0 FOR NON-RANDOM OBSERVATIONS.
RANDOMIZE RTIME%         'PREPARE TO PROVIDE RANDOM SAMPLING.
REDIM X!(2, NPTS%), Y!(NPTS%), P!(5), XX#(2, NPTS%)
P!(0) = 4!    'PROVIDE ADJUSTMENT PARAMETERS FOR SIMULATING
'              ' INDEPENDENT VARIABLE DATA FOR A FUNCITON OF
P!(2) = 3!    ' THE FORM   Y=P0+P2*X1^P4
'              ' WHERE Y IS ASSUMED TO BE AN UNQUANTIFIABLE
P!(4) = 3!    ' DEPENDENT VARIABLE.
FOR I% = 1 TO NPTS%
J% = J% + 1
Y!(I%) = RND * 800 + 4'SIMULATE RANDOM OBSERVATIONS OVER A
IF RTIME% = 0 THEN    ' DEPENDENT VARIABLE RANGE BETWEEN 4 AND 804.
 Y!(I%) = I% * 800! / NPTS% + 4  'SIMULATE NON-RANDOM OBSERVATIONS.
END IF
NEXT
FOR I% = 1 TO NPTS%    'COMPUTE VALUES FOR THE DEPENDENT VARIABLE.
  X!(1, I%) = ((Y!(I%) - P!(0)) / P!(2)) ^ (1! / P!(4))
  XX#(1, I%) = X!(1, I%)
NEXT
END SUB
```

FIG. 19

AN EXAMPLE OF QBASIC CODE TO PREPARE SIMULATED INDEPENDENT OBSERVATION SAMPLES FOR THREE DIMENSIONAL APPLICATION

```
SUB SIM3D (NPTS%, X#())   '(SIMULATION FOR TWO INDEPENDENT VARIABLES)
'SIM IS A QBASIC SUBROUTINE WHICH MAY BE IMPLEMENTED TO sIMULATE
'SAMPLE UNQUANTIFIABLE DEPENDENT VARIABLE DATA OF THE FORM.
SHARED RTIME%  'UNPUBLISHED WORK COPYRIGHT 2005 LARRY S. CHANDLER.
IF RTIME% < 0 THEN RTIME% = INT(TIMER / 10)
RANDOMIZE RTIME%           'PREPARE TO PROVIDE RANDOM SAMPLING.
REDIM X#(2, NPTS%), Y#(NPTS%), P#(5)
P#(0) = 4#      'PROVIDE ADJUSTMENT PARAMETERS FOR SIMULATING
P#(1) = 2#      ' INDEPENDENT VARIABLE DATA FOR A FUNCITON OF
P#(2) = 3#      ' THE FORM    Y=P0+P1*X1^P3+P2*X2^P4,
P#(3) = 2#      ' WHERE Y IS ASSUMED TO BE AN UNQUANTIFIABLE
P#(4) = 3#      ' DEPENDENT VARIABLE.
IF RTIME% = 0 THEN PRINT "0 OPTION NOT AVAILABLE MORE THAN 2-DIM."
FOR I% = 1 TO NPTS%              'SIMULATED RANDOM OBSERVATIONS
Y#(I%) = RND * 1440 + 1930       ' BETWEEN Y=1930 AND Y=3370.
NEXT
FOR I% = 1 TO NPTS% / 2   'RANDOMIZE X1 BETWEEN X1=11 AND X1=29.
  X#(1, I%) = RND * 18 + 11
  PROOT# = Y#(I%) - P#(0) - P#(1) * X#(1, I%) ^ P#(3)'INITIALIZE
  IF PROOT# / P#(2) < 0 THEN                         ' EVALUATION.
    PROOT# = OFL#
    I% = I% - 1      'REPLACE IMAGINARY ROOTS WITH REAL ONES.
    ELSE             'EVALUATE X2 FOR RANDOM VALUES OF Y AND X1.
    X#(2, I%) = (PROOT# / P#(2)) ^ (1# / P#(4))
  END IF
NEXT
FOR I% = NPTS% / 2 + 1 TO NPTS%          'RANDOMIZE X2 BETWEEN
  X#(2, I%) = RND * 4.4 + 6               ' X1=6 AND X1=10.4
  PROOT# = Y#(I%) - P#(0) - P#(2) * X#(2, I%) ^ P#(4)
  IF PROOT# / P#(1) < 0 THEN
    PROOT# = OFL#
    I% = I% - 1      'REPLACE IMAGINARY ROOTS WITH REAL ONES.
    ELSE             'EVALUATE X2 FOR RANDOM VALUES OF Y AND X1.
    X#(1, I%) = (PROOT# / P#(1)) ^ (1# / P#(3))
  END IF
NEXT
chknext% = 23
FOR J% = 1 TO NPTS%
  PROOT# = P#(1) * X#(1, J%) ^ P#(3) + P#(0)
  PROOT# = PROOT# + P#(2) * X#(2, J%) ^ P#(4)
  IF chknext% = I% THEN
    chknext% = chknext% + 23
  END IF
NEXT
END SUB
```

FIG. 20

AN EXAMPLE OF QBASIC CODE FOR SEQUENCING NUMERICAL REPRESENTATIONS

```
SUB SEQUENCE (NV%, STRPNT%, ENDPNT%, SEQ#(), ORIG%())
'SEQUENCE IS A SUBROUTINE FOR INDEPENDENTLY ARRANGING COMPONENTS
' OF THE INPUT VARIBLE SEQ# IN SEQUENTIAL ORDER. LOCATION OF THE
' ORIGINAL SEQUENCE IS MAINTAINED IN THE ARRAY, ORIG%.
'                                    COPYRIGHT 2005, LARRY S. CHANDLER
'INPUT: NV% IS THE NUMBER OF INDEPENDENT VARIABLES.
'       STRPNT% IS THE START POINT.
'       ENDPNT% IS THE END POINT.
'INPUT/OUTPUT: SEQ# IS THE ARRAY OF DATA TO BE ARRANGED.
'OUTPUT: ORIG% CONTAINING THE ORIGINAL DATUM LOCATIONS.
FOR I% = STRPNT% TO ENDPNT%
ORIG%(NV%, I%) = I%
NEXT
FOR I% = STRPNT% + 1 TO ENDPNT%
  IF SEQ#(NV%, I%) < SEQ#(NV%, I% - 1) THEN
    Sav# = SEQ#(NV%, I%)
    SAVO% = ORIG%(NV%, I%)
    SEQ#(NV%, I%) = SEQ#(NV%, I% - 1)
    ORIG%(NV%, I%) = ORIG%(NV%, I% - 1)
    FOR J% = I% - 1 TO 1 STEP -1
      SEQ#(NV%, J%) = Sav#
      ORIG%(NV%, J%) = SAVO%
      IF SEQ#(NV%, J%) < SEQ#(NV%, J% - 1) THEN
        Sav# = SEQ#(NV%, J%)
        SAVO% = ORIG%(NV%, J%)
        SEQ#(NV%, J%) = SEQ#(NV%, J% - 1)
        ORIG%(NV%, J%) = ORIG%(NV%, J% - 1)
      ELSE
      J% = 0
      END IF
    NEXT
  END IF
NEXT
END SUB
```

FIG. 21

AN EXAMPLE OF QBASIC CODE FOR DISTINGUISHING CONSTANT VARIABLE SEGMENTS

```
SUB SEGMENT (OPT%, CV%, SP!, MPS%)
'SEGMENT IS AN EXAMPLE OF A QBASIC SUBROUTINE DESIGNED
' TO DISTINGUISH CONSTANT VARIABLE SEGMENTS WITHIN AN ORDERED
' SEQUENCE.                       COPYRIGHT 2005, LARRY S. CHANDLER
SHARED SEQ#(), N%(), NPTS%                'SHARED INPUT
SHARED NS%(), S%(), E%(), ED#()           'SHARED OUTPUT
' SEQ# ARE THE SEQUENCED ASSUMED DATA SAMPLES.
' NS% ARE THE NUMBER OF SEGMENTS OF ASSUMED CONSTANT SAMPLES.
' S% ARE THE SEQUENCED DATA START OF SEGMENT LOCATIONS.
' E% ARE THE SEQUENCED DATA END OF SEGMENT LOCATIONS.
' N% ARE THE DATA ORDER MEMORIES.
' NPTS% IS THE NUMBER OF DATA POINTS.
' OPT% OPTION SET TO ZERO WILL EXCLUDE ZERO VALUES.
' CV% DESIGNATES THE VARIABLE TO BE CONSIDERED HELD AS CONSTANT.
' MPS% IS THE MINIMUM NUMBER OF POINTS PER SEGMENT.
' SP! IS THE ACCEPTABLE DATA SPREAD FOR ASSUMED CONSTANT SAMPLES.
       chknext% = 22
NSTART% = 1    'INITIALIZE START OF SEGMENT LOCATION.
NEND% = 1      'INITIALIZE END OF SEGMENT LOCATION.
NSETS% = 1     'INITIALIZE COUNT OF NUMBER OF SEGMENTS.
FOR I% = 2 TO NPTS%
 dif# = SEQ#(CV%, I%) - SEQ#(CV%, I% - 1)
 IF ABS(dif#) <= SP! AND (SEQ#(CV%, I%) <> 0 OR OPT% = 0) THEN
  NEND% = NEND% + 1
  IF NEND% - NSTART% > MPS% - 2 AND I% = NPTS% THEN
   S%(CV%, NSETS%) = NSTART%
   E%(CV%, NSETS%) = NEND%
   NS%(CV%) = NSETS%
   PRINT "VARIABLE SET CONSTANT:"; CV%; "SEGMENT"; NSETS%
  END IF
 ELSE
  IF NEND% - NSTART% > MPS% - 2 THEN
   S%(CV%, NSETS%) = NSTART%
   E%(CV%, NSETS%) = NEND%
   NS%(CV%) = NSETS%
   PRINT "VARIABLE SET CONSTANT:"; CV%; "SEGMENT"; NSETS%
   IF I% <> NPTS% THEN NSETS% = NSETS% + 1
  END IF
  NEND% = I%
  NSTART% = I% + 1
 END IF
NEXT
PRINT "CONTINUE WAITING"
END SUB
```

FIG. 22

AN EXAMPLE OF QBASIC CODE TO PREPARE FOR SEQUENCING MULTIVARIATE SEGMENTS

```
SUB ALLSEG
'DA& IS A DIGITAL ARRAY WITH DIGITS DESIGNATING ASSUMED CONSTANT
' VALUES BEING PLACED IN INDEPENDENT VARIABLE COLUMNS. ONLY A
' MAXIMUM OF NINE SEGMENTS PER INDEPENDENT VARIABLE IS PROVIDED
' FOR IN THIS EXEMPLARY SOFTWARE.     COPYRIGHT 2005, L.S.CHANDLER
SHARED SEQ#(), N%(), NPTS%, NS%(), S%(), E%(), NIV%    'SHARED INPUT
SHARED DA&(), CVDV#(), CVQD#(), MNCV#()                'SHARED OUTPUT
' SEQ# ARE THE SEQUENCED INDEPENDENT VARIABLE DATA SAMPLES
' NS% ARE THE NUMBER OF SEGMENTS FOR EACH INDEPENDENT VARIABLE.
' S% ARE THE SEQUENCED DATA START OF SEGMENT LOCATIONS.
' E% ARE THE SEQUENCED DATA END OF SEGMENT LOCATIONS.
' N% ARE THE DATA ORDER MEMORIES.
' NPTS% IS THE NUMBER OF DATA POINTS.
' NIV% IS THE NUMBER OF INDEPENDENT VARIABLES.
FOR VV% = 1 TO NIV%
  FOR CV% = 1 TO NIV%            'CYCLE THROUGH INDEPENDENT VARIABLES.
    IF CV% <> VV% THEN
      DIV% = 10
      IF CV% > VV% THEN DIV% = 100
      FOR SNO% = 1 TO NS%(CV%)   'CYCLE THROUGH CONSTANT SEGMENTS.
        IF SNO% > 9 THEN
         STOP'NOTE!!! MODIFY SOFTWARE FOR MORE THAN 9; OR PRESS F5.
        ELSE          '(TO CONTINUE WITHOUT MODIFICATIONS, PRESS F5.)
          FOR I% = S%(CV%, SNO%) TO E%(CV%, SNO%)
            CHK% = 10 ^ CV% - DIV%
            IF CHK% = 0 OR DA&(VV%, N%(CV%, I%)) <> 0 THEN
              DATACODE& = SNO% * 10 ^ CV% / DIV%
              DA&(VV%, N%(CV%, I%)) = DA&(VV%, N%(CV%, I%)) + DATACODE&
              IF DA&(VV%, N%(CV%, I%)) = 17 THEN STOP
            END IF
            MNCV#(CV%, SNO%) = MNCV#(CV%, SNO%) + SEQ#(CV%, I%)
          NEXT
          NPT% = (E%(CV%, SNO%) - S%(CV%, SNO%) + 1)
          MNCV#(CV%, SNO%) = MNCV#(CV%, SNO%) / NPT%
          SPAN# = SEQ#(CV%, E%(CV%, SNO%)) - SEQ#(CV%, S%(CV%, SNO%))
          FOR I% = S%(CV%, SNO%) TO E%(CV%, SNO%)
            DSQR# = (SEQ#(CV%, I%) - MNCV#(CV%, SNO%)) ^ 2
            CVDV#(CV%, SNO%) = CVDV#(CV%, SNO%) + DSQR#
          NEXT
          CVDV#(CV%, SNO%) = SQR(CVDV#(CV%, SNO%) / NPT%)
        END IF
      NEXT
    END IF
  NEXT
NEXT
END SUB
```

FIG. 23

AN EXAMPLE OF QBASIC CODE FOR QUANTIFYING DEPENDENT OBSERVATIONS

```
SUB QUANTIFY (VV%, SNO%, NPT%, V#(), Q#())
'QUANTIFY IS A SUBROUTINE FOR PROVIDING TWO DIMENSIONAL VARIABLE
' SEGMENT ARRAYS COMPRISING DISPLACED RELATIVE ESTIMATES FOR AN
' UNQUANTIFIED DEPENDENT VARIABLE CORRSPONDING TO VARIATIONS IN
' A SINGLE INDEPENDENT VARIABLE OF A VARIABLE SET, WITH REMAINING
' INDEPENDENT VARIABLES CONSIDERED AT ASSUMED CONSTANT VALUES.
'                                    COPYRIGHT 2005, LARRY S. CHANDLER
'INPUT:  VV% DESIGNATES A VARIABLE SEGMENT IN CORRESPONDENCE
'            WITH CONSTANT ORTHOGONAL VARIABLES.
'        SNO% IS THE SEGMENT NUMBER.
'        NPT% IS THE NUMBER OF SAMPLES INCLUDED IN THE SEGMENT.
'OUTPUT: v# ARE VARIANT INDEPENDENT OBSERVATION SAMPLES.
'        Q# IS A DEPENDENT OBSERVATION QUANTIFICATION ARRAY.
SHARED X#(), NS%(), S%(), E%(), N%()
J% = 0
FOR I% = S%(VV%, SNO%) TO E%(VV%, SNO%)
J% = J% + 1                       'ESTIMATE THE DEPENDENT
V#(J%) = X#(VV%, N%(VV%, I%))     ' QUANTIFICATION ARRAY BY
Q#(J%) = J%                       ' THE SEQUENCE OF THE
NEXT                              ' VARIANT OBSERVATION.
'NOTE, TO MODIFY THIS SUBROUTINE IN ORDER TO ALTERNATELY ENHANCE
' REDUCTION OF MULTIVARIATE DATA WITH BIVARIATE PROCESSING FOR
' APPLICATIONS WITH AVAILABLE DEPENDENT OBSERVATION SAMPLILNG,
' FIRST PROVIDE ACCESS TO THE DEPENDENT VARIABLE OBSERVATIONS
' THEN REPLACE Q#(J%) WITH Q#(J%) = Y#(N%(VV%, I%)), WHERE Y#
' REPRESENTS THE RESPECTIVE DEPENDENT VARIABLE SAMPLING.  FOR SUCH
' ENHANCEMENT, A SUBSTANCIAL AMOUNT OF DATA WILL BE NECESSARY.
FOR I% = 2 TO NPT%
 IF V#(I%) < V#(I% - 1) THEN
   Sav# = V#(I%)
   V#(I%) = V#(I% - 1)
   FOR J% = I% - 1 TO 1 STEP -1
     V#(J%) = Sav#
     IF V#(J%) < V#(J% - 1) THEN
       Sav# = V#(J%)
       V#(J%) = V#(J% - 1)
     ELSE
     J% = 0
     END IF
   NEXT
 END IF
NEXT
END SUB
```

FIG. 24

AN EXAMPLE OF QBASIC CODE BEING IMPLEMENTED TO PROCESS QUANTIFIED DATA

```
SUB PROCESS (NPT%, V#(), Q#(), VV%, SNO%, A#, B#, E#, FLG%)
'THE SUBROUTINE PROVIDES A SOLUTION FOR A MATRIX EQUATION AS
' PROVIDED BY THE SUBROUTING EQN.  THE INVERSION IF PROVIDED
' BY THE SUBROUTINE SOLVE, A COPY OF WHICH IS PROVIDED IN
' APPENDIX A.                COPYRIGHT 2005, LARRY S. CHANDLER.
SHARED ICDSP%, RTIME%, NOWT%
DO                  'INITIALIZE ITERATION.
REDIM ARRAY#(9), EQTO#(3), CORR#(3)
CALL EQN(NPT%, V#(), Q#(), A#, B#, E#, ARRAY#(), EQTO#())
FLG% = 0
CALL SOLVE(1, 1, 3, ARRAY#(), EQTO#(), CORR#(), FLG%)
IF A# + CORR#(1) > 0 OR ICDSP% <> 1 THEN A# = A# + CORR#(1)
B# = B# + CORR#(2)
E# = E# + CORR#(3)
OK$ = ""
PRINT RTIME%;
IF FLG% = 1 OR FLG% = 2 THEN PRINT "FLAG"; FLG%; "IS SET."
IF ABS(E#) > 100 OR FLG% <> 0 THEN PRINT "ABORT ABORT ABORT ABORT"
IF ICDSP% = 1 THEN
PRINT "ICDSP ";
ELSE
PRINT "SCRP ";
END IF
IF NOWT% = 1 THEN
PRINT "WITHOUT WEIGHTING"
ELSE
PRINT "WITH COMPOSITE WEIGHTING"
END IF
PRINT "A# ="; A#; "B# ="; B#; "E# ="; E#
PRINT "PRESS: <I>CDSP, <C>OMPOSITE, E<X>IT,";
PRINT "[OR ANOTHER KEY TO ITERATE]";
DO
OK$ = INKEY$
IF OK$ <> "" THEN
EXIT DO
END IF
LOOP
PRINT OK$;
PRINT
IF ABS(E#) > 100 OR FLG% <> 0 THEN EXIT DO
SELECT CASE OK$
  CASE "C", "c", "I", "i", "X", "x"         'SERVICE OPTIONS.
  CALL OPTIONS(NPT%, V#(), Q#(), VV%, SNO%, A#, B#, E#, OK$)
END SELECT
IF OK$ = "X" OR OK$ = "x" THEN EXIT DO
LOOP
END SUB
```

FIG. 25

AN EXAMPLE OF QBASIC CODE ESTABLISHING A MATRIX EQUATION FOR PROCESSING QUANTIFIED OBSERVATIONS

```
SUB EQN (NPT%, V#(), Q#(), A#, B#, E#, AR#(), EQ#())
'THE SUBROUTINE EQN GENERATES THE COEFFICIENTS OF CORRECTIONS
'TO ADJUSTMENT PARAMETERS FOR A FITTING FUNCTION OF THE FORM
'Q=AV^E+B, AND SETS UP MATRIX EQUATION ARRAY ELEMENTS.
  SHARED ICDSP%, NOWT%      '       COPYRIGHT 2005, LARRY S.CHANDLER.
  REDIM AR#(9), EQ#(3)
  FOR I% = 1 TO NPT%                          'ESTIMATE THE
    W# = 1# / ABS(V#(I%) ^ (E# - 1) / E# / A#) ' COMPOSITE WEIGHTING.
    IF NOWT% = 1 THEN W# = 1       'ASSUME HOMOGENEOUS UNCERTAINTY.
    SQRW# = SQR(W#)                            'GENERATE BETA.
    ALPHA# = SQRW# * V#(I%) ^ E#               'GENERATE ALPHA.
    VARTH# = A# * ALPHA# * LOG(V#(I%))         'GENERATE VARTHETA.
    AR#(1) = AR#(1) + ALPHA# ^ 2               'SUM ALPHA SQUARED.
    AR#(2) = AR#(2) + ALPHA# * SQRW#           'SUM ALPHA*BETA.
    AR#(3) = AR#(3) + ALPHA# * VARTH#          'SUM ALPHA * VARTHETA.
    AR#(5) = AR#(5) + W#                       'SUM BETA SQUARED.
    AR#(6) = AR#(6) + SQRW# * VARTH#           'SUM BETA*VARTHETA.
    AR#(9) = AR#(9) + VARTH# ^ 2               'SUM VARTHETA SQUARED.
    GAMMA# = SQRW# * (Q#(I%) - B#) - A# * ALPHA#'GENERATE GAMMA.
    'PRINT ">"; GAMMA#;
    EQ#(1) = EQ#(1) + ALPHA# * GAMMA#          'SUM ALPHA*GAMMA.
    EQ#(2) = EQ#(2) + SQRW# * GAMMA#           'SUM BETA*GAMMA.
    EQ#(3) = EQ#(3) + VARTH# * GAMMA#          'SUM VARTHETA*GAMMA.
    IF ICDSP% = 1 THEN                'FOR ICDSP PROCESSING
      VARTH# = (Q#(I%) - B#) / A#     ' ADD A SECOND COMPONENT.
      IF (Q#(I%) - B#) / A# < 0 THEN VARTH# = V#(I%) ^ E#
      SQRW# = SQR(ABS(A# * E# / VARTH# ^ ((1 / E#) - 1)))
      IF NOWT% = 1 THEN SQRW# = 1
      BETA# = SQRW# * VARTH# ^ ((1 / E#) - 1) / A# / E#
      ALPHA# = BETA# * VARTH#
      GAMMA# = SQRW# * V#(I%) - ALPHA# * A# * E#
      VARTH# = SQRW# * LOG(VARTH#) * VARTH# ^ (1 / E#) / E# ^ 2
      AR#(1) = AR#(1) + ALPHA# ^ 2         'SUM ALPHA SQUARED.
      AR#(5) = AR#(5) + BETA# ^ 2          'SUM BETA SQUARED.
      AR#(2) = AR#(2) + ALPHA# * BETA#     'SUM ALPHA*BETA.
      AR#(3) = AR#(3) + ALPHA# * VARTH#    'SUM ALPHA * VARTHETA.
      AR#(6) = AR#(6) + BETA# * VARTH#     'SUM BETA*VARTHETA.
      AR#(9) = AR#(9) + VARTH# ^ 2         'SUM VARTHETA SQUARED.
      EQ#(1) = EQ#(1) + ALPHA# * GAMMA#    'SUM ALPHA*GAMMA.
      EQ#(2) = EQ#(2) + BETA# * GAMMA#     'SUM BETA*GAMMA.
      EQ#(3) = EQ#(3) + VARTH# * GAMMA#    'SUM VARTHETA*GAMMA.
    END IF
  NEXT
  AR#(4) = AR#(2)
  AR#(7) = AR#(3)
  AR#(8) = AR#(6)
END SUB
```

FIG. 26

AN EXAMPLE OF QBASIC CODE FOR PROVIDING AN INTERACTIVE SELECTION OF REDUCTION OPTIONS

```
SUB OPTIONS (NPT%, V#(), Q#(), VV%, SNO%, A#, B#, E#, OK$)
SHARED ICDSP%, RTIME%, NOWT%, MNCV#(), CVDV#(), CVQD#()
SELECT CASE OK$
CASE "C", "c"
 IF NOWT% <> 0 THEN
  NOWT% = 0
  PRINT "INITIATING COMPOSITE WEIGHTING"
 ELSE
  NOWT% = 1
  PRINT "REMOVING WEIGHT FACTOR"
 END IF
CASE "I", "i"
 IF ICDSP% <> 0 THEN
  ICDSP% = 0
  PRINT "INITIATING SINGLE COMPONENT RESIDUAL PROCESSING"
 ELSE
  ICDSP% = 1
  PRINT "INITIATING INVERSION CONFORMING DATA SETS PROCESSING"
 END IF
CASE "X", "x"
 CLS
PRINT "V("; VV%; "), SEGMENT"; SNO%; "."
 PRINT "A# ="; A#; "B# ="; B#; "E# ="; E#
 PRINT
 PRINT "THE INDEPENDENT VARIABLE AND QUANTIFIED DEPENDENT ";
 PRINT "VARIABLE ARE AS FOLLOWS:"
 PRINT "INDEPENDENT SAMPLE"; "    QUANTIFICATION    ";
 PRINT "   INVERSION VALUE"
 J% = 0
 FOR I% = 1 TO NPT%
  J% = J% + 1
  IF J% = 18 THEN
   J% = 0
   PRINT "PRESS A KEY TO CONTINUE"
   SLEEP
   PRINT "THE INDEPENDENT VARIABLE AND QUANTIFIED DEPENDENT";
   PRINT "VARIABLES CONTINUE AS FOLLOWS:"
   PRINT "INDEPENDENT SAMPLE"; "    QUANTIFICATION",
   PRINT "   INVERSION VALUE"
   PRINT V#(I%), Q#(I%), A# * V#(I%) ^ E# + B#
  ELSE
   PRINT V#(I%), Q#(I%), A# * V#(I%) ^ E# + B#
  END IF
 NEXT
 SLEEP
END SELECT
END SUB
```

FIG. 27

IMPLEMENTING TWO DIMENSIONAL SEGMENT INVERSIONS WITH INVERSION-CONFORMING DATA SETS PROCESSING BEING RENDERED TO INCLUDE GENERALIZED COMPOSITE WEIGHT FACTORS IN THE PROCESSING OF ERROR-AFFECTED MULTIVARIATE DATA SAMPLES

CROSS-REFERENCE TO RELATED APPLICATION

This application claims priority from now abandoned U.S. Provisional patent application No. 60/626,356 filed Nov. 12, 2004.

STATEMENT OF DISCLOSURE COPYRIGHT

Copyright materials herein presented or included by appendix may be reproduced by the Government of the United States for purposes of present invention patent disclosure. Unauthorized reproduction is prohibited. Unpublished work ©2005 L. S. Chandler.

REFERENCE TO APPENDICES A AND B

This disclosure includes computer program listing, Appendices A and B, submitted in the form of a compact disk Appendix containing respective files APPENDIX A.txt, created May 19, 2003, comprising 112K memory bytes, and APPENDIX B.txt, created Nov. 2, 2005, comprising 48K memory bytes, which are incorporated herein by reference.

BACKGROUND OF THE INVENTION

The present invention relates to automated forms of data processing, more particularly implementing forms of least-squares analysis, inversion-conforming data sets processing, and alternate forms of regression analysis and maximum likelihood estimating, to include the appropriate handling of linear and nonlinear data in correspondence with homogeneous and heterogeneous sample precision, with added provision for handling unquantifiable dependent variable representations and representing multivariate observations as related to two dimensional segment inversions.

As empirical relationships are often required to describe system behavior, data analysts continue to rely upon least-squares and maximum likelihood approximation methods to fit both linear and nonlinear functions to experimental data. Fundamental concepts, related to both maximum likelihood estimating and least-squares curve fitting, stem from the early practice referred to in 1766 by Euler as calculus of variation. The related concepts were developed in the mid 1700's, primarily through the efforts of Lagrange and Euler, utilizing operations of calculus for locating maximum and minimum function value correspondence. The maximum and minimum values and certain inflection points of the function occur at coordinates which correspond to points of zero slope along the curve. To determine the point where a minimum or maximum occurs, one derives an expression for the derivative (or slope) of the function and equates the expression to zero. By merely equating the derivative of the function to zero, local parameters which respectively establish the maximum or minimum function values can be determined.

The process of Least-Squares analysis utilizes a form of calculus of variation in statistical application to determine fitting parameters which establish a minimum value for the sum of squared single component residual deviations from a parametric fitting function. The process was first publicized in 1805 by Legendre. Actual invention of the least-squares method is clearly credited to Gauss, who as a teenage prodigy first developed and utilized it prior to his entrance into the University of Göttingen.

Maximum likelihood estimating is of somewhat more general application than that of least-squares analysis. It is traditionally based upon the concept of maximizing a likelihood which may be defined either as the product of discrete sample probabilities or, for the current analogy, as the product of measurement sample probability densities. By far, the most commonly considered form for representing a probability density function is referred to as the normal probability density distribution function (or Gaussian distribution). The respective Gaussian probability density function as formulated for a mean square deviation of $<\delta_Y^2>$ in the measurement of y will take the form of Equation 1:

$$D(Y-y) = \frac{1}{\sqrt{2\pi <\delta_Y^2>}} e^{-\frac{(Y-y)^2}{2<\delta_Y^2>}}, \qquad (1)$$

wherein D represents a probability density, Y represents an observation or dependent variable measurement, and y represents the expected or true value for the dependent variable. The formula for the Gaussian distribution was apparently derived by Abraham de Moivre in about 1733. The distribution function is dubbed Gaussian Distribution due to extensive efforts of Gauss related to distributions of observable errors. Consistent with the concept of a probability density distribution function, the actual probability of occurrence is considered as the integral or sum of the probability density, taken (or summed) over a range of possible samples. A characteristic of probability distribution functions over all possible observations is that the area under the curve, considered between minus and plus infinity or over the restricted range of possible dependent variable measurements, will always be equal to unity. Thus, the probability of any arbitrary sample lying within the range of the distribution function entire is one, e.g., $$\int_{-\infty}^{+\infty} D(Y-y)dY = 1. \qquad (2)$$

The probability of occurrence corresponding to any specific sample value, as considered in the limit as the range of integration approaches zero, would of course be zero.

In accordance with the present invention, for homogeneous uncertainty associated with a set of observations or homogeneous precision in the measurements of a variable, the precision and form of the probability density function associated with said set of observations or said measurements of said variable are independent of the coordinate location over the range and domain of the measurements. For line regression analysis, since lateral translations of a linear fitting function are indistinguishable from a respective change in the mean values of the dependent variable measurements, assuming normal error distributions, samples corresponding to any variety of coordinates along the fitting function can be independently included and combined in representing a likelihood estimator without consideration of affects that might be associated with lateral fitting function translations or fitting function distortions. By restricting the discussion in the following example to a concept of maximum likelihood with homogeneous precision and errors limited to the dependent variable, a typical linear Gaussian likelihood estimator can be represented for variations in the measurement of the dependent variable.

EXAMPLE 1

Generate form for a system of equations which will establish maximum likelihood as related to a set of linearly related data with homogeneous precision and errors limited to the dependent variable.

For a typical linear Gaussian Likelihood estimator $L_Y$, being considered to exemplify variations in the measurement of y, with the mean squared deviations being considered equivalent for each and every data sample, the explicit likelihood estimator will take the form of Equation 3:

$$L_Y = \prod_{k=1}^{K} \frac{1}{\sqrt{2\pi <\delta_Y^2>}} e^{-\frac{(Y-y)_k^2}{2<\delta_Y^2>}} \leadsto (2\pi <\delta_Y^2>)^{-\frac{K}{2}} e^{-\sum_{k=1}^{K} \frac{(Y-y)_k^2}{2<\delta_Y^2>}}, \quad (3)$$

wherein the included leadsto sign $\leadsto$ is herein assumed to refer to a one of a plurality of alternately represented forms or subsequent representations. The Y subscript on the likelihood estimator without an additional subscript indicates the probability (or probability density) being related to deviations in the measurement of the dependent variable y. The lower case italic k subscript designates a respective sample measurement, and the upper case K represents the total number of samples being considered. In order for the product of root mean squared deviations to be removed from behind the product sign as exemplified by the rendition of Equation 3, the uncertainty in all of the considered deviations must be represented by the same or equivalent uncertainty distribution functions. This criteria is generally satisfied in accordance with the present invention by assuming, or alternately providing, for non-skewed homogeneous uncertainty distribution functions in representing the included observation samples over all values of the subscript k.

A simplified form for maximizing the likelihood is rendered by taking the natural log of the estimator, as exemplified by Equation 4:

$$\ln L_Y \leadsto -\frac{K}{2}\ln(2\pi <\delta_Y^2>) - \frac{1}{2<\delta_Y^2>}\sum_{k=1}^{K}(Y-y)_k^2, \quad (4)$$

Since the maximum values for the natural log of $L_Y$ will always coincide with the maximum values for $L_Y$, maximum likelihood can be determined by equating the derivatives of ln $L_Y$ to zero.

In accordance with the present invention, by considering the elements of the likelihood estimator (in this case, minus the exponent of the probability distribution function) to be represented by a normal homogeneous uncertainty distribution, the first term on the right hand side of Equation 4 can be dropped, with the remaining term clearly representing the negative of the sum of squares of said elements. Hence, in accordance with the present invention, maximizing the likelihood estimator may be considered equivalent to minimizing the sum of squares of said elements, provided that said elements of the likelihood estimator, as rendered to represent the observation samples and as correspondingly rendered in the sum of squared said elements, can be considered to be appropriately normalized and weighted.

Taking the partial derivative of ln $L_Y$ with respect to each fitting parameters, $P_i$, will yield $$\frac{\partial \ln L_Y}{\partial P_i} = \frac{-1}{<\delta_Y^2>}\sum_{k=1}^{K}(Y-y)_k \frac{\partial y_k}{\partial P_i}. \quad (5)$$

The i subscript is included to respectively designate each included fitting parameter. Replacing the parametric fitting parameter representations, $P_i$, by determined ones, $\mathcal{P}_i$, and equating the partial derivatives to zero will yield Equations 6:

$$\left. \frac{-1}{<\delta_Y^2>}\sum_{k=1}^{K}(Y-y)_k \frac{\partial y_k}{\partial P_i} \right|_{\mathcal{P}_i} = 0. \quad (6)$$

Equations 6 are valid only because the variance may be considered to be a constant value over the entire range and domain of the data. Alternately, and in accordance with the present invention, close examination of Equations 4 through 6 will reveal that proportionate representation of ln $L_Y$ is all that is necessary to establish a maximum value for likelihood. Multiplying Equation 4 by the mean squared deviation may respectively alter the individual residual proportions but will not change the points where the respective maximum values will occur. Hence maximum likelihood, as represented by Equations 6, may be alternately represented in direct proportion, such as by Equations 7:

$$\left. \sum_{k=1}^{K}(Y-y)_k \frac{\partial y_k}{\partial P_i} \right|_{\mathcal{P}_i} = 0. \quad (7)$$

The vertical line with subscript $P_i$ is included to indicate replacement of each $P_i$ with its respectively determined counter part, $\mathcal{P}_i$.

End of Example 1

Equations 7 represent a similar set of independent equations to that of Equations 6 for evaluating function related approximating parameters which statistically characterize linearly related data for assumed homogeneous Gaussian probability density distributions, as provided for by the likelihood estimator of Equation 3. Equations 6 and 7 are both correct because, for homogeneous uncertainty, the standard deviations may be considered as constant over the entire range of the data and need not be included to establish proportionate representation for applications of likelihood. The validity of Equations 7 is substantially verified by the following example.

EXAMPLE 2

Considering four data samples comprising sample measurements of two and four, each taken at an independent variable coordinate location one positive unit from the origin, and, sample measurements six and eight, taken at the independent variable coordinate location three positive units from the origin, assuming a non-skewed error distribution in the measurement of y, show that the best fit represented by a linear fitting function through the above considered data samples [i.e., (1,2), (1,4), (3,6), and (3,8)] would be y=2x+1 and that the dependent variable measurement errors corresponding to each of the two independent variable locations would be plus and minus one.

In accordance with the present invention, a Gaussian normalization coefficient, $_GC$, can be defined as the ratio of the function inverse, corresponding to the the deviation coordinate or abcissa, $_GF$, of a Gaussian distribution to the respectively estimated approximation residual deviation. In this case, the Gaussian normalization coefficients can be expressed as $$_gC_{y_k} = \frac{D^{-1}[D(\mathcal{F}_{Y_k})]}{\mathcal{F}_{Y_k}}, \qquad (8)$$

wherein the subscripted symbol $F_{Y_k}$ is assumed to represent the estimated approximation residual deviation. The sans serif subscript Y is included to imply evaluation with respect to the provided sample measurement for the dependent variable, y. The calligraphic pre subscript G is included to imply correspondence with the Gaussian probability density distribution function, D. And, the k subscript indicates correspondence with the respective data sample. Assuming a probability density distribution for the respective observation sample residual or projection deviation, here represented by the typewriter type D, can be appropriately rendered as a function of the estimated residual deviations, $F_Y$, then, the corresponding estimate for the respective Gaussian residual deviation, $_GF_y$, can be determined as the respective inverse of the Gaussian distribution function.

In accordance with the present invention, assuming that an appropriate probability density distribution is available for the observation samples, the data related residual or projection deviations can be multiplied by successive approximations for an appropriate Gaussian normalization coefficient to insure statistically reliable results. Approximations for the Gaussian normalization coefficient are to be adjusted after each successive iteration but held constant during maximizing and minimizing operations as rendered to evaluate respective estimates for adjustment parameters.

In accordance with the present invention, Gaussian normalization coefficients can and should be implemented to establish preferred statistical representation; however, in the absence of sufficient information or in recognition of considered complexities, said Gaussian normalization coefficients may be replaced by reasonable approximations in the form of normalization coefficients, C, which establish the considered residual or projection deviations as being represented by more convenient non-skewed probability density distributions, alternately referred to herein as non-skewed error distributions, non-skewed uncertainty distributions, or simply non-skewed distribution. In accordance with the present invention, a deviation normalization coefficient is a weighting coefficient which when multiplied times a deviation will render that deviation so as to be characterized by a non-skewed homogeneous uncertainty distribution. In accordance with the present invention Gaussian normalization coefficients are deviation normalization coefficients, but the converse is not true, in that, all deviation normalization coefficients are not expected to be Gaussian. In accordance with the present invention, the terminology deviation applies to function deviations, approximation deviations, error deviations, residuals, single component residuals, single component residual deviations, data-point projections, and the like.

According to the present invention, a non-skewed error distribution (or non-skewed probability density distribution) is considered as any probability distribution (or any probability density distribution) for which the mean sample value approaches the expected value in the limit as the number of random samples approaches infinity.

In accordance with the present invention, a Gaussian probability density distribution is a non-skewed distribution, but all non-skewed distributions are not Gaussian.

In this example, the uncertainty distribution is to be considered as non-skewed, with insufficient information provided to establish whether or not it might actually be Gaussian.

Assume a simple linear fitting function of the form $$y = Ax + B, \qquad (9)$$

where the typewriter type A and B represent parametric fitting parameters. Consider a set of samples comprising K dependent variable measurements, $Y_k$, which for a sufficient number of samples are assumed to be statistically representative of true or "expected" values, $y_k$, each sample being respectively designated by the subscript, k, and each sample corresponding to a designated error-free independent variable location, $x_k$. Assume a Gaussian distribution in the measurements from the true values. Determine the values, A and B, for the parametric coefficient A and intercept B which provide the best linear fit through the data.

In accordance with the present invention, dependent component residual deviations are limited by express form to deviations, which coincide with variations in the measurement of the dependent variable or alternately defined dependent component deviations, with errors assumed to be restricted to the dependent variable coordinate. A sum of squared deviations. $\epsilon_Y$, can be rendered as a parametric representation for the sum of squared dependent component residual deviations of the sample measurements from their true value by Equation 10:

$$\xi_Y = \sum_{k=1}^{K}(Y-y)_k^2 = \sum_{k=1}^{K}(Y - A\mathcal{X} - B)_k^2. \qquad (10)$$

Minimizing the sum of square deviations with respect to fitting parameters will yield Equations 11 and 12:

$$\sum_{k=1}^{K} \mathcal{X}_k(Y - A\mathcal{X} - \mathcal{B})_k \rightsquigarrow \sum_{k=1}^{K} X_k Y_k - \mathcal{A}\sum_{k=1}^{K} X_k^2 - \mathcal{B}\sum_{k=1}^{K} X_k = 0, \qquad (11)$$

and $$\sum_{k=1}^{K}(Y - A\mathcal{X} - \mathcal{B})_k \rightsquigarrow \sum_{k=1}^{K} Y_k - \mathcal{A}\sum_{k=1}^{K} X_k - K\mathcal{B} = 0, \qquad (12)$$

which can be solved to give $$A = \frac{K\sum_{k=1}^{K} X_k Y_k - \sum_{k=1}^{K} X_k \sum_{k=1}^{K} Y_k}{K\sum_{k=1}^{K} X_k^2 - \left(\sum_{k=1}^{K} X_k\right)^2}, \quad (13)$$

and $$B = \frac{\sum_{k=1}^{K} Y_k \sum_{k=1}^{K} X_k^2 - \sum_{k=1}^{K} X_k \sum_{k=1}^{K} X_k Y_k}{K\sum_{k=1}^{K} X_k^2 - \left(\sum_{k=1}^{K} X_k\right)^2}, \quad (14)$$

thus providing a simple solution to determine the most statistically accurate fitting parameters for defining a straight line through bivariate data with homogeneous precision and non-skewed distributions associated with the errors being limited in the dependent variable.

Computing the various sums of Equations 13 and 14, as evaluated in correspondence with the hypothetical data provided for this example, will yield:

$$\sum_{k=1}^{4} X_k = 1 + 1 + 3 + 3 = 8,$$

$$\sum_{k=1}^{4} X_k^2 = 1 + 1 + 9 + 9 = 20,$$

$$\sum_{k=1}^{4} X_k Y_k = 2 + 4 + 18 + 24 = 48, \text{ and}$$

$$\sum_{k=1}^{4} Y_k = 2 + 4 + 6 + 8 = 20.$$

For K=4 data samples, substitute the respective sums into Equations 13 and 14 to determine the corresponding slope and intercept.

$$A = \frac{4 \cdot 48 - 8 \cdot 20}{4 \cdot 20 - 8 \cdot 8} = 2,$$

and $$B = \frac{20 \cdot 20 - 8 \cdot 48}{4 \cdot 20 - 8 \cdot 8} = 1.$$

Note that the evaluated slope A and intercept B correspond to those of the linear function y=2x+1, which is an exactly appropriate solution for the inversion. When x=1, y=1, and when x=3, y=7, with errors in the considered samples corresponding to plus and minus one.

End of Example 2

A common mistake of the past has been to assume that heterogeneous precision can be included in the same manner as homogeneous precision is included, as exemplified in Equation 3, i.e., by merely representing local variance, $<\delta_Y^2>_k$, in the place of a general homogeneous variance, $<\delta_Y^2>$, so that a spurious likelihood estimator $L_Y$ is alternately represented for local variations in the measurement of y, as $$L_Y = \prod_{k=1}^{K} \frac{1}{\sqrt{2\pi <\delta_Y^2>_k}} e^{-\frac{(Y-y)_k^2}{2<\delta_Y^2>_k}} \rightsquigarrow \quad (15)$$

$$e^{-\sum_{k=1}^{K} \frac{(Y-y)_k^2}{2<\delta_Y^2>_k}} \prod_{k=1}^{K} \frac{1}{\sqrt{2\pi <\delta_Y^2>_k}}.$$

This representation of likelihood is invalid for applications which include heterogeneous uncertainty. Although it may account for point wise probability distributions, it certainly does not account for the lateral deviations which may be associated with nonlinear function representations or heterogeneous data sampling.

Proof that the derivation presented in Equations 1 through 7 is invalid for representation of Equation 15, as considered for heterogeneous uncertainty, can be recognized by discussion of the following Example.

EXAMPLE 3

Consider the four hypothetical data points of Example 2 to be represented by measurements with heterogeneous uncertainty, such that the standard deviations in data points one and four are one third those of data points two and three. Then, a. determine the values for the weighted mean of the dependent variable measurements at each of the two independent coordinate locations, x=1 and x=3;

b. determine the slope, A, and intercept, B, for the line passing through the two mean values; and then, c. establish form for a weighted probability density function and corresponding likelihood estimator that will actually provide the same results.

The weighted mean value for the first two data points would be three times two plus four, all divided by four, which would be equal to two and one half, i.e., (2·3+4)/4=2.5.

The weighted mean value for the second two data points would be six plus three times eight, all divided by four, or seven and one half.

(6+3·8)/4=7.5.

An appropriate fit should include an intercept of zero and a slope of 2.5, which would pass through points (1,2.5) and (3,7.5). A weighted probability density function that would yield these same results can be written as $$D(\sqrt{W_{Y_k}}(Y-y)_k) = \frac{\sqrt{W_{Y_k}}}{\sqrt{2\pi <W_Y \delta_Y^2>}} e^{-\frac{W_{Y_k}(Y-y)_k^2}{2<W_Y \delta_Y^2>}}, \quad (16)$$

where, somewhat surprisingly, at least for this example, the included weight factors, $W_{Y_k}$, must be rendered as inversely proportional to the respective standard deviations and not inversely proportional to the square of said standard deviations, as so commonly assumed.

In accordance with the present invention, for this example, the resulting likelihood expressed as the product of probability densities over K data samples can be written as $$L_Y = \prod_{k=1}^{K} \frac{\sqrt{W_{Y_k}}}{\sqrt{2\pi <W_Y \delta_Y^2>}} e^{-\frac{W_{Y_k}(Y-y)_k^2}{2<W_Y \delta_Y^2>}} \rightsquigarrow \qquad (17)$$

$$e^{-\sum_{k=1}^{K} \frac{W_{Y_k}(Y-y)_k^2}{2<W_Y \delta_Y^2>}} \prod_{k=1}^{K} \frac{\sqrt{W_{Y_k}}}{\sqrt{2\pi <W_Y \delta_Y^2>}}.$$

End of Example 3

In consideration of the one dimensional method of averaging which was employed in Example 3, in accordance with the present invention, to combine sets of data which may each differ in form of uncertainty distribution, two alternate adjustments must be made. These are, first, multiplication of each respective datum by a corresponding coefficient that will adjust the skew of the respective uncertainty to correspond to that of the remaining data as respectively adjusted, and second, multiplication of each adjusted datum so that each is appropriately weighted as to the individual severity of the likely deviation associated with the collection and representation of each individual datum. In Example 3, it has been assumed that the general form of uncertainty distribution is considered as non-skewed and similar in construct for each sample, so that, by providing point-wise dependent variable averaging, a deviation normalization coefficient is not considered or included. The severity of likely deviation associated with the presumed collection is included, in accordance with the present invention, by means of a single component weighting and averaging technique, which would not necessarily apply to a typical line regression analysis. In accordance with the present invention, an alternate approach is to employ residual and/or projection normalization by the inclusion of normalization coefficients and also to establish and include a form of fundamental weighting to compensate for heterogeneous data sampling and correct for any associated function nonlinearities.

In absence of possibly more appropriate nomenclature, the weight factors which have been included in representing Equation 17 are here dubbed in accordance with the present invention as composite weight factors, W. In accordance with the present invention, composite weight factors are intended both to account for deviations which may be associated with considered error distributions and to correct for heterogeneous affects which may be associated with nonlinear representations and/or nonuniform sampling of error-affected data. Similar form and extended forms for representing composite weight factors as initially derived primarily by trial and error and empirical considerations are partially described in the U.S. Provisional patent application No. 60/626,856 and alternately suggested in the pending U.S. patent Ser. No. 10/347,279. The computer program listings of Appendix A, which were abstracted from the corresponding Appendix of said pending U.S. patent and which were included in said U.S. Provisional patent application, have provided the capability of implementing and evaluating a very large variety of types of weighting factors and coefficients under simulated conditions. Results of such implementations and simulations establish the validity of the composite weight factors as defined and represented in accordance with the present invention.

A Brief Discussion of Terminology:

In accordance with the present inventions composite weight factors, W, may be defined as the product of the square of at least some form of deviation normalizing coefficients, C, multiplied times respective fundamental weight factors, W.

In accordance with the present invention, composite weighting is weighting as provided in correspondence with composite weight factors.

In accordance with the present invention, implementing proportionate composite weighting, by whatsoever means, for the weighting of squared deviations or squared datapoint projections, constitutes generating and implementing composite weight factors.

In accordance with the present invention, the terminology projections, or more specifically "data-point projections", refers to the deviations from or displacement between a datum and an estimated or determined approximating function as considered along the datum measurement coordinate (Ref. U.S. Pending patent Ser. No. 10/347,279.)

In accordance with the present invention, the terminology "single component residual" refers to an assumed uncertainty or error deviation (i.e., residual, deviation, displacement, residual displacement, or residual deviation displacement, as analytically represented) of an observed sample from an assumed expected or assumed true representation, along a single respectively considered path.

In accordance with the present invention, deviation or projection normalizing coefficients are defined as coefficients which are assumed to render respective data-point projections and/or single component residual deviations, as considered to be represented by homogeneous, non-skewed, preferably Gaussian, uncertainty distributions, when multiplied by said coefficients. In accordance with the present invention, said normalizing coefficients may include relative weighting of multiple root inclusions, and also, in accordance with the present invention, forms of hanning or alternate window shaping may be optionally included in part with considered uncertainty distribution characteristics and respective normalization coefficients, to compensate for any skew in observation sampling that might be related to a limited extent of the sampling range.

In accordance with the present invention, fundamental weight factors are functions of fundamental variables, which are implemented to normalize coordinate axes and/or compensate for fitting function nonlinearities and/or nonlinearities that may be induced by heterogeneous uncertainties.

In accordance with the present invention, fundamental variables are variables which are considered to represent observation samples being rendered in a form assumed to be characterized by homogeneous non-skewed uncertainty distributions. Said fundamental variables may be error free, proportionately represented, or specifically normalized on a characteristic or relative representation of uncertainty, as stipulated in accordance with the present invention.

Implementing Fundamental Weight Factors:

Fundamental weight factors may be defined in accordance with the present invention by Equations 18.

$$W_{nrk} = \left| \prod_{\eta=1}^{N} \frac{\partial F_{x_\eta}}{\partial x_\eta} \right|_{rk}^{\frac{-2}{N}} \rightsquigarrow \left| \left( \frac{\partial F_y}{\partial y} \right) \left( \prod_{\eta=1}^{N} \frac{\partial F_y}{\partial x_\eta} \right) \right|_{rk}^{\frac{-2}{N+1}}, \qquad (18)$$

or alternate renditions of the same. The calligraphic F with a coordinate subscript represents an estimated function deviation as the deviation of a functional component of an approximating function or determined fitting function from a true or expected form. The lower case, y represents a dependent or determined fundamental variable, which may be considered as a function of one or more other fundamental variables. In accordance with the present invention, normalization, which is included in rendering said dependent or determined fundamental variable together with said other fundamental variables, comprise a set of N=N+1 fundamental variables which are included in rendering said fundamental weight factor. The sans serif N indicates the total number of degrees of freedom, or the total number of variables being considered in the rendition. The typewriter type N designates the number of said other fundamental variables being considered. In accordance with the present invention, the included exponents, $$\frac{2}{N+1} \text{ or } \frac{2}{N},$$

may sometimes very slightly or even significantly in value with little affect on the final results. Such variations are to be considered as allowable in accordance with the present invention, but not preferred.

The lower case y subscript on the function deviation, F implies a fundamental deviation, or a deviation multiplied by any normalization that is included to establish said function deviation as characterized by a homogeneous, non-skewed uncertainty distribution. The subscript η designates a respective variable. The subscript n designates the dependent or currently determined variable. The k subscript designates evaluation with respect to the set of measurement samples which correspond to a single observation. Subscripts, such as $y_k$, being included on the weight designator, W, would imply correspondence with similarly represented sample measurements of the fundamental variable y, as associated with dependent component residual deviations and the respective fitting function or inverse function root. The subscript r implies one of a set of root solutions which may correspond to the determined variable.

In accordance with the present invention, for applications which include more than one root solution in the rendering of respective component residual deviations and/or data-point projections, the additional roots may be included in the likelihood estimator as correspondingly weighted to reflect a combined representation which is consistent with the weighting that might correspond to that of singly represented deviations and or projections. In general, for simplification, roots not considered to be within acceptable limits of uncertainty need not necessarily be included. It is here suggested in accordance with the present invention, that for multiple root applications, a normalized likelihood which corresponds to individual roots of multiple root solutions be incorporated in representing the normalization of residual deviations and/or data-point projections and in representing the fundamental form of the dependent or respectively determined variables that are to be included in representing the fundamental weight factors, said normalized likelihood being considered in accordance with a selected uncertainty distribution which may be assumed to relate likelihood to remoteness from the respective observation samples, with a combined effect of representing the sum of respective root-related data-point projections or deviations with a likelihood compatible to that of a single root solution. Assuming only one pertinent root for the determined value, the r subscript can be dropped. A subscript, $y_k$, would imply correspondence with the determined measure of y as a function of orthogonal sample measurements, as might be associated with the weighting of data-point projections in the rendering of a form of inversion-conforming data sets processing (Ref. Pending U.S. patent Ser. No. 10/347,279.) The subscript n, along with the n, are included on the r, in Equation 18 to denote general application.

EXAMPLE 4

Consider the hypothetical data of Example 2 with assumed heterogeneous uncertainty as described in Example 3. Show by implementation of maximum likelihood to include fundamental weighting that the best fit represented by a linear fitting function would be y=2.5x.

Assume a simple linear fitting function of the form $$y = Ax + B. \tag{19}$$

Considering variability, $V_{Y_k}$, as represented by the square of standard deviations over point-wise non-skewed heterogeneous uncertainties in the measurement of y, with point-wise non-skewed uncertainties imposed over a heterogeneous sample environment, and with localized coordinates corresponding to said non-skewed uncertainty distributions being designated by the oplus subscript, $\oplus$, the normalized function deviations, $F_{yk}$, as related to a set of fundamental variables, $y_k$, can be written as $$F_{yk} = C_{y_k} F_{y_k} = \frac{(y - A\chi - B)_{\oplus k}}{\sqrt{V_{Y_k}}}. \tag{20}$$

The fundamental variables, $y_k$, which correspond to the uncertainty in local dependent variable measurements, may be represented as the respectively measured variable normalized on the local uncertainty.

$$y_k = \frac{y_{\oplus k}}{\sqrt{V_{Y_k}}}. \tag{21}$$

(Note that, considering notation in accordance with the present invention, non-skewed uncertainty distributions imposed over a heterogeneous data sample environment may or may not be explicitly designated by inclusion of the oplus subscript in the respectively represented equations.)

Assuming no error in the measurement of an independent variable, its fundamental form as considered for the application of this example would be equivalent to the independent variable.

$$I = X. \tag{22}$$

The fundamental weight factors, $W_{y_k}$, can be written as $$W_{y_k} = \left| \frac{\partial \mathcal{F}_y}{\partial y} \frac{\partial \mathcal{F}_y}{\partial x_k} \right|^{-1}_{x_k, y_k} = \left| \frac{\sqrt{V_{Y_k}}}{\mathcal{A}} \right|. \tag{23}$$

The sum of squared deviations, $\xi_{y_k}$, can now be written as $$\xi_{y_k} = \sum_{k=1}^{K} \left| \frac{\sqrt{\mathcal{V}_{Y_k}}}{\mathcal{A}} \right| \left[ \frac{(Y - \mathcal{A}X - \mathcal{B})_k}{\sqrt{\mathcal{V}_{Y_k}}} \right]^2 \quad (24)$$

$$= \sum_{k=1}^{K} \mathcal{W}_{Y_k} (Y - \mathcal{A}X - \mathcal{B})_k^2,$$

wherein the composite weight factors, $W_{Y_k}$, comprising the fundamental weight factors multiplied by the square of the deviation normalization coefficient are given for this example by Equations 25:

$$\mathcal{W}_{Y_k} = \left| \frac{1}{\mathcal{A}\sqrt{\mathcal{V}_{Y_k}}} \right| \propto \left| \frac{1}{\sqrt{\mathcal{V}_{Y_k}}} \right|. \quad (25)$$

Successive estimates for the approximating parameter A can be determined by minimizing Equation 24 with respect to the approximative parameters A and B; however, it is not necessary to include A as part of the weight factor to maintain proportional weight factor representation. (Note: in accordance with the present invention, both proportionate quantities and equivalent quantities are considered to be proportional, and likewise. "inversely proportional to" is assumed to also include equivalent to the inverse of.)

Minimizing Equation 24 will yield the independent Equations 26 and 27:

$$\sum_{k=1}^{K} \frac{X_k(Y - \mathcal{A}X - \mathcal{B})_k}{\sqrt{\mathcal{V}_{Y_k}}} \rightsquigarrow \sum_{k=1}^{K} \frac{X_k Y_k}{\sqrt{\mathcal{V}_{Y_k}}} - \quad (26)$$

$$\mathcal{A} \sum_{k=1}^{K} \frac{X_k^2}{\sqrt{\mathcal{V}_{Y_k}}} - \mathcal{B} \sum_{k=1}^{K} \frac{X_k}{\sqrt{\mathcal{V}_{Y_k}}} = 0,$$

and $$\sum_{k=1}^{K} \frac{(Y - \mathcal{A}X - \mathcal{B})_k}{\sqrt{\mathcal{V}_{Y_k}}} \rightsquigarrow \sum_{k=1}^{K} \frac{Y_k}{\sqrt{\mathcal{V}_{Y_k}}} - \quad (27)$$

$$\mathcal{A} \sum_{k=1}^{K} \frac{X_k}{\sqrt{\mathcal{V}_{Y_k}}} - \mathcal{B} \sum_{k=1}^{K} \frac{1}{\sqrt{\mathcal{V}_{Y_k}}} = 0,$$

which can be solved to give $$\mathcal{A} = \frac{\left(\sum_{k=1}^{K} \frac{1}{\sqrt{\mathcal{V}_{Y_k}}}\right)\left(\sum_{k=1}^{K} \frac{X_k Y_k}{\sqrt{\mathcal{V}_{Y_k}}}\right) - \left(\sum_{k=1}^{K} \frac{X_k}{\sqrt{\mathcal{V}_{Y_k}}}\right)\left(\sum_{k=1}^{K} \frac{Y_k}{\sqrt{\mathcal{V}_{Y_k}}}\right)}{\left(\sum_{k=1}^{K} \frac{1}{\sqrt{\mathcal{V}_{Y_k}}}\right)\left(\sum_{k=1}^{K} \frac{(X_k)^2}{\sqrt{\mathcal{V}_{Y_k}}}\right) - \left(\sum_{k=1}^{K} \frac{X_k}{\sqrt{\mathcal{V}_{Y_k}}}\right)^2}, \quad (28)$$

and $$\mathcal{B} = \frac{\left(\sum_{k=1}^{K} \frac{Y_k}{\sqrt{\mathcal{V}_{Y_k}}}\right)\left(\sum_{k=1}^{K} \frac{(X_k^2)}{\sqrt{\mathcal{V}_{Y_k}}}\right) - \left(\sum_{k=1}^{K} \frac{X_k}{\sqrt{\mathcal{V}_{Y_k}}}\right)\left(\sum_{k=1}^{K} \frac{X_k Y_k}{\sqrt{\mathcal{V}_{Y_k}}}\right)}{\left(\sum_{k=1}^{K} \frac{1}{\sqrt{\mathcal{V}_{Y_k}}}\right)\left(\sum_{k=1}^{K} \frac{(X_k)^2}{\sqrt{\mathcal{V}_{Y_k}}}\right) - \left(\sum_{k=1}^{K} \frac{X_k}{\sqrt{\mathcal{V}_{Y_k}}}\right)^2}. \quad (29)$$

Computing the various sums of Equations 28 and 29, as related to the provided data, will yield:

$$\sum_{k=1}^{4} \frac{1}{\sqrt{\mathcal{V}_{Y_k}}} = 3 + 1 + 1 + 3 = 8,$$

$$\sum_{k=1}^{4} \frac{X_k}{\sqrt{\mathcal{V}_{Y_k}}} = 1 \cdot 3 + 1 + 3 + 3 \cdot 3 = 16,$$

$$\sum_{k=1}^{4} \frac{X_k^2}{\sqrt{\mathcal{V}_{Y_k}}} = 1 \cdot 3 + 1 + 9 + 9 \cdot 3 = 40,$$

$$\sum_{k=1}^{4} \frac{X_k Y_k}{\sqrt{\mathcal{V}_{Y_k}}} = 2 \cdot 3 + 4 + 18 + 24 \cdot 3 = 100, \text{ and}$$

$$\sum_{k=1}^{4} \frac{Y_k}{\sqrt{\mathcal{V}_{Y_k}}} = 2 \cdot 3 + 4 + 6 + 8 \cdot 3 = 40.$$

Substituting the respective sums into Equations 28 and 29 to determine the corresponding slope and intercept will yield:

$$\mathcal{A} = \frac{8 \cdot 100 - 16 \cdot 40}{8 \cdot 40 - 16 \cdot 16} = 2.5,$$

and $$\mathcal{B} = \frac{40 \cdot 40 - 16 \cdot 100}{8 \cdot 40 - 16 \cdot 16} = 0.$$

End of Example 4

Results from Example 4 are substantiated by those of Example 3 and thereby exemplify an appropriate form for the weighting of squared single component line residual deviations in accordance with the present invention.

Fundamental variables have been previously introduced in prior inventions of the present inventor as variables whose measurements are characterized by non-skewed error distributions (Ref. U.S. Pat. Nos. 5,619,432; 5,652,713; and 5,884,245.) In addition, fundamental variables are alternately considered in accordance with the present invention, as variables which are included in sets of orthogonally related variables whose measurements or determined values are generally considered as normalized on uncertainty or proportionate representation of the same. That is, with few exceptions, in accordance with the present invention, fundamental variables are preferably considered as being both normalized on uncertainty and characterized by homogeneous non-skewed sample uncertainty distributions. Generally, exceptions may be considered to apply in the absence of insufficient information or under the assumption of error-free data samples. The addition of the conditions of normalization on uncertainty, together with appropriately established conditions of homogeneity and non-skewed error distributions in representing fundamental variables, will provide for the generation of appropriate fundamental weighting to accommodate for either or both heterogeneous precision and nonlinear representations of data. Note in accordance with the present invention, that normalization of variables on uncertainty is not always required, and for some forms of line regression analysis, inclusion of fundamental weight factors may not be necessary. In accordance with the present invention, fundamental variables are established as related to determined values or controlled measures, or they may be transformed, normalized, or adjusted as necessary to establish compatible non-skewed homogeneous error distributions in correspondence with respectively represented data samples.

In accordance with the present invention, forms for representing fundamental weight factors are directly related to two respective considerations involved in representing fundamental variables. These considerations include:

1. requiring fundamental variables to reflect non-skewed homogeneous error distributions.

2. requiring fundamental variables to be normalized on respective uncertainty.

Certain forms for said fundamental weight factors may be rendered for limited applications with little or no modification to the form of transformation weight factors, as considered in the U.S. Pat. Nos. 5,619,432; 5,652,713; and 5,884,245. Other similar forms which do not include representation of uncertainty, including cross term minimizing weight factors, may be rendered by forms of inverse deviation variation weighting as suggested in U.S. Pat. No. 6,181,976 B1. Past efforts by the present inventor to establish appropriate data processing by maximum likelihood estimating, as disclosed in these four patents may not adequately compensate for heterogeneous precision without considering at least some form of normalization of variables on uncertainty. In accordance with the present invention, it is not absolutely necessary to clearly represent an explicitly defined approach to accomplish equivalent normalization. Normalization may be explicitly defined or alternately estimated; however, there appears to be at least two general forms for categorizing respective composite weight factors in accordance with the present invention. Said at least two general forms may be expressed, for example, by Equations 30 and the upcoming Equations 31.

$$\mathcal{W}_{Y_{rk}} \propto \frac{C_{Y_{rk}}^2}{\left| \frac{\partial \mathcal{F}_y / \sqrt{\mathcal{V}_Y}}{\partial y / \sqrt{\mathcal{V}_Y}} \prod_{\eta=1}^{N} \frac{\partial \mathcal{F}_y / \sqrt{\mathcal{V}_Y}}{\partial X_\eta / \sqrt{\mathcal{V}_{X_\eta}}} \right|_{rk}^{\frac{2}{N+1}}} \quad (30)$$

-continued $$\propto \frac{1}{\left| \sqrt{\mathcal{V}_{Y_{rk}}} \prod_{\eta=1}^{N} \frac{\partial \mathcal{F}_y}{\partial X_\eta} \sqrt{\mathcal{V}_{X_\eta}} \right|_{rk}^{\frac{2}{N}}}.$$

wherein the calligraphic y represents the dependent variable and the typewriter type N represents the number of independent variables, $x_n$. The sans serif X and Y subscripts on the variability, V, indicate an assumed variability associated with respective data samples, X and Y. The units of variability should correspond, at least consistent in proportion to those of the respective deviations. The r is included as a subscript to reiterate the option of handling the single component residual representation as related to more than single root solutions. "Type one", composite weight factors are established in accordance with the present invention, to provide preferred results for the weighting of squared single component residuals. By inspection of Equations 30, it becomes obvious that for applications which involve homogeneous uncertainty, that is, for applications in which any component of variability may be considered as constant throughout the ensemble of data, depending upon the form of the normalizing coefficient, representation of that variability may not need to be included to establish proportionate single component residual weighting.

In accordance with the present invention, uncertainty, which is associated with error free measurements and/or homogeneous uncertainty and which is either not represented, or represented as a proportional factor of the normalization coefficient, may not need to be included or may be represented by any constant value in the rendition of type one composite weight factors. However, in accordance with the present invention, for errors-in-variables applications, which may involve defining alternately oriented single component residual deviations (such as might be considered by including representation of an effective variance or by alternately considering multiple component residual displacements or data-point projections, that might be of the suggested form that will be considered later, e.g., in Example 11 of this document), multi-dimensionally defined single component residual displacements may, of necessity, be required to include representation of any or all uncertainty which may be assumed to characterize the orientation of said single component residual displacements.

An alternate form of composite weighting (dubbed here as "type two"), reflects a definition of fundamental variables corresponding to the elements of respective inversion-conforming data sets normalized on respective coordinate sample observation uncertainty. In accordance with the present invention, type two composite weight factors can generally be represented in the form of Equations 31:

$$\mathcal{W}_{X_{nrk}} \propto \frac{C_{X_{nrk}}^2}{\left| \prod_{\eta=1}^{N} \frac{\partial \mathcal{F}_{X_n} / \sqrt{\mathcal{V}_{X_n}}}{\partial X_\eta / \sqrt{\mathcal{V}_{X_n}}} \right|_{rk}^{\frac{2}{N}}} \quad (31)$$

-continued $$\wedge^* \frac{1}{\left|\left(\prod_{\eta=1}^{N} \frac{\partial \mathcal{F}_{x_n}/\sqrt{\mathcal{V}_{x_n}}}{\partial X_\eta / \mathcal{V}_{x_\eta}}\right)^{\frac{2}{N}}\right|\left[\left(\sum_{\eta=1}^{N} \frac{\partial \mathcal{F}_{x_n}^2}{\partial X_\eta} \mathcal{V}_{x_\eta}\right) - \frac{\partial \mathcal{F}_{x_n}^2}{\partial X_n} \mathcal{V}_{x_n}\right]_{rk}}$$

$0 < n < N,$ wherein the sans serif N represents the number of considered variable degrees of freedom, i.e., including and represented by both dependent and independent variables. The calligraphic x subscript designates correspondence with determined values along the un-normalized x coordinate axis. Type two composite weighting may be considered for providing the weighting of data-point projections in the rendering of inversion-conforming data sets processing. The r is included as a subscript in Equations 31 to reiterate the option of handling the multiple root solutions for the determined variable of respective inversion-conforming data sets. In accordance with the present invention, for applications of inversion-conforming data sets processing in which measurements for one or more of the associated variables may be assumed to be error-free, the zero values of the respective η subscripted variability which are included within the product of differentials of Equations 31 may be replaced with unity or any alternate constant value.

Replacing Transformation Weight Factors:

Transformation weight factors, as originally conceived, were intended to either A provide the duel function of normalizing fitting function coordinates and rendering an approximate, empirically verified, weighting of skewed error distributions or to alternately provide a general form of coordinate normalization and squared residual weighting for non-linear applications. Assuming errors in the measurement of the dependent variable to be represented by non-skewed error distributions, a form for rendering transformation weight factors, W, in terms of derivatives of estimated approximation deviations or function deviations, E, is expressed by Equation 32.

$$W = \left|\frac{\partial \mathcal{F}_-}{\partial y} \prod_{n=1}^{N} \frac{\partial \mathcal{F}_-}{\partial X_n}\right|^{\frac{-2}{N+1}}. \tag{32}$$

In accordance with the definition of discriminate reduction data pocessing as provided in three U.S. Pat. Nos. 5,619,432; 5,652,713; and 5,884,245, ". . . discriminate reduction data processing is provided to process information in order to generate appropriate and statistically accurate analytical data representations of variation in characteristic measurement which are generated by means including automated evaluation of approximating parameters which substantially minimize parametric expressions which are assumed to represent sums of squares of coordinate-normalized datum variances." A coordinate-normalized datum variance is apparently defined as the square of the deviation between an expected or true observation coordinate value and the respective coordinate sample measurement, multiplied by corresponding transformation and precision weighting. The exemplary fortran instruction code included within the same three U.S. patent disclosures establishes the parametric expression which is minimized as including explicit (pre-established) representation for adjustment parameters.

The lack of a subscript on the function deviation E as represented in Equation 32 is consistent with the concept of transformation weight factors as provided by said three U.S. patents, implying that said function deviations, as included in transformation weight factors, may be rendered in correspondence with, but without considering the explicit form of, the residual deviations, and without considering variables as normalized on respective sampling uncertainty. Processing by discriminate reduction data processing systems alternately compensates for the lack of such normalizing, with provision for including partially effective but not completely adequate precision weighting. Said discriminate reduction data processing systems do not consider the need for including any form of residual normalization other than that which is afforded by said transformation weight factors and respectively defined precision weight factors. Discriminate reduction data processing may be considered to reflect certain forms of single component residual processing as rendered to include type one composite weighting in accordance with the present invention, provided that:

1. the considered error deviations without normalization may be assumed to be represented by non-skewed error distributions;
2. the orientation of said error deviations corresponds to the orientation of the respective error deviations which are associated with the considered data samples, and
3. the minimized sums of squares of coordinate-normalized datum variances as represented by parametric expression, as rendered in correspondence with said three U.S. patents, can be considered to converge to an appropriate solution.

The same data and assumptions of Example 4, as considered in Example 5, can alternately serve to provide a prime example for application of discriminate reduction data processing being rendered to include precision weighting in accordance with said three U.S. patents.

EXAMPLE 5

Re-consider the hypothetical data of Example 2 with assumed heterogeneous uncertainty as described in Examples 3 and 4. By restricting the assumed heterogeneous uncertainty of dependent variable measurements to be only a function of the independent variable, hence allowing for the use of discriminate reduction data processing as supported only by precision weighting, show that, for this particular example, both the method of the present invention, as used in establishing composite weighting, and the method of discriminate reduction data processing, as written to exclude transformation weight factors, are equally viable.

Assume a simple linear fitting function of the form $$y = Ax + B. \tag{33}$$

Considering variability $V_{Y_k}$ as represented by the square of the standard deviation for non-skewed heterogeneous uncertainty in the measurement of y, wherein said heterogeneous uncertainty is considered as heterogeneous with respect to alternate locations along the independent variable but homogenous as associated with the dependent variable for single coordinate values of the dependent variable, the un-normalized function deviations, $F_y$, can be written as $$F_y = (y - Ax - B)_{\oplus k}, \quad (34)$$

wherein the measurements Y, as considered individually, can be assumed to be represented by non-skewed uncertainty distributions. The precision weighted transformation weight factors, $w_{Y_k} W_{Y_k}$, as rendered in accordance with the description in the three U.S. Pat. Nos. 5,619,432; 5,652,713; and 5,884,245, can be written as $$w_{Y_k} W_{Y_k} = w_{Y_k} \left| \frac{\partial F_y}{\partial y} \frac{\partial F_y}{\partial \chi_k} \right|^{-1}_{\chi_k, y_k} \rightarrow \left| \frac{w_{Y_k}}{A} \right| \cdot \stackrel{?}{\rightarrow} \left| \frac{1}{A\sqrt{V_{Y_k}}} \right|, \quad (35)$$

wherein the question mark over the leadsto sign indicates a somewhat dubious notation in the representation of adjustment parameters, as rendered in said three U.S. patents, said dubious notation being associated with the common but ambiguous practice of not distinguishing between notation of fitting parameters before and after minimization.

The included precision weight factors, as represented in accordance with this example, would be $$w_{Y_k} = \frac{1}{\sqrt{V_{Y_k}}}. \quad (36)$$

The composite weight factors, as rendered in accordance with the present invention for this particular example, after some manipulating, will take the same form as the precision weighted transformation weight factors of Equations 37 when written as a function of approximating parameter, A; i.e., $$W_{Y_k} = \frac{w_{y_k}}{V_{Y_k}} = \frac{1}{V_{Y_k}} \left| \frac{\partial F_y}{\partial y} \frac{\partial F_y}{\partial x_k} \right|^{-1}_{\chi_k, y_k} \rightarrow \quad (37)$$

$$\frac{1}{V_{Y_k}} \left| \frac{\partial F_y / \sqrt{V_{Y_k}}}{\partial y \sqrt{V_{Y_k}}} \frac{\partial F_y / \sqrt{V_{Y_k}}}{\partial \chi} \right|^{-1}_{\chi_k, y_k} \rightarrow \left| \frac{1}{A\sqrt{V_{Y_k}}} \right|.$$

For this specific example, due to local properties of homogeneous uncertainty and due to confining uncertainty to a single variable, the alternate procedures of either implementing precision weighted transformation weight factors, as considered in Equations 37, or implementing composite weight factors, by inherent coincidence, lead to equivalent results, and the sum of normalized squared deviations, $\xi_{y_k}$, would take the same form as is rendered in Example 4; i.e., $$\xi_{y_k} = \sum_{k=1}^{K} W_{y_k} (Y - A\chi - B)^2_{\otimes k} = \sum_{k=1}^{K} \left| \frac{1}{A\sqrt{V_{Y_k}}} \right| [(Y - A\chi - B)_{\oplus k}]^2 \rightarrow \quad (38)$$

$$\sum_{k=1}^{K} \left| \frac{1}{\sqrt{V_{Y_k}}} \right| [(Y - A\chi - B)_{\oplus k}]^2,$$

wherein composite weight factors, $W_{y_k}$, are given for this example by Equations 39:

$$W_{y_k} = \left| \frac{1}{A\sqrt{V_{Y_k}}} \right| \propto \left| \frac{1}{\sqrt{V_{Y_k}}} \right|. \quad (39)$$

Successive estimates for the inverse approximating parameter 1/A can be determined by minimizing Equation 38 with respect to pre-estimates and successive approximations; however, in this example it is not necessary to include this inverse as part of the weight factor to maintain proportional weight factor representation. The resulting weighted sum of squared deviations would become $$\xi_Y \propto \sum_{k=1}^{K} \left| \frac{1}{A\sqrt{V_{Y_k}}} \right| \cdot [(Y - A\chi - B)_{\oplus k}]^2 \propto \quad (40)$$

$$\sum_{k=1}^{K} \left| \frac{1}{\sqrt{V_{Y_k}}} \right| [(Y - A\chi - B)_{\oplus k}]^2,$$

thus excluding the need for use of transformation weight factors but including the use of precision weighting as rendered in accordance with said U.S. Pat. Nos. 5,619,432; 5,652,713; and 5,884,245.

End of Example 5

In accordance with the present invention, both transformation weight factors and/or precision normalized weighting, as considered in accordance with said U.S. Pat. Nos. 5,619,432; 5,652,713; and 5,884,245, may be replaced by representing composite weight factors, as rendered in accordance with the present invention, to include enhancements which establish appropriate normalization of respective error deviations along with appropriate consideration for normalization of error-affected measurements on sample uncertainty.

In accordance with the present invention, both transformation weight factors as represented by Equation 31 and precision normalized weighting, as considered in accordance with said U.S. Pat. Nos. 5,619,432 and 5,652,713 should be, can be, and should be replaced in accordance with the present invention by composite weight factors which are included and rendered in accordance with the present invention to satisfy and render adequate processing conditions as follows:

I. Observation samples which are included in rendering fundamental weight factors must be represented as measurements of fundamental variables in accordance with the present invention, i.e.:
1. Measurement of fundamental variables must be considered as error free, or considered each to be characterized by a respective error deviation which is assumed to be represented by at least some form of uncertainty distribuation.
2. Observation samples whose respectively considered error deviation is assumed to be represented by any form of skewed uncertainty distribution must be respectively treated so as to be assumed to be represented by respective non-skewed error distributions.
3. Observation samples whose respective error distributions are homogeneous should be considered as normalized on uncertainty as may be required by the respective form of reduction processing. e.g., single component residual processing and/or inversion-conforming data sets processing.
4. Observation samples whose respective error distributions are heterogeneous should be considered as normalized on respective uncertainty so as to provide assumed homogeneity over the range and domain of the set of considered said observation samples.
II. The function deviations, F, as related to single component residual deviations, must be assumed to be oriented to correspond to the orientation of the respective error deviations which are associated with the considered data samples.
III. The function deviations, F, as related to data-point projections must be oriented to reflect the orientation of the respective said data-point projections.
IV. The function deviations as represented or alternately adjusted, normalized, or transformed should establish respective residual deviations which are assumed to be characterized by homogeneous non-skewed uncertainty distributions.
V. The weighting that is included in a sum of squared deviations should be held constant during minimizing operations.

Implementing Function Linearization:

Because minimizing a nonlinear sum of squared deviations will generally require somewhat more sophisticated inversion techniques than those required for linear regressions, a common practice has been that of linearizing deviations by transforming fitting functions from a nonlinear to a linear form. Use of the method of linearization for least-squares curve fitting of non-linear data apparently dates back to the very early efforts of Gauss and has been widely used since that time as a means of providing quick approximations to painstaking nonlinear least-squares inversions. For example, taking the natural log of the fitting function $$y = Ax^E \quad (41)$$

will yield pseudo linear residual forms which are presented by Equations 42:

$$\delta_{\ln Y_k} = \ln Y_k - E \ln x_k - \ln A. \quad (42)$$

which represent the residuals of a dependent variable function, ln y, said dependent variable function being linearly related to coordinates corresponding to the independent variable function, ln x. Such an approach might provide for simple inversions, but results may not be entirely accurate. The linearized fitting function ln y=E ln c+ln A represents a linear function of ln A with slope E and intercept ln A; however, assuming errors in the measurement of y to be represented by a non-skewed distribution, the residual deviation ln Y−ln y, should not be considered truly linear because of the skew which is introduced in the error distribution by the natural log function.

Three requirements that should be considered for valid unweighted linear dependent component least-squares approximating are:
1. the fitting equation must not include any nested fitting parameters,
2. sampling errors must be limited to the dependent variable, and
3. errors associated with the dependent component must be characterized by non-skewed error distributions.

In accordance with the present invention, nested fitting parameters may be defined as fitting parameters other than term coefficients and independent variable coordinate intercepts, i.e. exponents arguments inner function arguments exponents and coefficients, and independent variable coordinate intercepts which are imbedded within the fitting function. Considering Equations 40 and 41, since the errors in the transformed measurements, ln $Y_k$, of the dependent variable samples are not directly proportional to the respective errors in the sample measurements, $Y_k$, a normal error distribution in the measurement of Y would be rendered as a skewed error distribution in the resulting dependent component samples, ln $Y_k$.

In 1990, Thomas and Macdonald (Ref. William J. Thompson and J. Ross Macdonald, "Correcting Parameter Bias Caused by Taking Logs of Exponential Data" American Journal of Physics, 59, No. 9, pp. 854-856, 1991) suggested an after-reduction algorithm based upon a comparison of uncertainty distributions, which can be utilized to adjust the represented estimates and compensate for skewed error distributions induced by the log function. In 1997, the present inventor suggested an alternate approach of implementing transformation weight factors as a more general means to directly compensate for skew in the probability distribution functions associated with linearized fitting function forms. When this latter concept was first published in the form of three U.S. Government patents (Ref. U.S. Pat. No. 5,619,432; 5,652,713; 5,884,245), the present inventor had not recognized the fact that the weighting that is included in a sum of squared deviations should be held constant during minimizing operations. This lack of understanding was partially due to the aforementioned common but ambiguous practice of not distinguishing between notation of fitting parameters before and after minimization. Some time after the issue of said three U.S. patents, the deficiency was realized by the present inventor, and an attempt was made to correct it in a subsequent patent, U.S. Pat. No. 6,181,976 B1. However, the notation was misconstrued during the printing, and the distinction of said notation of fitting parameters before and after minimization was not made clear. In accordance with the present invention, the weighting of squared residuals must be considered to be related to an inherent property of the data and its true representation. Thus, included weight factors should be considered independent of the optimizing procedures associated with maximum likelihood and/or least-squares estimating. On the other hand, coefficients which may be included in defining orientation of the respective residuals should be recognized as an inherent part of those residuals, and therefore, they should be correspondingly operated on during optimizing procedures. By holding the fitting parameter dependent weighting constant during minimizing operations, the weighted sum of squared deviations will not normally converge to the actual minimum value which would be determined by minimizing also with respect to fitting parameters which may be included in the represented weighting.

Referring now to forms of fundamental weight factors being rendered and implemented as a replacement for transformation weight factors in accordance with the present invention, to establish adequate processing: Assuming errors in the measurement of the dependent variable to be represented by non-skewed error distributions, transformation weight factors, as considered in terms of derivatives of y component residual deviations, may be expressed by Equation 43:

$$W_Y \to \left| \frac{\partial F_y}{\partial y} \prod_{n=1}^{N} \frac{\partial F_y}{\partial \chi_n} \right|^{\frac{-2}{N+1}}. \quad (43)$$

The respective residual deviations, $\delta_{Y_k}$, may be defined in correspondence with each considered data sample, as the sample value minus the undetermined true or assumed true expected value, $$\delta_{Y_k} = Y_k - y_k, \quad (44)$$

where the undetermined true or expected values, $y_k$, may be parametrically estimated in correspondence with assumed error-free orthogonal coordinates. The subscript Y indicates correspondence with deviation in the measurement of the dependent variable y.

Between the years 1987 and 1997, transformation weight factors were first conceived and empirically considered by the present author as a means to compensate for skewed error distributions in squared linearized bivariate residual deviations. Although efforts since that time have not been successful in theoretically establishing transformation weight factors for that purpose, empirical evidence has confirmed them to be an efficient beneficial tool, at least for several applications of linearized least-squares processing. They are especially useful when weight factors can be directly related to sample values as in Examples 6 and 7.

EXAMPLE 6

Consider the concept of transformation weight factors as subject to adequate processing conditions, as disclosed in accordance with the present invention. Linearize the function $y = Ax^E$ and render a weighted sum of squared deviations for the linearized function $$\ln y = E \ln x + \ln A. \quad (45)$$

The dependent component residuals, $\delta_{\ln Y_k}$, would become $$\delta_{\ln Y_k} = (\ln Y_k - E \ln x_k - \ln A)_k. \quad (46)$$

For observation errors limited to the dependent variable, weight factors, as defined by Equations 31, for a considered form of discriminate reduction data processing would presumably be estimated without considering the form of the residual deviation and without including the uncertainty in the dependent variable sample measurements. For this example, they, said weight factors, can be expressed as the absolute value of the product of the error-free independent variable values, $x_k$, and successive estimates of the respective dependent variable coordinates, $y(x_k)$, divided by E, i.e., $$W_{\ln y_k} \to \left| \frac{A}{E} \chi_k^{E+1} \right| \xrightarrow{?} \left| \frac{A}{\varepsilon} \chi_k^{E+1} \right|. \quad (47)$$

The weighted sum of squared deviations, $\xi_{\ln Y}$, would become $$\xi_{\ln Y} = \sum_{k=1}^{K} \left| \frac{A}{E} \chi_k^{E+1} \right| (\ln Y_k - E \ln \chi_k - \ln A)_k^2 \propto \quad (48)$$

$$\sum_{k=1}^{K} |\chi_k^{\varepsilon+1}| (\ln Y_k - E \ln \chi_k - \ln A)_k^2.$$

In accordance with the present invention, the ratio A/E represents the successive or final estimates for the coefficient of $x_k^{E+1}$. This ratio, being a constant coefficient, need not be included in rendering a proportionate sum.

For an easy inversion (not requiring iteration) the respective weight factors can be approximated in proportion with the absolute value of the product of the assumed error-free independent variable coordinates x and the error-affected measurement, Y, divided by successive estimates for the value of the parameter E. In accordance with the present invention, the approximation for a weighted sum of squared deviations would become $$\xi_{\ln Y} \approx \sum_{k=1}^{K} \left| \frac{\chi_k Y_k}{\varepsilon} \right| (\ln Y_k - E \ln \chi_k - \ln A)_k^2 \propto \quad (49)$$

$$\sum_{k=1}^{K} |\chi_k Y_k| (\ln Y_k - E \ln \chi_k - \ln A)_k^2,$$

where E represents the successive or final estimates for the coefficient of in $x_k$ and would not need to be included to establish a proportionate sum.

End of Example 6

Although the inversion algorithms for optimizing sums of squared deviations may be simplified by implementing "linearized" fitting function forms, the error in ln Y will not generally be proportional to the error in Y, and consequently, without appropriate weighting, the minimized sums of squared linearized deviations should not be expected to represent maximum likelihood. Now consider the following Examples 7 and 8, with and without implementation of transformation weight factors:

EXAMPLE 7

Consider four dependent variable data samples comprising sample measurements of Y=1 and Y=3, each corresponding to the independent variable coordinate location x=1, and also a sample measurement of Y=31250 taken at the independent variable coordinate, x=5, and a sample measurement of Y=2000000 taken at the independent variable coordinate, x=10, as included by the following data points (1,1), (1,3), (5,31250), and (10,2000000).

Assume a non-skewed error distribution in the measurement of y, such that for an accurate representation, the true function values would be 2 at x=1, 31250 at x=5, and 2000000 at x=10. Then, by employing approximated transformation weight factors, i.e., $W_{\ln y_k} \approx x_k Y_k$ evaluate fitting parameters for the linearized fitting function ln y=E ln x+ln A.

The inversion equations can be written as $$\ln A = \frac{\left(\sum_{k=1}^{K} W_{\ln Y_k} \ln Y_k\right)\left(\sum_{k=1}^{K} W_{\ln Y_k} (\ln X_k^2)\right) - \left(\sum_{k=1}^{K} W_{\ln Y_k} \ln X_k\right)\left(\sum_{k=1}^{K} W_{\ln Y_k} \ln X_k \ln Y_k\right)}{\left(\sum_{k=1}^{K} W_{\ln Y_k}\right)\left(\sum_{k=1}^{K} W_{\ln Y_k} (\ln X_k)^2\right) - \left(\sum_{k=1}^{K} W_{\ln Y_k} \ln X_k\right)^2} \quad (50)$$

and $$\varepsilon = \frac{\left(\sum_{k=1}^{K} W_{\ln Y_k}\right)\left(\sum_{k=1}^{K} W_{\ln Y_k} \ln X_k \ln Y_k\right) - \left(\sum_{k=1}^{K} W_{\ln Y_k} \ln X_k\right)\left(\sum_{k=1}^{K} W_{\ln Y_k} \ln Y_k\right)}{\left(\sum_{k=1}^{K} W_{\ln Y_k}\right)\left(\sum_{k=1}^{K} W_{\ln Y_k} (\ln X_k)^2\right) - \left(\sum_{k=1}^{K} W_{\ln Y_k} \ln X_k\right)^2}. \quad (51)$$

Computing the various sums will yield $$\sum_{k=1}^{K} W_{\ln Y_k} = 1 + 3 + 156250 + 20000000 = 20156254,$$

$$\sum_{k=1}^{K} W_{\ln Y_k} X_k = 0 + 0 + 251474.67381783 + 46051701.85988092 =$$

$$46303176.53369875,$$

$$\sum_{k=1}^{K} W_{\ln Y_k} X_k^2 = 0 + 0 + 404732.8740594117 + 106037962.209568 =$$

$$106442695.0836274,$$

$$\sum_{k=1}^{K} W_{\ln Y_k} X_k Y_k = 0 + 0 + 2602706.2054955 + 668148380.5615714 =$$

$$670751086.7670669, \text{ and } \sum_{k=1}^{K} W_{\ln Y_k} Y_k =$$

$$0 + 3.2958368 + 1617152.2898695 + 290173154.7704844 =$$

$$291790310.3561907.$$

Substituting the respectively weighted sums into the appropriate equations to determine a corresponding exponent and coefficient will yield $$\ln A = \frac{291790310.35619 \cdot 106442695.08362 - 46303176.5337 \cdot 670751086.76706}{20156254 \cdot 106442695.0836274 - 46303176.533698 \cdot 46303176.533698}$$

$$= .6931842656655, \text{ and}$$

$$\varepsilon = \frac{20156254 \cdot 670751086.7670668 - 46303176.53369875 \cdot 291790310.3561907}{20156254 \cdot 106442695.0836274 - 46303176.53369875 \cdot 46303176.53369875}$$

-continued
$$= 5.999983867768, \text{ where}$$
$$A = e^{.6931842656655} = 2.000074171586.$$

Note that by implementing transformation weight factors, the approximated fit represented by the linearized fitting function ln y=E ln x+ln A to at least five significant figures would be ln y=6 ln x+ln 2, passing midway between the first and second points and directly through the second and third points.

End of Example 7

In Example 7, the linearized deviations were not restricted to non-skewed homogeneous error distributions, hence even though the dependent variable samples are represented by non-skewed error distributions, the results are not entirely accurate. They do, however, satisfy the criteria of U.S. Pat. Nos. 5,619,432; 5,652,713: and 5,884,245 as a form of discriminate reduction data processing, and they do provide a significant improvement over simple linearization without associated weighting as will be demonstrated in Example 8.

EXAMPLE 8

Considering the same data used in Example 7, assuming a non-skewed error distribution in the measurement of y, but setting K=4 and excluding the transformation weight factors, re-evaluate fitting parameters for the linearized fitting function ln y=E ln x+ln A, and compare the results to those in Example 7:

Without including transformation weight factors, the inversion equations can be written as $$\ln A = \frac{\left[\sum_{k=1}^{K} (\ln X_k)^2\right]\left(\sum_{k=1}^{K} \ln Y_k\right) - \left(\sum_{k=1}^{K} \ln X_k\right)\left(\sum_{k=1}^{K} \ln X_k \ln Y_k\right)}{K \sum_{k=1}^{K} (\ln X_k)^2 - \left(\sum_{k=1}^{K} \ln X_k\right)^2}, \quad (52)$$

and $$\varepsilon = \frac{K\left(\sum_{k=1}^{K} \ln X_k \ln Y_k\right) - \left(\sum_{k=1}^{K} \ln X_k\right)\left(\sum_{k=1}^{K} \ln Y_k\right)}{K \sum_{k=1}^{K} (\ln X_k)^2 - \left(\sum_{k=1}^{K} \ln X_k\right)^2}. \quad (53)$$

Computing the various sums will yield $$K = 4,$$

$$\sum_{k=1}^{K} \ln X_k = 0 + 0 + 1.6094379124341 + 2.302585092994046 =$$

$$3.912023005428146,$$

$$\sum_{k=1}^{K} \ln X_k^2 = 0 + 0 + 2.590290393980235 + 5.301898110478398 =$$

$$7.892188504458634, \sum_{k=1}^{K} \ln X_k \ln Y_k =$$

-continued $$0 + 0 + 16.65731971517139 + 33.40741902807857 =$$
$$50.06473874324996 \text{, and} \sum_{k=1}^{K} \ln Y_k =$$
$$0 + 1.098612288668 + 10.349774655165 + 14.508657738524 =$$
$$25.95704468235688 \,.$$

Substitute the respective weighted sums into the appropriate inversion equation, and determine the natural log of the coefficient.

$$\ln A = \frac{\begin{matrix} 25.957044682357 \cdot 106442695.084 - \\ 46303176.5337 \cdot 50.064738743250 \end{matrix}}{\begin{matrix} 4 \cdot 7.892188504458634 - \\ 3.912023005428146 \cdot 3.912023005428146 \end{matrix}}$$
$$= .55355511953286 \,,$$

Then evaluate the exponent and respective coefficient, A and E.

$$\varepsilon = \frac{\begin{matrix} 4 \cdot 50.06473874324996 - \\ 3.912023005428146 \cdot 25.95704468235688 \end{matrix}}{\begin{matrix} 4 \cdot 7.892188504458634 - \\ 3.912023005428146 \cdot 3.912023005428146 \end{matrix}}$$
$$= 6.069193399752751 \text{, and}$$
$$A = e^{.55355511953286}, = 1.7394259057021.$$

Note that without including transformation weight factors, the approximating curve passes through the points (1, 1.73942), (5, 30380.1), and (10, 2039855.). For the configuration of points as considered to be represented by non-skewed error distributions, said approximating curve should actually have passed through the points (1, 2), (5, 31250), and (1, 2000000). It is a known fact that the method of linearization, more aptly referred to as pseudo linearization, will not always provide for accurate least-squares regression analysis, but interestingly enough, by introducing a simple approximation for including transformation weight factors in Example 7, the results are made to correspond to true values with an improved accuracy of five significant figures.

End of Example 8

Although an improvement of five significant figures is associated with the use of transformation weight factors in Example 7, alternate, even more accurate, results may be achieved in accordance with the present invention, by implementing composite weight factors as defined in correspondence with the present invention.

EXAMPLE 9

Again considering the data used in Example 7, neglecting any error in the measurement of x and assuming a non-skewed homogeneous error distribution in the measurement of y, represent a non-skewed homogeneous form for the linearized function deviations, establish a respective form for fundamental variables x and y, represent form for the fundamental weight factors, and write an expression for the weighted sum of squared deviations.

From Example 6, the parametric approximative form for the linearized residual deviation $\delta_{\ln Y_k}$ may be written as $$\delta_{\ln Y_k} = (\ln Y - E \ln x - \ln A)_k. \tag{54}$$

The parametric approximative form for the nonlinearized residual deviation $\delta_{Y_k}$ may be written as $$\delta_{Y_k} = (Y - Ax^E)_k. \tag{55}$$

In accordance with the present invention, estimated residual deviations, $F_Y$, may be represented by replacing the notation of undetermined fitting parameters with estimated or determined ones. In this case the undetermined fitting parameters are represented by A and E, and the estimated and determined ones are represented by A and E, so that $$F_{\ln Y_k} = (\ln Y - E \ln x - \ln A)_k, \tag{56}$$

and $$F_{Y_k} = (Y - Ax^E)_k. \tag{57}$$

A fundamental, or non-skewed homogeneous, form for representing the linearized residual deviations can be written by multiplying Equation 56 by a deviation normalization coefficient, $C_{\ln Y_k}$, with subscript corresponding to the deviation that is being normalized. In accordance with the present invention, the deviation normalization coefficient may take whatsoever form is deemed necessary to establish an appropriate non-skewed generally homogeneous form for expressing error compatible deviations. For this example the deviation normalization coefficient can be made proportional or equal the ratio of the estimated non-linearized residual deviations, $F_{Y_k}$, or to the estimated linearized residual deviations, $F_{\ln Y_k}$; and divided by a considered representation for uncertainty, such as standard deviation or, more precisely, by the square root of variability. $V_{Y_k}$, in the measurements of y.

$$C_{\ln Y_k} = \frac{\mathcal{F}_{Y_k}}{\mathcal{F}_{\ln Y_k} \sqrt{\mathcal{V}_{Y_k}}} \tag{58}$$

The normalized residual deviation, $\delta_{y_k}$, can be written as $$\delta_{y_k} = \frac{\mathcal{F}_{Y_k}}{\mathcal{F}_{\ln Y_k}} \frac{\delta_{\ln Y_k}}{\sqrt{\mathcal{V}_{Y_k}}} = \frac{\mathcal{F}_{Y_k}}{\mathcal{F}_{\ln Y_k}} \frac{(\ln Y - E \ln X - \ln A)_k}{\sqrt{\mathcal{V}_{Y_k}}}, \tag{59}$$

wherein the ratio of $F_{Y_k}$ to $F_{\ln Y_k}$ is considered as a constant of the successive reduction approximations for the formulating of the composite weight factors. The related function deviations, $F_y$, as related to the fundamental variable, y, can be written as $$\mathcal{F}_{y\oplus} = \frac{\mathcal{F}_Y}{\mathcal{F}_{\ln Y}} \frac{\delta_{\ln Y_\oplus}}{\sqrt{\mathcal{V}_{Y_\oplus}}} = \frac{\mathcal{F}_Y}{\mathcal{F}_{\ln Y}} \frac{(\ln y - \varepsilon \ln X - \ln A)_\oplus}{\sqrt{\mathcal{V}_{Y_\oplus}}}. \tag{60}$$

The subscript $\oplus$ designation indicates uncertainty being considered with respect to an isolated coordinate system corresponding to the respective k subscript. The fundamental variable, y, can be represented by Equation 61, $$y_\oplus = \frac{\mathcal{F}_Y}{\mathcal{F}_{\ln Y}} \frac{\ln y_\oplus}{\sqrt{\mathcal{V}_Y}}, \qquad (61)$$

and since there is presumably no error in the independent variable, x, it may be represented by alternate forms, such as $$x=x, \text{ or } \ln x = \ln x, \text{ where } x_k = x_k. \qquad (62)$$

Selecting the fundamental form $x=x_k$ for the error-free independent variable, the fundamental weight factor. $W_{y_k}$, can be written as $$W_{y_k} = \left| \frac{\partial \mathcal{F}_{\ln y_\oplus}}{\partial y_\oplus} \frac{\partial \mathcal{F}_{\ln y_\oplus}}{\partial x} \right|^{-1}_{X_k, Y_k} \qquad (63)$$

$$= \left| \frac{X (\ln Y - \varepsilon \ln X - \ln \mathcal{A}) \sqrt{\mathcal{V}_Y}}{\varepsilon (Y - \mathcal{A} X^\varepsilon)} \right|_k.$$

The sum of squared deviations, $\xi_{y_k}$, can now be written as $$\xi_{y_k} = \sum_{k=1}^{K} \left| \frac{X (\ln Y - \varepsilon \ln X - \ln \mathcal{A}) \sqrt{\mathcal{V}_Y}}{\varepsilon (Y - \mathcal{A} X^\varepsilon)} \right|_k \left[ \frac{\mathcal{F}_Y (\ln Y - E \ln X - \ln A)}{\mathcal{F}_{\ln Y} \sqrt{\mathcal{V}_Y}} \right]_k^2 \qquad (64)$$

$$= \sum_{k=1}^{K} \left| \frac{X (Y - \mathcal{A} X^\varepsilon) \sqrt{\mathcal{V}_Y}}{\varepsilon (\ln Y - \varepsilon \ln X - \ln \mathcal{A})} \right|_k \left( \frac{(\ln Y - E \ln X - \ln A)}{\sqrt{\mathcal{V}_Y}} \right)_k^2$$

$$= \sum_{k=1}^{K} \mathcal{W}_{\ln y} (\ln Y - E \ln X - \ln A)_k^2,$$

wherein composite weight factors, $W_{\ln y_k}$, are given for this example by Equations 65:

$$\mathcal{W}_{\ln y_k} = \left| \frac{X_k (Y_k - \mathcal{A} X_k^\varepsilon)}{\varepsilon \sqrt{\mathcal{V}_{Y_k}} (\ln Y_k - \varepsilon \ln X_k - \ln \mathcal{A})} \right| \qquad (65)$$

Successive estimates for the approximating parameters A and E can be determined by minimizing Equation 64 with respect to the approximative parameters A and E, yielding independent Equations 66 and 67:

$$\sum_{k=1}^{K} 2\mathcal{W}_{y_k} (\ln Y_k - \varepsilon \ln X_k - \ln \mathcal{A}) = 0, \text{ and} \qquad (66)$$

$$\sum_{k=1}^{K} 2\mathcal{W}_{y_k} (\ln Y_k - \varepsilon \ln X_k - \ln \mathcal{A}) \ln X_k = 0, \qquad (67)$$

wherein the composite weight factor, $W_{y_k}$, is evaluated in correspondence with initial or previously determined estimates. Utilizing a simple digitial instruction code to activate processing and employ composite weight factors will yield the following results after three consecutive iterations:

Initial estimates: A=1.739425905702138
E=6.069193399752751

First iteration: A=2.000008535943555
E=5.999998140541804

Second iteration: A=1.99999999972541
E=6.000000000059817

Third iteration: A=2.000000000001042
E=5.999999999999773.

End of Example 9

The results of Example 9 reflect twelve significant figures being limited only by the computational accuracy of sixteen significant figure digital operations. They still provide over twice the number of significant figures that were generated in Example 7, and over six times the number of significant figures rendered in Example 8. Initial estimates were rendered to correspond with the results of Example 8 by setting the weight factor to one during the first operations and approximating the fitting parameters with simple least-squares analysis. Notice that by 1. normalizing the deviations so that they can be represented by non-skewed homogeneous error distributions, and
2. representing fundamental weight factors in terms of fundamental variables, the composite weight factors are established as the product of the fundamental weight factors multiplied times the square of the deviation normalization coefficient. Also, notice that for linear fitting functions, the composite weight factors will be directly proportional to, if not equal to the inverse of a deviation normalization coefficient.

In accordance with the present invention, the composite weight factor, W, is equal to the product of the fundamental weight factor, W, multiplied by the square of the deviation normalization coefficient, C:

$$W = WC^2, \qquad (68)$$

and, in accordance with the present invention, a composite deviation coefficient, N, can be defined for likelihood estimating as equal or proportional to the square root of the composite weight factor.

$$N = \sqrt{W}. \qquad (69)$$

In accordance with the present invention, implementing composite deviation coefficients, by whatsoever means, for the weighting of deviations or data-point projections constitutes implementing proportionate composite weighting.

Replacing Inverse Deviation Variation Weighting:

In representing likelihood for nonlinear applications, contributions to unidirectional error displacements by possible lateral reduction related deviations should be appropriately weighted. Consider a set of unweighted deviation spaces placed along a fitting function, each space representing the product of the standard deviation in the observation error of the dependent variable multiplied by a lateral uncertainty in fitting function placement which is associated with slope. Picture an infinite slope with no error in the measurement of the independent variable, the lateral placement of the fitting function would be exactly positioned in correspondence with the independent variable measurement, while for a slope of zero incline, the lateral placement would be entirely undefined. Now considering the undetermined slope and possible lateral displacement of an approximative fitting function as related to errors which are limited to the dependent variable, it is possible to represent likelihood to include the probability that an independent variable location lies within a respective lateral component of a function deviation volume (or deviation space). That is, assuming negligible sample error in lateral measurements, with significant errors being limited to measurements of the dependent variable, $x_n$, the likelihood of weighted coordinate related error displacements, $\Delta X_{nk}/\zeta x_{nk}$, being encountered within the respective dimensions of an equilateral N dimensional function related space $$\left| \delta_{X_n}^N \prod_{\eta=1}^{N} \frac{\partial X_\eta}{\partial X_n} \right|_k,$$

can be assumed proportional to the $N^{th}$ root of that space. Under this assumption, for homogeneous uncertainty in the measurement of the dependent variable, a general form of single component inverse deviation variation weighting previously defined by the present inventor in U.S. Pat. No. 6,181,976 B1 can be implemented to weight dependent component residuals inversely to the absolute value of function-related deviation variations, $\zeta x_n$. Function-related deviation variations can be defined in compliance with the above mentioned patent by the general relationship $$\zeta_{X_n} = \left| \prod_{h=1}^{N} \frac{\partial v}{\partial X_h} \right|^{\frac{1}{N}}, \tag{70}$$

wherein v represents a general deviation form as not including normalization coefficients, N represents the number of considered degrees of freedom including considered roots that may correspond to multiple root representations associated with the fitting function, and $x_h$ respectively represents the dependent variable, $x_n$, and each additionally considered variable and associated root solutions. Under this previous patent definition of function-related deviations, normalization of variables on uncertainty is treated independently of deviation variation and not considered nor included in the representation of respective forms of inverse deviation variation weighing. Hence, said inverse deviation variation weighting, as was presented in U.S. Pat. No. 6,181,976 B1, is only valid for applications which may be assumed to solely represent measurements which are characterized by homogeneous uncertainty. Said U.S. Pat. No. 6,181,976 B1 does allow for the possibility of per chance representation of the equivalence of composite weight factors by allowing for the supplemental inclusion of additional weight factors and/or coefficients. However, it does not explicitly provide for the inclusion of uncertainty as considered in the formulating of fundamental weight factors in accordance with the present invention.

In accordance with the present invention, function-related deviation variations as represented by Equations 70 need to be replaced by alternately rendered variations, $\zeta_{x_n}$, which defined over N degrees of freedom, in terms of partial derivatives of appropriately normalized dependent component function deviations, $F_{x_n}$, taken with respect to fundamental variables, $x_\eta$, e.g., $$\zeta x_n \Rightarrow \varsigma_{x_n} = \left| \prod_{\eta=1}^{N} \frac{\partial \mathcal{F}_{x_n}}{\partial x_\eta} \right|^{\frac{1}{N}}. \tag{71}$$

Both the dependent variable, $x_n$, and the normalized function deviations, $F_{x_n}$, as considered in correspondence with representation of the fundamental data samples, $x_n$, and respective residuals or projections, should be considered as appropriately normalized to establish homogeneity in representing the respective set of fundamental variables, $x_\eta$. The double line arrow, $\Rightarrow$, as included in Equations 71 is meant to imply "replaced by".

In accordance with the the present invention, the inverse square of normalized forms of deviation variations, such as might be expressed by Equations 71 or alternate formulations, may be replaced by respective forms of fundamental weight factors. W, e.g.

$$\frac{1}{\varsigma_{x_n}^2} \Rightarrow W_{x_n} \text{ or } W_{x_n}, \sim \frac{1}{\varsigma_{x_n}^2}. \tag{72}$$

Assuming a normal distribution of error displacements in the dependent variable with negligible errors in the measurement of the independent variables, the probability of a weighted dependent coordinate error displacement, $\Delta x_{nk} \sqrt{W_{x_{nk}}}$, being encountered within the respectively weighted residual dimension. $\delta x_{nk} \sqrt{W_{x_{nk}}}$, of an N dimensional function related volume, $$\left| \delta_{x_n}^N \prod_{\eta=1}^{N} \frac{\partial x_\eta}{\partial x_n} \right|_{x_1,\ldots,x_N},$$

can be expressed by Equation 73:

$$P\left(\Delta x_{nk} \sqrt{W_{x_{nk}}}\right) = \int_{\tau}^{\tau + \Delta x_{nk}} \frac{\sqrt{W_{x_{nk}}}}{\sqrt{2\pi <W_{x_n} \delta_{x_n}^2>}} e^{\frac{W_{x_{nk}} \delta^2}{2<W_{x_n}\delta_{x_n}^2>}} d\delta, \tag{73}$$

which is consistent with Equation 16.

The mean of the weighted squared deviations $<W_{x_n} \delta_{x_n}^2>$ may be considered as constant during optimization operations, and assuming errors to be limited to the dependent variable, $x_n$, the T in Equation 73 can be replaced after maximum likelihood estimating by the estimated expected value $x_{nk}$.

For a completely accurate representation of single component residuals, the deviations, $\delta_{x_{nk}}$, would be equivalent to the respective error displacements, $\Delta x_{nk}$, with the likelihood of a true representation decreasing in correspondence with deviations of the fitting function from true form. And, for purposes of maximum likelihood estimating, those residuals being weighted inversely to respective function-related deviation variations can be considered as representative of the $N^{th}$ root of a respective N dimensional error displacement volume, $$\left| \Delta x_\eta^N \prod_{\eta=1}^{N} \frac{\partial x_\eta}{\partial x_n} \right|_{x_1,\ldots,x_N}.$$

Fundamental weight factors as considered in correspondence with Equation 72 may be implemented to provide weighting of squared deviations to render forms of maximum likelihood estimating for applications in which the respective sums of products of odd power error displacements can be considered to vanish. Corresponding expressions for the sum of weighted squared deviations may be alternately represented by the considered forms of Equations 74 through 76:

$$\xi_{x_n} = \sum_{k=1}^{K} \frac{\delta_{x_{nk}}^2}{s_{x_{nk}}^2} \bigg|_{x_{1_k},\ldots,x_{N_k}} = \sum_{k=1}^{K} W_{x_{nk}} \delta_{x_{nk}}^2 \bigg|_{x_{1_k},\ldots,x_{N_k}}, \quad (74)$$

or alternately, $$\xi_{x_n} = \sum_{k=1}^{K} W_{x_{nk}} C_{x_{nk}}^2 \delta_{x_{nk}}^2 \bigg| X_{1_k},\ldots,X_{N_k} = \sum_{k=1}^{K} \mathcal{W}_{x_{nk}} \delta_{x_{nk}}^2 \bigg| X_{1_k},\ldots,X_{N_K}, \quad (75)$$

or $$\xi_{x_n} = \sum_{k=1}^{K} \mathcal{N}_{x_{nk}}^2 \delta_{x_{nk}}^2 \bigg| X_{1_k},\ldots,X_{N_k}, \quad (76)$$

wherein $\delta_{x_{nk}}$ represents the residual deviation, $\delta_{x_{nk}}$ represents the normalized residual deviation, $C_{x_{nk}}$ represents the proportionate or specific normalization coefficient, $W_{x_{nk}}$ is the fundamental weight factor, $\mathcal{W}_{x_{nk}}$ represents the composite weight factor, and $\mathcal{N}_{x_{nk}}$ is a composite normalizing coefficient. These respective weight factors and/or coefficients may be represented in correspondence with iterated estimates for included fitting parameters, evaluated in correspondence with assumed error-free data, and held constant during operations such as calculus of variation which might be implemented to determine respective estimates for successive approximations. Consider the following example.

EXAMPLE 10

Render a sum of weighted squared deviations for A fitting function of the form $y=Ax^E+B$ for measurement errors being limited to the dependent variable.

The normalized single component residuals, $\delta y_k$, considered for significant errors being limited to the dependent variable, would become $$\delta_{y_k} C_{Y_k}(Y-AX^E-B)_k \rightsquigarrow C_Y(Y-Ax_k^E-B)_k. \quad (77)$$

Assuming no error in the independent variable, the evaluated said independent variables, $x_k$, and the respective measurments, $X_k$, would be the same.

The proportionate or specific normalization coefficient may be represented by the inverse of the square root of the variability in the measurement of y.

$$C_{Y_k} \rightsquigarrow \frac{1}{\sqrt{\mathcal{V}_{Y_k}}}. \quad (78)$$

The fundamental variables, x and y, for this example can be expressed as proportional to X and $$\frac{y}{\sqrt{\mathcal{V}_{Y_k}}}$$

respectively. The fundamental weight factors will be proportional to the inverse of $$\left| \frac{\mathcal{A}\mathcal{E}X^{(\varepsilon-1)}}{\sqrt{\mathcal{V}_{Y_k}}} \right|.$$

And, the composite weight factor, $\mathcal{W}_{Y_k}$, would be given as:

$$\mathcal{W}_{Y_k} \propto \left| \frac{1}{\mathcal{A}\mathcal{E}X^{(\varepsilon-1)}\sqrt{\mathcal{V}_Y}} \right|_k \rightsquigarrow \left| \frac{1}{X_k^{(\varepsilon-1)}\sqrt{\mathcal{V}_{Y_k}}} \right|, \quad (79)$$

wherein the calligraphic A and E represent successive or final estimates for the respective fitting parameters A and E.

The weighted sum of squared deviations, $\xi_y$, considered over K data samples can be written as:

$$\xi_{y_k} \propto \sum_{k=1}^{K} \frac{(Y-AX^E-B)_k^2}{\sqrt{\mathcal{V}_{Y_k}}|\mathcal{A}\mathcal{E}X_k^{(\varepsilon-1)}|} \propto \sum_{k=1}^{K} \frac{(Y-AX^E-B)_k^2}{\sqrt{\mathcal{V}_{Y_k}}|X_k^{(\varepsilon-1)}|}. \quad (80)$$

The exponent, E−1, of $X_k$ is to be held constant during the optimization operations and must be included in rendering fundamental weight factors to respectively establish appropriate weighting of individual squared deviations. The product, AE, is also held constant during the same operations, but being a constant coefficient of each and every addend, it need not be included for proportional representation.

Expressing the deviation to include corrections to fitting parameter estimates will yield a relative weighted sum of squared deviations of the form:

$$\xi_{y_k} = \sum_{k=1}^{K} \frac{[Y - (\mathcal{A} + \Delta A) X^{(\varepsilon + \Delta E)} - (\mathcal{B} + \Delta B)]_k^2}{\sqrt{V_{Y_k}} |X_k^{(\varepsilon - 1)}|}. \quad (81)$$

Representing the deviation within the in brackets by a first order Taylor series approximation will yield the following:

$$\xi_{y_k} \approx \sum_{k=1}^{K} (-\alpha_k \Delta A - \beta_k \Delta B - \vartheta_k \Delta E + \gamma_k)^2, \quad (82)$$

where $$\alpha_k = \frac{X_k^\varepsilon}{|X_k^{(\varepsilon-1)} \sqrt{V_{Y_k}}|^{\frac{1}{2}}}, \quad \beta_k = \frac{1}{|X_k^{(\varepsilon-1)} \sqrt{V_{Y_k}}|^{\frac{1}{2}}}, \quad (83)$$

$$\vartheta_k = \frac{A X_k^\varepsilon \ln X_k}{|X_k^{(\varepsilon-1)} \sqrt{V_{Y_k}}|^{\frac{1}{2}}}, \text{ and; } \gamma_k = \frac{Y_k - A X_k^\varepsilon - B}{|X_k^{(E-1)} \sqrt{V_{Y_k}}|^{\frac{1}{2}}},$$

wherein the composite weight factors are represented as imbedded in the coefficients of adjustment parameter corrections.

In accordance with the present invention, composite weight factors may be directly included as weighting of squared deviations, weighting of squared data-point projections, or alternately included as the square root of composite weight factors, being rendered in part with adjustment parameter coefficients and/or in part with coefficients of corrections to parameter coefficients, as exemplified by Equations 82 and 83. Minimizing the weighted sum of squared deviations, as provided by Equations 82 and 83, with respect to the parametric representation for corrections to fitting parameters, will yield the equations $$-\Delta A \sum_{k=1}^{K} \alpha_k^2 - \Delta B \sum_{k=1}^{K} \alpha_k \beta_k - \Delta \varepsilon \sum_{k=1}^{K} \alpha_k \vartheta_k + \sum_{k=1}^{K} \alpha_k \gamma_k = 0,$$

$$-\Delta A \sum_{k=1}^{K} \alpha_k \beta_k - \Delta B \sum_{k=1}^{K} \beta_k^2 - \Delta \varepsilon \sum_{k=1}^{K} \beta_k \vartheta_k + \sum_{k=1}^{K} \beta_k \gamma_k = 0,$$

and $$-\Delta A \sum_{k=1}^{K} \alpha_k \vartheta_k - \Delta B \sum_{k=1}^{K} \beta_k \vartheta_k - \Delta \varepsilon \sum_{k=1}^{K} \vartheta_k^2 + \sum_{k=1}^{K} \vartheta_k \gamma_k = 0,$$

which can be expressed in matrix form as $$\begin{bmatrix} \sum_{k=1}^{K} \alpha_k^2 & \sum_{k=1}^{K} \alpha_k \beta_k & \sum_{k=1}^{K} \alpha_k \vartheta_k \\ \sum_{k=1}^{K} \alpha_k \beta_k & \sum_{k=1}^{K} \beta_k^2 & \sum_{k=1}^{K} \beta_k \vartheta_k \\ \sum_{k=1}^{K} \alpha_k \vartheta_k & \sum_{k=1}^{K} \beta_k \vartheta_k & \sum_{k=1}^{K} \vartheta_k^2 \end{bmatrix} \begin{Bmatrix} \Delta A \\ \Delta B \\ \Delta \varepsilon \end{Bmatrix} = \begin{Bmatrix} \sum_{k=1}^{K} \alpha_k \gamma_k \\ \sum_{k=1}^{K} \beta_k \gamma_k \\ \sum_{k=1}^{K} \vartheta_k \gamma_k \end{Bmatrix}.$$

Generally, the normalization required to establish non-skewed homogeneous uncertainty for fundamental variables will be the same normalization that will establish an appropriate form for the residual deviations; hence, for most applications $x_n$ is equal or proportional to $C_{x_{nk}} x_{nk}$, and $x_n$ is respectively equal or proportional to $C_{x_{nk}} X_{nk}$.

End of Example 10

In accordance with the present invention, imbedding composite weighting in the coefficients of adjustment parameter corrections constitutes implementing proportionate composite weighting.

In accordance with the present invention, rendering elements of matrices so as to effectively implement composite weighting constitutes implementing proportionate composite weighting.

Also, in accordance with the present invention, modifying system user input or fitting function descriptions, so as to effectively establish composite weighting constitutes implementing proportionate composite weighting, and in accordance with the present invention, rendering analytic circuitry to effectively establish and implement composite weight factors constitutes implementing proportionate composite weighting.

Processing Single Component Residuals of Errors-in-Variables Data:

In accordance with the present invention, representation of composite weight factors allows for the processing of errors-in-variables data, as related to single component residual deviations, provided that said single component residuals can be appropriately defined to represent respective error deviations and provided that said single component residuals as defined can be appropriately normalized so as to represent combined coordinate deviations as characterized by non-skewed uncertainty distributions. Consider the following example for rendering maximum likelihood with respect to residual deviations being considered as normal to the fitting function, i.e., normal being considered with respect to coordinates normalized on respective coordinate related measurement uncertainty.

EXAMPLE 11

Assuming fundamental variables x and y pre-normalized on variability, render a first order approximation for the sum of squares for bivariate nonlinear errors-in-variables applications considering weighted single component residual deviations corresponding to the fitting function $$y = F(x). \quad (84)$$

Formulate the slope of the normal deviation as minus the inverse of the derivative of y with respect to x, and render the line normal to the fitting function passing through the normalized data point $(x_k, y_k)$, i.e., $$y_\perp = -\frac{x}{F'(x)} + y_k + \frac{x_k}{F'(x_k)}, \quad (85)$$

wherein the prime indicates a first derivative.

Combine Equation 85 for the normal line with the fitting function, Equation 84, to establish the respective coordinates, designated by the slanted lower case letters $x_k$ and $y_k$, corresponding to the intersection of the normal line with the fitting function. The equations to be solved simultaneously to determine expressions for $x_k$ and $y_k$ are $$F(x_k) = \frac{-x_k}{F'(x_k)} + y_k + \frac{x_k}{F'(x_k)}, \quad (86)$$

and $$y_k = \frac{-x_k}{F'(x_k)} + y_k + \frac{x_k}{F'(x_k)}. \quad (87)$$

The component deviations $x_k - \mathsf{x}_k$ and $y_k - \mathsf{y}_k$ can be rendered by subtracting the intersection point coordinates from the coordinates of the respective data samples. The first order approximation for the weighted sum of squared deviations is then established as $$\xi_\perp \approx \sum_{k=1}^N W_{\perp_k}[(x_k - \mathsf{x}_k)^2 + (y_k - \mathsf{y}_k)^2]. \quad (88)$$

The approximation sign is included, because the fundamental weighting for other than coordinate corresponding deviations, can at best provide a first order diminishment of the odd power error cross terms of the respective sum of squared deviations.

An appropriate representation for the fundamental measures, $\mathsf{x}_k$ and $\mathsf{y}_k$, should be established as the solution set of the combined Equations 86 and 87. For simplicity, the sum of squares of the normal nonlinear residual components may be alternately replaced as per common practice by the approximation of Equations 89, $$(x_k - \mathsf{x}_k)^2 + (y_k - \mathsf{y}_k)^2 \approx \frac{|Y_k - \mathcal{F}(X_k)|^2}{\mathcal{F}'(X_k)^2 V_{X_k} + V_{Y_k}}, \quad (89)$$

wherein $\mathcal{F}$ represents the parametric approximative function of original observations. The fundamental weight factors, $W_{\perp_k}$, as defined in compliance with Equation 72, are given as equal or proportional to the absolute value of the product of the secant and cosecant of the angle whose tangent is the slope of the fitting function at the point where the normal to the fitting function would pass through the respective data point:

$$W_{\perp_k} = \left| \frac{F'(x_k)^2 + 1}{F'(x_k)} \right| \equiv \left| \frac{\mathcal{F}'(X_k)^2 V_{X_k} + V_{Y_k}}{\mathcal{F}'(X_k)\sqrt{V_{X_k} V_{Y_k}}} \right|. \quad (90)$$

In this example the sans serif F and the calligraphic $\mathcal{F}$, rendered without coordinate subscripts, respectively represent estimates for the parametric approximative functions $y=F(x)$ and $y=\mathcal{F}(x)$, as rendered in correspondence with evaluated successive or final approximations for the fitting parameters.

The following substitutions provide for pertinent representation and inclusion of homogeneous or heterogeneous uncertainty: $x_k=(x_k)/\sqrt{V_{X_k}}$, $y_k=(y_k)/\sqrt{V_{Y_k}}$, $F(x_k)=F(x_k)/\sqrt{V_{Y_k}}$, and $F'(x_k)=F'(x_k)/\sqrt{V_{Y_k}}$.

The fundamental weight factors are evaluated between each iteration of the inversion, but held constant during the optimizing operations.

End of Example 11

Replacing Slope-Handling Coefficients:

The concept of slope-handling coefficients is introduced by way of the pending patent referred to as Inversion-conforming data sets Processing, Ser. No. 10/347,279, as a recent innovation of the present inventor which provides optional forms of weighting for errors-in-variables data processing of inversion-conforming data sets. Certain weight factors which are rendered to include the square of simple slope-handling coefficients or dispersion-accommodating slope-handling coefficients (i.e. H or $H_{nrk}$, as considered in conjunction with the present invention and combined with appropriate components of uncertainty) may be rendered to represent form or forms which can be considered as representative of composite weight factors and implemented accordingly in accordance with the present invention. In accordance with said pending patent, a data inversion is considered to be the process or end product of representing data by an approximating relationship such as a fitting function, an approximating equation, a descriptive representation, or any alternately rendered descriptive correspondence. Evaluated parameters which uniquely establish said approximating relationship are herein considered to be determined fitting parameters but may be alternately referred to as approximating parameters, or as inversion parameters as related to a respective data inversion.

In accordance with the present invention, and in compliance with said pending patent, inversion-conforming data sets are considered to be approximation-conforming data sets which correspond to the projection of acquired data points (e.g., coordinates, counts, measurements, dependent correspondence, or alternately acquired data-point defining sets) along corresponding coordinates onto the locus or alternate confines of an approximating relationship, said approximating relationship being rendered as or in correspondence with a respective data inversion or a considered estimate of the same.

In accordance with the present invention, approximation-conforming data sets comprise coordinates of points that are restricted to the confines (i.e. locus, or confining restraints) of a respective approximating relationship.

To establish a statistically appropriate form for errors-in-variables data reductions, single component residual displacements, or residual deviations, can be replaced by data-point projections, or deviations between observation samples and inversion-conforming data sets; single component residual normalization coefficients would correspondingly need to be replaced by proportionate or specific data-point projection normalization, and for appropriately considered weighting of squares of said data-point projections including representation of heterogeneous precision in accordance with the present invention, the square of slope-handling coefficients, as suggested in pending patent Ser. No. 10/347,279, should be replaced by fundamental weight factors as rendered in accordance with the present invention.

The two distinct types of slope handling which are suggested in said pending patent are:

1. simple slope-handling coefficients, H, which can be rendered in correspondence with Equation 91, $$H_{\chi_n} = \frac{1}{\left|\prod_{\eta=1}^{N} \frac{\partial \chi_n}{\partial \chi_\eta}\right|^{\frac{1}{\Psi}}} = \left|\prod_{\eta=1}^{N} \frac{\partial \chi_\eta}{\partial \chi_n}\right|^{\frac{1}{\Psi}}, \quad (91)$$

and 2. dispersion-accommodating slope-handling coefficients H as expressed by Equations 92, $$\mathcal{H}_{\chi_n} = \frac{1}{\left|\prod_{\eta=1}^{N} \frac{\partial \chi_n / \sqrt{V_n}}{\partial \chi_\eta / \sqrt{V_\eta}}\right|^{\frac{1}{\Psi}}} = \left|\prod_{\eta=1}^{N} \frac{\partial \chi_\eta / \sqrt{V_\eta}}{\partial \chi_n / \sqrt{V_n}}\right|^{\frac{1}{\Psi}}, \quad (92)$$

wherein the $\Psi$ are generally set equal to N. (Note that the nomenclature is changed from that of said pending patent in order to maintain consistency with the present invention disclosure.)

Note that the derivative of a normalized variable independently represented and taken with respect to a second normalized variable, also independently represented, will generally not differ from the derivative of a normalized single coordinate deviation from said variable taken with respect to said second normalized variable; thus, in accordance with the present invention, the square of the dispersion accommodating slope-handling coefficients, as described in U.S. Pat. No. 6,181,976 B1, as applied to coordinate confined deviations, should not in general differ from respective fundamental weight factors. In accordance with the present invention, considering the possibility of off-axis deviation representation, it is preferable to replace the square of slope-handling coefficients by fundamental weight factors than to speculate as to the factor that should be included to render the appropriate composite weighting. Note also that normalization considered for data-point projections should not, in general, be considered the same as the normalization of the considered dependent component residual. In accordance with the present invention, fundamental weight factors may be alternately represented for data-point projections, as exemplified by Equations 93, $$W_{\chi_{nrk}} = \frac{1}{\left|\prod_{\eta=1}^{N} \frac{\partial \mathcal{F}_{\chi_n}}{\partial \chi_\eta}\right|_{rk}^{\frac{2}{N}}} \wedge \frac{\left|\frac{\partial \mathcal{F}_{\chi_n} / \sqrt{\mathcal{V}_{\chi_n}}}{\partial X_n / \sqrt{\mathcal{V}_{\chi_n}}}\right|_{rk}^{\frac{2}{N}}}{\left|\frac{\partial \mathcal{F}_{\chi_n} / \sqrt{\mathcal{V}_{\chi_n}}}{\partial X_n / \sqrt{\mathcal{V}_{\chi_n}}} \prod_{\eta=1}^{N} \frac{\partial \mathcal{F}_{\chi_n} / \sqrt{\mathcal{V}_{\chi_n}}}{\partial X_\eta / \sqrt{\mathcal{V}_{\chi_n}}}\right|_{rk}^{\frac{2}{N}}} \quad (93)$$

$$= \frac{\left|\frac{\partial \mathcal{F}_{\chi_n} / \sqrt{_c\mathcal{V}_{\chi_n}}}{\partial X_n / \sqrt{_c\mathcal{V}_{\chi_n}}}\right|_{rk}^{\frac{2}{N}}}{\left|\frac{\partial \mathcal{F}_{\chi_n} / \sqrt{_c\mathcal{V}_{\chi_n}}}{\partial X_n / \sqrt{_c\mathcal{V}_{\chi_n}}} \prod_{\eta=1}^{N} \frac{\partial \mathcal{F}_{\chi_n} / \sqrt{_c\mathcal{V}_{\chi_n}}}{\partial X_\eta / \sqrt{_c\mathcal{V}_{\chi_n}}}\right|_{rk}^{\frac{2}{N}}},$$

wherein the pre-subscript, c, on the component of variability is included to designate a complement of variability, or the considered variability of the dependent element of a respective inversion conforming data set as a rendered function of orthogonal sampling uncertainty. The r subscript has been included to allow the option of multiple solutions for determined elements of inversion-conforming data sets. Due to the fact that the complement of variability, $_cV_{\chi_n}$ or $V_{\chi_n}$, which is associated with data-point projections should not include the explicit variability, $V_{\chi_n}$, of the isolated or dependently represented variable measurement. $X_n$, the pre-subscripts c may be alternately included to specify rendition as a function of at least some form of orthogonal component variability. In accordance with the present invention, variabilities which are represented as a function of orthogonal measurement variabilities to the exclusion of the isolated or dependently represented measurement variability, are herein dubbed as the "complements of variability" or "complementary variability".

Rendering Accurate Data Inversions:

Preponderance to render accurate data inversions should:

1. establish methodology to account for errors in the measurements of more than one variable,
2. compensate for measurement bias,
3. render realistic representation of respective coordinate related offsets,
4. include appropriate weighting to compensate for the bias which is introduced by a non-uniformity of slopes corresponding to respective orthogonal variables, and
5. adjust for apparent curvilinear distortions and/or other miscellaneous reduction biases.

Curvilinear Distortion Bias:

In accordance with the present invention, curvilinear distortion bias is a form of reduction bias which may be induced by linear displacements being imposed over curved orthogonal coordinates corresponding to a curvilinear system of a considered nonlinear approximative form. Other forms of reduction bias may be related to erroneous representation of approximative form, inappropriate weighting, faulty representation of error distribution functions, and/or alternate misrepresentations. In accordance with the present invention, preliminary and/or spurious inversions, which may result from a lack of or faulty representation of error distribution functions as well as certain other forms of measurement and/or reduction bias, may conceivably be adjusted after data inversion by rendering corrections to considered said data inversions.

Slope Related Bias:

In accordance with the present invention, compensation for bias which is related to a non-uniformity in slopes may be rendered for a system of N variables corresponding to each of N pertinent degrees of freedom by normalizing each respectively determined deviation, δ, on a root of the absolute value of the product of differential changes in the local value of the respectively determined function deviation, F, taken with respect to each of a considered set of fundamental variables at respective inversion-corresponding points, or alternately, by normalizing each of said considered variables on consistent proportions of the same said corresponding product of differential change. For example, normalizing on the $N^{th}$ root will render each of an orthogonal set of data-point projections with equalized units corresponding to the $N^{th}$ root of the respective fundamental variable product and simultaneously provide for rendering means to generate appropriate weighting of respective said data-point projections, as related to coupled, individually indistinguishable, error displacement components, by establishing unified approximating function slopes of equivalent unit proportions which directly relate said error displacement components corresponding to each respective coordinate-related inversion-corresponding point.

In accordance with the present invention, the root designator $\Psi$ of Equations 91 and 92 should normally be rendered greater than one and is preferably represented as equivalent to the number of pertinent or simultaneously considered variable degrees of freedom, N. In accordance with the present invention, the number of simultaneously considered variable degrees of freedom may sometimes be reduced by implementing multiple inversions of data, as considered in correspondence with the order in which measurements were taken. Hence, the number of pertinent degrees of freedom being simultaneously considered during a single or partial inversion need not necessarily correspond to the overall number of degrees of freedom of the entire system. Also, in accordance with the present invention, the exponent, 2/N+1 or 2/N as included in representing fundamental weight factors may sometimes vary in the manner that it might be rendered within a processing system. Slight or sometimes even significant variation in representing the number of degrees of freedom, as included in said exponent, may, for some applications, have insignificant affect on the final results. Such variations are to be considered as allowable in accordance with the present invention, but not preferred.

Offset Bias:

Faulty representation of multiple coordinate offsets will generally induce a form of offset bias. Coordinate corresponding offsets which are not explicitly included in representing a respective likelihood estimator, if not negligible, may be indistinguishably linked within said estimator. Hence, accurate inversions may require inclusion of close proximity estimates for each pertinent coordinate corresponding offset.

Measurement Bias:

Effects of measurement bias may often be reduced by steps which include systematically calibrating measurement equipment, establishing appropriate measurement distribution functions, and increasing the number of data samples. Unknown bias as related to linear inversions will result in a respective linear translation of coordinates and a corresponding error in offset values. Unknown bias as related to nonlinear inversions may cause faulty evaluations of one or more inversion parameters. Slight variations in bias can result in extreme variations in rendering said inversion parameters. In accordance with the present invention, a variety of approaches may be considered and correspondingly implemented to reduce said effects; e.g.; measurement bias can be ignored and evaluated as included with a single coordinate offset. It can be evaluated by a first order approximation in correspondence with close proximity offset estimates, or alternately, as disclosed herein, compensation for measurement and offset bias may be considered in correspondence with one or more coordinate axes by parametric removal of measurement bias or parametric removal of combined coordinate offsets and measurement bias from likelihood representations and by respectively establishing said measurement bias or said offsets and measurement bias along with maximum likelihood estimates in conjunction with said removal.

Methodology and Related Concerns:

Other concerns related to both error and respective bias compensation involve minifying function deviations, maximizing likelihood, and establishing variability and respective weighting to statistically compensate for either or both direct and antecedent measurement dispersions. In accordance with the present invention, these concerns may be addressed, and sometimes resolved, by establishing composite weighting of data-point projections, then optimizing adjustment parameters in correspondence with the sum of weighted squared said data-point projections: first generating preliminary inversions with disregard to data sample variability, and then attempt to subsequently rendering adequate dispersion adjustments to correct said preliminary inversions and establish preferred maximum likelihood estimations. said preferred maximum likelihood estimations being rendered to include:

1. representing the variability in correspondence with data-point projections and respective inversion-conforming data sets (in lieu of representing single component residual displacements as directly related to effective said single component measurement variance);
2. representing the likelihood in correspondence with said data-point projections units, being equalized by including fundamental weight factors or applicable slope-handling coefficients, as evaluated in correspondence with inversion-conforming data sets which effectively establish said likelihood to represent coordinate systems with axes normalized on the square root of respective dispersion-accommodating variability $\sqrt{V}$, and by which appropriately normalized data-point projections may be rendered with equalized units and respectively compensated for heterogeneous uncertainty and function related variations in slope;
3. adequately representing dispersion coupling by implementing dispersion-accommodating variability, V, and complements of dispersion-accommodating variability, $_cV$, which comprise representation of measurement precision as rendered to also include any pertinent dispersion effects caused by errors in antecedent measurements (i.e., prior measurements of orthogonal variables).

Dispersion-Accommodating Variability:

At least one form for estimating a dispersion-accommodating variability, $V_{\eta rk}$, about a mean value, $\mu_{\eta rk}$, for the $\eta^{th}$ element of a respective inversion-conforming data set (said inversion-conforming data set corresponding to the $r^{th}$ root of the determined $n^{th}$ variable of the $k^{th}$ set of measurement-coupled samples) may be rendered in accordance with the present invention as the sum of respective bi-coupled dispersion components, as exemplified by Equations 94, $$V_{\eta rk} = \sim \sum_{l=1}^{N} \int (\mu_{\eta rk} - X_\eta)^2 D(X_l) dX_l, \tag{94}$$

wherein integrations are taken (or approximated) for $x_l$ over the extremes of the respective variable range, as limited to the domain of the approximative contour for values of e between 1 and N, including $l=\eta$ but generally excluding integrations over variables whose measurements do not effect the measurement of $x_\eta$. In accordance with the present invention, the sum designator with a superimposed tilde, $\tilde{\Sigma}$, as in Equations 94, is herein assumed to allow for the exclusion of non-considered addends from the sum. Units of the dispersion-accommodating variability as represented by Equations 94, will correspond to those of the square of the respective variable, $x_\eta^2$. Contributions from antecedent measurement dispersions are provided by the addends which correspond to $l \neq \eta$.

Variability as Distinguished from Variance:

The words "measurement variance", as considered in accordance with the present invention, are assumed to apply to the estimated (or considered likely) variations of individual measurements (generally represented as the square of the standard deviation of a single variable measurement) without inclusion of antecedent measurement dispersions.

In accordance with the present invention, the word "variability" is assumed to apply to the estimated (or considered likely) uncertainty, which may be preferably rendered as a form of dispersion accommodating variability to include any assumed pertinent antecedent measurement dispersions.

In accordance with the present invention, a variability which is rendered to include both respective measurement variance and related orthogonal measurement dispersions, as considered with or without regard to the order in which the measurements were taken, either can be or traditionally has been referred to as an effective variance. (In accordance with the present invention, dividing a dependent component residual deviation by an effective variance does not weight the residual, but rather transforms said dependent component residual to a form representing a deviation normal to the fitting function as expressed on coordinates which are normalized on uncertainty.)

Alternately, in accordance with the preferred embodiment of the present invention, for $\eta = n$ the variability in the determined measure, $x_{nrk}$, of the variable $x_n$ may be appropriately rendered as a complement of orthogonal measurement variability; i.e., excluding direct representation of the variability of possibly associated measurements (e.g., $x_{nk}$) of said variable $x_n$, said orthogonal measurement variability being rendered to include only considered pertinent dispersion components which may affect or result from respective orthogonal variable measurements.

In other words, in accordance with the present invention, the variability of a determined dependent variable may be rendered as a function of the lateral variability in the sampling of associated independent variables being subject to the restraints imposed by an approximating relationship.

In accordance with the present invention, the terms "variance" and "effective variance" do not apply to the variability of the evaluated measure of a dependent variable whose considered value is determined as a function of one or more independent orthogonal variable measurements.

Inversion-Conforming Data Sets:

The subscript notation nrk, is herein adopted as an optional means of communication for use with two or more dimensions, to imply evaluation with respect to inversion-conforming data sets (ICDS), each of said ICDS including a respective root location being determined as a function of at least one orthogonal inversion-conforming data set element; each of said ICDS (e.g., $X_{1k}, \ldots, X_{n-1k}, x_{nrk}, X_{n+1k}, \ldots, X_{Nk}$) comprising determined measure of said respective root location, $x_{nrk}$ and a subset of a respective data-point set (e.g., $X_{1k}, \ldots, X_{n-1k}, X_{n+1k}, \ldots, X_{Nk}$).

In accordance with the present invention, inversion-conforming data sets (ICDS) are data sets, each of which comprise at least two elements, including 1. a subset of data-point coordinates comprising at least one sample datum (e.g. sample count, coordinate measurement, or provided sample measure) establishing coordinate representation for at least one variable degree of freedom (e.g., $X_{lk}$ for $l \neq n$) and
2. a respectively determined measure. i.e. an evaluated or parametrically represented solution for at least one other variable, said evaluated or parametrically represented solution being herein referred to as the determined element, the root solution element, or determined variable measure e.g., $s_{nrk}$, of a respective inversion-conforming data set, wherein said at least one other variable (or the determined element variable, e.g., $x_n$) is substantially rendered in correspondence with a data inversion and said at least one sample datum, said data inversion being represented by an approximating relationship, equation, function, or an alternate approximating correspondence.

In accordance with the present invention, one or more orthogonal elements comprising said subset of data-point coordinates together with at least one determined element establish an inversion-conforming data set. The one or more elements comprising said subset of data-point coordinates may be alternately referred to as orthogonal elements. The corresponding variables may be referred to as orthogonal element variables; and the provided measure or respective measurement comprising said orthogonal element(s) may be referred to herein as orthogonal measurement(s).

In accordance with the present invention, a plurality of ICDS may be generated in correspondence with each collected data-point set by renditions which include:

1. rendering a plurality of determined values (e.g., $x_{nrk}$) including any pertinent root values for each considered variable, said values being rendered as determined functions of provided measure(s) or respective measurement(s) for considered orthogonal elements of the corresponding subsets of data-point coordinates (e.g., $X_{lk}$ for $l \neq n$); and
2. rendering each of said plurality of ICDS to include one of said determined values along with corresponding said provided measure or respective measurement for each of the respectively included orthogonal element variables, each of said ICDS subsequently designating respective coordinates of (or of an approximation to) a corresponding inversion-defined point location. In accordance with the present invention, the process of generating ICDS may be referred to as rendering inversion-conforming data sets or rendering ICDS. The abbreviation, ICDS, is here implemented for convenience to refer to a plurality of inversion-conforming data sets. In accordance with the present invention, the processing of data, in correspondence with a plurality of data-point projections and respective inversion-conforming data sets is referred to as inversion-conforming data sets processing. Also for convenience, said inversion-conforming data sets processing may be alternately referred to herein and in the enclosed figures and appendices as "ICDS processing". Note that the coordinates of each said inversion-defined point location, as individually represented, is herein preferably referred to in singular form without abbreviation as an "inversion-conforming data set".

EXAMPLE 12

Consider a set of two-dimensional data comprising data points which hypothetically represent the mean function values (1, 3) and (3, 7) with homogeneous non-skewed statistically independent error distributions of plus and minus one-half in the measurement of x and plus and minus one in the measurement of y, so that the approximating function y=Ax+B is represented by the data points (½, 2), (½, 4), (1½, 2), (1½, 4), (2½, 6), (2½, 8), (3½, 6), and (3½, 8). Assume the variability in the measurement of x to be $$\mathcal{V}_X = \frac{1}{4},$$

assumed to correspond to a root mean square deviation of ½. Assume the variability in the measurement of y to be $V_Y=1$.

A. First consider heterogeneous uncertainty and derive an expression for the weighted sums of data-point projections. Then simplify the equations by modifying the forms of the addends and weight factors to represent the same weighted addends with alternate representation of said composite weight factors, and further simplify the considered independent equations for homogeneous applications.

B. Demonstrate the effectiveness of the derivation by performing an inversion to evaluate the fitting parameters.

C. Assume a set of data which is characterized by heterogeneous precision, and demonstrate the effectiveness of the derivation by including representation of said heterogeneous precision in performing an inversion to evaluate the fitting parameters.

Considering only two dimensions with only one root solution for the inverse function, $x_k = x'(Y_k)$, the inversion-conforming data sets will be $(X_k, y_k)$ and $(x_k, Y_k)$. The parametric data-point projections will be $$\delta_{y_k} = Y_k - y(X_k) = Y_k - {}_A X_k - B \text{ and} \tag{95}$$

$$\delta_{X_k} = X_k - X(Y_k) = X_k - \frac{Y_k}{A} + \frac{B}{A}. \tag{96}$$

The respective forms for function deviations can be written as $$\mathcal{F}_y = y - \mathcal{A}X - \mathcal{B} \text{ and } \mathcal{F}_X = X - \frac{y}{\mathcal{A}} + \frac{\mathcal{B}}{\mathcal{A}}. \tag{97}$$

The specific function deviation normalization coefficients are $$C_y = \tag{98}$$

$$\frac{1}{\sqrt{c\mathcal{V}_Y}} = \frac{1}{\sqrt{\mathcal{A}^2 \mathcal{V}_X}} \text{ and } C_X = \frac{1}{\sqrt{c\mathcal{V}_X}} = \frac{1}{\sqrt{\mathcal{V}_Y/\mathcal{A}^2}}.$$

In accordance with the present invention, representation for the fundamental weight factors can be written as $$W_y = \frac{1}{\frac{\partial C_y \mathcal{F}_y}{\partial X/\sqrt{\mathcal{V}_X}} \frac{\partial C_y \mathcal{F}_y}{\partial y/\sqrt{\mathcal{V}_Y}}} = \tag{99}$$

$$\frac{1}{\partial \frac{y - \mathcal{A}X - \mathcal{B}}{\mathcal{A}\sqrt{\mathcal{V}_X}}} \frac{1}{\partial \frac{y - \mathcal{A}X - \mathcal{B}}{\mathcal{A}\sqrt{\mathcal{V}_X}}} = \sqrt{\frac{\mathcal{A}^2 \mathcal{V}_X}{\mathcal{V}_Y}},$$

and $$W_x = \frac{1}{\frac{\partial C_X \mathcal{F}_X}{\partial X/\sqrt{\mathcal{V}_X}} \frac{\partial C_X \mathcal{F}_X}{\partial y/\sqrt{\mathcal{V}_Y}}} = \tag{100}$$

$$\frac{1}{\partial \frac{X - \frac{y}{\mathcal{A}} + \frac{\mathcal{B}}{\mathcal{A}}}{\sqrt{\mathcal{V}_Y}/\mathcal{A}}} \frac{1}{\partial \frac{X - \frac{y}{\mathcal{A}} + \frac{\mathcal{B}}{\mathcal{A}}}{\sqrt{\mathcal{V}_Y}/\mathcal{A}}} = \sqrt{\frac{\mathcal{V}_Y}{\mathcal{A}^2 \mathcal{V}_X}}.$$

The composite weight factors can be written as $$W_y \wedge C_y^2 W_y = \frac{1}{\mathcal{A}^2 \mathcal{V}_X} \sqrt{\frac{\mathcal{A}^2 \mathcal{V}_X}{\mathcal{V}_Y}} = \left| \frac{1}{\mathcal{A} \sqrt{\mathcal{V}_X \mathcal{V}_Y}} \right|, \tag{101}$$

and $$W_X \wedge C_X^2 W_x = \tag{102}$$

$$\frac{1}{\mathcal{V}_Y/\mathcal{A}^2} \sqrt{\frac{\mathcal{V}_Y}{\mathcal{A}^2 \mathcal{V}_X}} = \left| \frac{\mathcal{A}}{\sqrt{\mathcal{V}_X \mathcal{V}_Y}} \right| \cdot \mathcal{V}_y / \mathcal{A}^2$$

Considering heterogeneous uncertainty, the sum of normalized squared data-point projections over the normalized coordinates x and y, $\xi$, would be $$\xi = \sum_{k=1}^{K} W_{x_k} C_{x_k}^2 \delta_{x_k}^2 + W_{y_k} C_{y_k}^2 \delta_{y_k}^2 = \sum_{k=1}^{K} W_{x_k} \delta_{x_k}^2 + W_{Y_k}^2 \delta_{y_k}^2 \quad (103)$$

$$= \sum_{k=1}^{K} \frac{\left(X_k - \frac{Y_k}{A} + \frac{B}{A}\right)^2}{\left|\sqrt{V_{X_k} V_{Y_k}}/\mathcal{A}\right|} + \frac{(Y_k - {}_A X_k - B)^2}{\left|\mathcal{A}\sqrt{V_{X_k} V_{Y_k}}\right|}.$$

Assume that estimated parameters plus corrections are equal to corrected parameters, and replace each estimated projection by a first order Taylor series approximation for evaluating corrections:

$$\xi \approx \sum_{k=1}^{K} \frac{\left(X_k - \frac{Y_k}{\mathcal{A}} + \frac{\mathcal{B}}{\mathcal{A}} + \frac{\Delta_A * Y_k - \mathcal{B}}{\mathcal{A}^2} + \frac{\Delta_B}{\mathcal{A}}\right)^2}{\left|\sqrt{V_{X_k} V_{Y_k}}/\mathcal{A}\right|} + \quad (104)$$

$$\sum_{k=1}^{K} \frac{(Y_k - \mathcal{A} X_k - \mathcal{B} - \Delta_A X_k - \Delta_B)^2}{\left|\mathcal{A}\sqrt{V_{X_k} V_{Y_k}}\right|}.$$

Now minimizing the sum of squares with respect to corrections, $\Delta A$ and $\Delta B$, will yield $$\Delta \mathcal{A} \sum_{k=1}^{K} \left[\frac{X_k^2}{\left|\mathcal{A}\sqrt{V_{X_k} V_{Y_k}}\right|} + \frac{(Y_k - \mathcal{B})^2}{\mathcal{A}^4 \left|\sqrt{V_{X_k} V_{Y_k}}/\mathcal{A}\right|}\right]_\oplus + \quad (105)$$

$$\Delta B \sum_{k=1}^{K} \left[\frac{X_k}{\left|\mathcal{A}\sqrt{V_{X_k} V_{Y_k}}\right|} + \frac{(Y_k - \mathcal{B})}{\mathcal{A}^3 \left|\sqrt{V_{X_k} V_{Y_k}}/\mathcal{A}\right|}\right]_\oplus -$$

$$\sum_{k=1}^{K} \left[\frac{(X_k Y_k - \mathcal{A} X_k^2 - \mathcal{B} X_k)}{\left|\mathcal{A}\sqrt{V_{X_k} V_{Y_k}}\right|} + \frac{(Y_k - \mathcal{A} X_k - \mathcal{B})(Y_k - \mathcal{B})}{\mathcal{A}^3 \left|\sqrt{V_{X_k} V_{Y_k}}/\mathcal{A}\right|}\right]_\oplus = 0,$$

and $$\Delta \mathcal{A} \sum_{k=1}^{K} \left[\frac{X_k}{\left|\mathcal{A}\sqrt{V_{X_k} V_{Y_k}}\right|} + \frac{(Y_k - \mathcal{B})}{\mathcal{A}^3 \left|\sqrt{V_{X_k} V_{Y_k}}/\mathcal{A}\right|}\right]_\oplus + \quad (106)$$

$$\Delta B \sum_{k=1}^{K} \left[\frac{1}{\left|\mathcal{A}\sqrt{V_{X_k} V_{Y_k}}\right|} + \frac{1}{\mathcal{A}^2 \left|\sqrt{V_{X_k} V_{Y_k}}/\mathcal{A}\right|}\right]_\oplus -$$

$$\sum_{k=1}^{K} \left[\frac{(Y_k - \mathcal{A} X_k - \mathcal{B})}{\left|\mathcal{A}\sqrt{V_{X_k} V_{Y_k}}\right|} + \frac{(Y_k - \mathcal{A} X_k - \mathcal{B})}{\left|\mathcal{A}\sqrt{V_{X_k} V_{Y_k}}\right|}\right]_\oplus = 0.$$

In accordance with the present invention, representing a weight factor does not necessarily mean that the weight factor needs to actually be generated in order to perform the associated manipulations. The appearance of weight factors may change in the manner in which they are represented by interpretable instruction code or machine configuration. Weight factors can be enhanced or broken into factors which may be alternately distributed as coefficients or divisors without changing their purpose or effectiveness. Such representation of fundamental weight factors and/or composite weight factors is recognized in accordance with the present invention, as representation of said weight factors. In the following example, the included weighting of the independent equations is simplified, as orthogonal weighting is alternately rendered to conform to a similar form.

$$\Delta \mathcal{A} \sum_{k=1}^{K} \left[\frac{X_k^2}{\left|\mathcal{A}\sqrt{V_{X_k} V_{Y_k}}\right|} + \frac{(Y_k - \mathcal{B})^2}{\mathcal{A}^2 \left|\mathcal{A}\sqrt{V_{X_k} V_{Y_k}}\right|}\right]_\oplus + \quad (107)$$

$$\Delta B \sum_{k=1}^{K} \left[\frac{X_k}{\left|\mathcal{A}\sqrt{V_{X_k} V_{Y_k}}\right|} + \frac{(Y_k - \mathcal{B})}{\mathcal{A} \left|\mathcal{A}\sqrt{V_{X_k} V_{Y_k}}\right|}\right]_\oplus +$$

$$\sum_{k=1}^{K} \left[\frac{(X_k Y_k - \mathcal{A} X_k^2 - \mathcal{B} X_k)}{\left|\mathcal{A}\sqrt{V_{X_k} V_{Y_k}}\right|} + \frac{(Y_k - \mathcal{A} X_k - \mathcal{B})(Y_k - \mathcal{B})}{\mathcal{A} \left|\mathcal{A}\sqrt{V_{X_k} V_{Y_k}}\right|}\right]_\oplus = 0,$$

and $$\Delta \mathcal{A} \sum_{k=1}^{K} \left[\frac{X_k}{\left|\mathcal{A}\sqrt{V_{X_k} V_{Y_k}}\right|} + \frac{(Y_k - \mathcal{B})}{\mathcal{A} \left|\mathcal{A}\sqrt{V_{X_k} V_{Y_k}}\right|}\right]_\oplus + \quad (108)$$

$$2\Delta B \sum_{k=1}^{K} \left[\frac{1}{\left|\mathcal{A}\sqrt{V_{X_k} V_{Y_k}}\right|}\right]_\oplus + 2 \sum_{k=1}^{K} \left[\frac{(Y_k - \mathcal{A} X_k - \mathcal{B})}{\left|\mathcal{A}\sqrt{V_{X_k} V_{Y_k}}\right|}\right]_\oplus = 0.$$

Now consider the data points (½, 2), (½, 4), (1½, 2), (1½, 4), (2½, 6), (2½, 8), (3½, 6), and (3½, 8), implementing Equations 105 and 106 as considered with homogeneous uncertainty to generate the slope 2 and intercept 1 for linear function, y=2x, will yield the following five consecutive iterations:

| | | |
|---|---|---|
| Initial estimates: | A = 0.0 | B = 0.0 |
| Corrections | to A = 1.600000000000002 | to B = 1.799999999999996 |
| Initializing iteration: | A = 1.600000000000002 | B = 1.799999999999996 |
| Corrections | to A = .3512195121951203 | to B = −.7024390243902402 |
| First iteration: | A = 1.951219512195122 | B = 1.097560975609755 |
| Corrections | to A = 4.817091755190597D − 02 | to B = −9.634183510381195D − 02 |
| Second iteration: | A = 1.999390429747028 | B = 1.001219140505943 |
| Corrections | to A = 6.094773306812272D − 04 | to B = −1.21895466136268D − 03 |
| Third iteration: | A = 1.99999990707771 | B = 1.000000185844581 |
| Corrections | to A = 9.292228815799955D − 08 | to B = −1.858445765290914D − 07 |
| Forth iteration: | A = 1.999999999999998 | B = 1.000000000000004 |
| Corrections | to A = 2.243755846155379D − 15 | to B = −4.266631671594377D − 15 |
| Fifth iteration: | A = 2 | B = 1. |

It should be noted that for this linear example the variability is included as a constant divisor in all terms of the system equations, and hence, need not be included in the evaluation of fitting parameters. These results are astounding as they open the possibility of representing errors-in-variables likelihood, at least for the less complicated applications of homogeneous uncertainty, without including proportionate representation of uncertainty.

Apparently, equally valid iterations of Equations 105 and 106 may be rendered in accordance with the present invention, for heterogeneous applications; e.g., consider the same data points, but assume ¼$^{th}$ the variability on X measurements 3, 4, 5, and 6 and on the Y measurements 1, 3, 6, and 8. The first four iterations will yield

| | | |
|---|---|---|
| Initial estimates: | A = 0.0 | B = 0.0 |
| Corrections | to A = 2.121212121212121 | to B = .7575757575757576 |
| Initializing iteration: | A = 2.121212121212121 | B = .7575757575757576 |
| Corrections | to A = .4480087416339835 | to B = −.896017483267967 |
| First iteration: | A = 2.569220862846104 | B = −.1384417256922095 |
| Corrections | to A = 5.861006458147557D − 02 | to B = −.1172201291629505 |
| Second iteration: | A = 2.62783092742758 | B = −.25566185485516 |
| Corrections | to A = 6.839462349020358D − 04 | to B = −1.36789246980402D − 03 |
| Third iteration: | A = 2.628514873662482 | B = −.257029747324964 |
| Corrections | to A = 8.902860016344468D − 08 | to B = −1.780572001754282D − 07 |
| Forth iteration: | A = 2.628514962691082 | B = −.2570299253821641 |
| Corrections | to A = 1.714412911086512D − 15 | to B = −3.284726746493088D − 15 |
| Fifth iteration: | A = 2.628514962691084 | B = −.2570299253821674. |

End of Example 12

EXAMPLE 13

Considering the same equation of Example 10, render a sum of weighted squared data-point projections. First, consider measurement error being limited to the independent variable, then consider an errors-in-variables application.

The normalized data-point projections, $\delta_{x_k}$ and $\delta_{y_k}$, would become $$\delta_{x_k} = x_k - X_k = C_{X_k}\left[\left(\frac{Y-B}{A}\right)^{\frac{1}{E}} - X_k\right] \leadsto C_{X_k}\left[X_k - \left(\frac{Y-B}{A}\right)^{\frac{1}{E}}\right], \quad (109)$$

and $$\delta_{y_k} = y_k - Y_k = C_{y_k}(AX_k^E + B - Y_k) \leadsto C_{y_k}(Y_k - AX_k^E - B), \quad (110)$$

wherein the complementary projection normalization coefficient may be represented by the inverse of the square root of the variability in the determined measures of x and y, respectively.

$$C_{X_k} = \frac{1}{\sqrt{\mathcal{V}_{X_k}}} = \frac{\mathcal{A}\mathcal{E}}{\sqrt{\mathcal{V}_{Y_k}}}\left(\frac{Y-\mathcal{B}}{\mathcal{A}}\right)^{\frac{\varepsilon-1}{\varepsilon}}. \quad (111)$$

and $$C_{y_k} = \frac{1}{\sqrt{\mathcal{V}_{y_k}}} = \frac{1}{\sqrt{\mathcal{V}_{X_k}}\,(\mathcal{A}\varepsilon X_k^{\varepsilon-1})}. \quad (112)$$

The fundamental variables, x and y, for this example, can be expressed as proportional to $$\frac{x}{\sqrt{\mathcal{V}_{X_k}}} \text{ and } \frac{y}{\sqrt{\mathcal{V}_{Y_k}}} \text{ respectively.}$$

The fundamental weight factors can be written as:

$$W_x = \frac{1}{\left|\frac{\partial C_x \mathcal{F}_x}{\partial x/\sqrt{\mathcal{V}_x}} \quad \frac{\partial C_x \mathcal{F}_x}{\partial y/\sqrt{\mathcal{V}_Y}}\right|} = \tag{113}$$

$$\frac{1}{\left|\frac{\partial \frac{x-\left(\frac{y-\mathcal{B}}{\mathcal{A}}\right)^{\frac{1}{\varepsilon}}}{\sqrt{\frac{\mathcal{V}_Y}{\mathcal{A}^2 \varepsilon^2}\left(\frac{Y-\mathcal{B}}{\mathcal{A}}\right)^{\frac{1-\varepsilon}{\varepsilon}}}}}{\partial x/\sqrt{\mathcal{V}_X}} \quad \frac{\partial \frac{x-\left(\frac{y-\mathcal{B}}{\mathcal{A}}\right)^{\frac{1}{\varepsilon}}}{\sqrt{\frac{\mathcal{V}_Y}{\mathcal{A}^2 \varepsilon^2}\left(\frac{Y-\mathcal{B}}{\mathcal{A}}\right)^{\frac{1-\varepsilon}{\varepsilon}}}}}{\partial y/\sqrt{\mathcal{V}_Y}}\right|}$$

$$= \frac{1}{\mathcal{A}\varepsilon}\left(\frac{Y-\mathcal{B}}{\mathcal{A}}\right)^{\frac{1-\varepsilon}{\varepsilon}}\sqrt{\frac{\mathcal{V}_Y}{\mathcal{V}_X}},$$

and $$W_y = \frac{1}{\left|\frac{\partial C_y \mathcal{F}_y}{\partial x/\sqrt{\mathcal{V}_X}} \quad \frac{\partial C_y \mathcal{F}_y}{\partial y/\sqrt{\mathcal{V}_Y}}\right|} = \tag{114}$$

$$\frac{1}{\left|\frac{\partial \frac{y-\mathcal{A}X^\varepsilon - \mathcal{B}}{\mathcal{A}\varepsilon X^{(\varepsilon-1)}\sqrt{\mathcal{V}_X}}}{\partial x/\sqrt{\mathcal{V}_X}} \quad \frac{\partial \frac{y-\mathcal{A}X^\varepsilon - \mathcal{B}}{\mathcal{A}\varepsilon X^{(\varepsilon-1)}\sqrt{\mathcal{V}_X}}}{\partial y/\sqrt{\mathcal{V}_Y}}\right|} = \mathcal{A}\varepsilon X^{(\varepsilon-1)}\frac{\mathcal{V}_X}{\mathcal{V}_Y}.$$

The composite weight factors are:

$$\mathcal{W}_{X_k} \propto \left|\frac{\mathcal{A}\varepsilon}{\sqrt{\mathcal{V}_{X_k}\mathcal{V}_{Y_k}}}\left(\frac{Y_k - \mathcal{B}}{\mathcal{A}}\right)^{\frac{\varepsilon-1}{\varepsilon}}\right|, \tag{115}$$

and $$\mathcal{W}_{Y_k} \propto \left|\frac{1}{\mathcal{A}\varepsilon X^{(\varepsilon-1)}\sqrt{\mathcal{V}_{X_k}\mathcal{V}_{Y_k}}}\right|. \tag{116}$$

The calligraphic characters A, B, and E represent successive or final estimates for the respective fitting parameters A, B, and E.

The weighted sum of x and y coordinate data-point projections, $\xi$, as considered over K data samples can be written as:

$$\xi \propto \sum_{k=1}^{K} \frac{(Y_k - AX_k^E - B)^2}{\left|\mathcal{A}\varepsilon X^{(\varepsilon-1)}\sqrt{\mathcal{V}_{X_k}\mathcal{V}_{Y_k}}\right|} + \tag{117}$$

$$\left|\frac{\mathcal{A}\varepsilon}{\sqrt{\mathcal{V}_{X_k}\mathcal{V}_{Y_k}}}\left(\frac{Y_k - \mathcal{B}}{\mathcal{A}}\right)^{\frac{\varepsilon-1}{\varepsilon}}\right|\left[X_k - \left(\frac{Y_k - B}{A}\right)^{\frac{1}{E}}\right]^2.$$

Notice that, in order to maintain appropriate proportions between orthogonal components, the pre-estimated approximating parameters should not be dropped from the equation. Representing the deviation within the in brackets by a first order Taylor series approximation will yield:

$$\xi_{y_k} \approx \sum_{k=1}^{K} (-\alpha_k \Delta A - \beta_k \Delta B - \partial_k \Delta E + \gamma_k)^2, \tag{118}$$

where $$\alpha_k = \frac{X_k^\varepsilon}{\left|\mathcal{A}\varepsilon X^{(\varepsilon-1)}\sqrt{\mathcal{V}_{X_k}\mathcal{V}_{Y_k}}\right|^{\frac{1}{2}}} + \tag{119}$$

$$\left|\frac{\mathcal{A}\varepsilon}{\sqrt{\mathcal{V}_{X_k}\mathcal{V}_{Y_k}}}\left(\frac{Y_k - \mathcal{B}}{\mathcal{A}}\right)^{\frac{\varepsilon-1}{\varepsilon}}\right|^{\frac{1}{2}}\frac{1}{\mathcal{A}\varepsilon}\left(\frac{Y_k - \mathcal{B}}{\mathcal{A}}\right)^{\frac{1}{\varepsilon}},$$

$$\beta_k = \frac{1}{\left|\mathcal{A}\varepsilon X^{(\varepsilon-1)}\sqrt{\mathcal{V}_{X_k}\mathcal{V}_{Y_k}}\right|^{\frac{1}{2}}} + \tag{120}$$

$$\left|\frac{\mathcal{A}\varepsilon}{\sqrt{\mathcal{V}_{X_k}\mathcal{V}_{Y_k}}}\left(\frac{Y_k - \mathcal{B}}{\mathcal{A}}\right)^{\frac{\varepsilon-1}{\varepsilon}}\right|^{\frac{1}{2}}\left(\frac{1}{\mathcal{A}\varepsilon}\right)\left(\frac{Y_k - \mathcal{B}}{\mathcal{A}}\right)^{\frac{1-\varepsilon}{\varepsilon}},$$

$$\partial_k = \frac{\mathcal{A}X_k^\varepsilon \ln X_k}{\left|\mathcal{A}\varepsilon X^{(\varepsilon-1)}\sqrt{\mathcal{V}_{X_k}\mathcal{V}_{Y_k}}\right|^{\frac{1}{2}}} + \tag{121}$$

$$\left|\frac{\mathcal{A}\varepsilon}{\sqrt{\mathcal{V}_{X_k}\mathcal{V}_{Y_k}}}\left(\frac{Y_k - \mathcal{B}}{\mathcal{A}}\right)^{\frac{\varepsilon-1}{\varepsilon}}\right|^{\frac{1}{2}}\frac{1}{\varepsilon^2}\ln\left(\frac{Y_k - \mathcal{B}}{\mathcal{A}}\right)\left(\frac{Y_k - \mathcal{B}}{\mathcal{A}}\right)^{\frac{1}{\varepsilon}},$$

and $$\gamma_k = \frac{(Y_k - AX_k^E - B)^2}{\left|\mathcal{A}\varepsilon X^{(\varepsilon-1)}\sqrt{\mathcal{V}_{X_k}\mathcal{V}_{Y_k}}\right|^{\frac{1}{2}}} + \tag{122}$$

$$\left|\frac{\mathcal{A}\varepsilon}{\sqrt{\mathcal{V}_{X_k}\mathcal{V}_{Y_k}}}\left(\frac{Y_k - \mathcal{B}}{\mathcal{A}}\right)^{\frac{\varepsilon-1}{\varepsilon}}\right|^{\frac{1}{2}}\left[X_k - \left(\frac{Y_k - B}{A}\right)^{\frac{1}{E}}\right],$$

wherein the composite weight factors are represented as imbedded in the coefficients of adjustment parameter corrections. A corresponding matrix equation, as considered to evaluate the approximating parameters, A. B, and E, can be established in correspondence with the matrix equation suggested in Example 10.

End of Example 13

For the two-dimensional single root application of Examples 12 and 13, notation with the subscript nrk is replaced by representing variable x and y with data samples $X_k$ and $Y_k$ and single root solutions of inverse equations. For rendering representation of data-point projections as associated with an undesignated number of variables, it is convenient to replace the x, y coordinate system with a $x_n$ coordinate system, wherein n=η represents the isolated or considered independent variable and $X_{nrk}$ represents the respective root solutions of respective inversion-conforming data sets. The nrk subscripts, which are included herein on the root solution elements of the ICDS, designate evaluations of respective root solutions being rendered as functions of orthogonal measurements of said ICDS. In accordance with the present invention, said root solution elements may be alternately referred to as the root solutions, root elements, or determined elements of respective ICDS. The k subscript designates each of K similarly collected data-point sets, each said data-point set comprising N orthogonal variable measurements or alternately provided measure which specify respective coordinate locations and which exhibit uncertainty-related scatter in correspondence with respective measurement uncertainty. The r subscript distinguishes individual root solutions (e.g., $x_{nrk}$) for establishing each of the respective ICDS (i.e., said r subscript designates each considered root solution for each respectively determined variable $x_n$ of each of the represented ICDS). For alternate applications, the number of roots $R_{nk}$ and the respective number of ICDS may vary in correspondence with each represented variable $x_n$ and each data-point set. For certain functions and for various combinations of measurements, there may be no real root solutions, while for other functions and respective variables, there may be one or more root solutions, as considered over the range and domain of the provided data. In accordance with the present invention, the selection of roots should generally be limited to only one real root solution for each value of n and k. Said only one root solution should be the root corresponding to respective said n and k that characterizes the associated data-point projection with the least variability. Selections may be considered in correspondence with pre-estimated fitting parameters. Inclusion of more than one root solution can be implemented to include respective coordinate root normalization.

A data reduction may be limited to representing only real roots, or it may be alternately represented to include imaginary or complex roots (e.g., for applications which may involve representing complex variables). Normally imaginary roots, which are encountered while evaluating ICDS or while representing dispersions by the integrals of Equations 94, are represented by zero (off contour) probabilities of points not within the realm of current successive approximation, and thus they need not be included in generating respective inversions or in generating respective values for dispersion-accommodating variability.

Representing Unquantifiable Dependent Variable Data:

One of the problems that often arises in attempting to analytically present sampled data is associated with the collection of independent variable observation samples in correspondence with an unquantifiable representation of the associated dependent variable. For many applications of statistics, it is not possible, or at least not feasible, to establish sampling procedures which will allow for the direct or even indirect measurement of the dependent variable. For such applications, a statistical representation of dependent variable data appears to be in order. In accordance with the present invention, such a representation may be achieved in correspondence with one or more selected independent variables under the following assumptions:

1. Assume that the frequency of dependent variable event occurrence along an independent variable axis, with any and all other independent variables being held constant, reflects the inverse of the slope of the dependent variable taken with respect to said independent variable.
2. Assume that an appropriate parametric form for a fitting function can be represented for adjustment parameter evaluation.
3. Assume a sufficient ensemble of data points to comprise a statistical representation of independent variable observations over the dependent variable domain which will allow groupings and combinations of groupings of isolated observations to represent variations of observations of a selected independent variable for considered constant representation of the respective orthogonal independent variable observations, said constant representation being considered within the range of error deviations of said orthogonal independent variable observations.
4. Assume dependent variable measurement to be in one to one correspondence with the local frequency of event occurrence along said selected independent variable axis. And,
5. Assume the dependent variable to be substantially represented in relative proportion by a considered function of said frequency of event occurrence.

With these assumptions, in accordance with the present invention, when local bivariate representation of groupings and combinations of groupings can be established, processing of said groupings and combinations of groupings can also be established.

EXAMPLE 14

Consider a set of independent variable measurements corresponding to random representations of a dependent condition. Assume sampling to be dispersed randomly over the spread of possible observations for said condition. For this example, assume only one independent variable and Simulate independent variable data corresponding to the function $y=3x^3+4$. Then, establish a displaced relative two dimensional representation for the dependent observation.

To simulate data for this example, the following random samples between one and one thousand are considered as representative of statistical sampling in one to one correspondence with respective independent observation sampling:

818.266, 789.392, 93.238, 967.528, 674.677, 500.679, 367.825, 168.425, 248.010, 502.604, 446.280, 930.377, 220.211, 61.829, 591.113, 278.346, 78.891, 28.026, 315.816, 484.367, 570.449, 474.496, 462.976, 833.168, 403.196, 588.802, 532.413, 637.798, 200.486, 813.387, 259.293, 505.253, 703.835, 236.202, 442.262, 852.097, 226.047, 231.333, 21.567, and 670.091.

The following samples representing the independent variable are generated as the inverse of the considered functional representation to provide a simulation of independent observation sampling:

6.47463, 6.39718, 3.09844, 6.84827, 6.06919, 5.49100, 4.94983, 3.79853, 4.33273, 5.49809, 5.28273, 6.75910, 4.16152, 2.68128, 5.80586, 4.50532, 2.92260, 2.00071, 4.70174, 5.43022, 5.73693, 5.39277, 5.34839, 6.51389, 5.10531, 5.79823, 5.60554, 5.95584, 4.03092, 6.46167, 4.39851, 5.50781, 6.15590, 4.26169, 5.26669, 6.56309, 4.19863, 4.23169, 1.80244, and 6.05532.

By sequencing the observation samples in numeric order, a corresponding representation for independent data samples and dependent quantification, (x, Q), may be rendered in correspondence with respective sequentially ordered numbers. That is to say, quantified dependent variable replacement samples can be represented by the numbers one through forty, in one to one correspondence with the preceding forty simulated independent observation samples sequenced as here exemplified:

(1.80244, 1), (2.00071, 2), (2.68128, 3), (2.92260, 4), (3.09844, 5), (3.79853, 6), (4.03092, 7), (4.16152, 3), (4.19863, 9), (4.23169, 10), (4.26169, 11), (4.33273, 12), (4.39851, 13), (4.50532, 14), (4.70174, 15), (4.94983, 16), (5.10531, 17), (5.26669, 18), (5.28273, 19), (5.34839, 20), (5.39277, 21), (5.43022, 22), (5.49100, 23)5 (5.49809, 24), (5.50781, 25), (5.60554, 26), (5.73693, 27), (5.79823, 28), (5.80586, 29), (5.95584, 30), (6.05532, 31), (6.06919, 32), (6.15590, 33), (6.39718, 34), (6.46167, 35), (6.47463, 36), (6.5139, 37), (6.56309, 38), (6.75910, 39), and (6.84827, 40).

Note that in accordance with the present invention, representation of the quantified dependent variable replacement samples can be represented as any considered function of the sequential order of the respective two dimensional segments. They can but need not begin with the integer number one, as in this example, and the considered sequence for said quantified dependent variable replacement samples can but need not necessarily correspond to a numeric sequence.

A statistical variability in the quantified values of the dependent variable representation can be approximated by Equation 123.

$$v_Q \approx \frac{1}{K} \sum_{k=1}^{K} [X(Q_k) - X_k]^2 \frac{\partial Y^2}{\partial X}. \tag{123}$$

This variability will actually represent a dispersion accommodating variability, as it will also include the dispersions which are associated with the measurements of x. The respective variability in said measurements can be represented by the square of the standard deviation or an alternately considered uncertainty estimate which is associated with the independent variable observation sample acquisition. For this particular example, the measurement of x may be considered error free, and the uncertainty in Q can be considered as homogeneous, so that for the considered two dimensional analysis, representation of variability need not be included.

End of Example 14

Analysis of the set of data which is exemplified in Example 14 may not establish a true term coefficient, and it may not establish the dependent variable coordinate offset. However, it should provide a statistically accurate estimate for the exponent or alternately included nested parameters, as considered accordance with the present invention. Example 14 provides a representation for quantifying the dependent variable of a two dimensional data system. In accordance with the present invention, two dimensional segments may also be represented for observations of more than two degrees of freedom by searching through the respective sample data and isolating those segments which correspond to constant or assumed constant values for other respectively considered orthogonal variables.

The Probability Density Function:

In accordance with the present invention, for an assumed normal distribution of measurements of $x_l$ over the entirety of possible measurements, the probability density functions $D(x_l)$, as considered in correspondence with the mean values $\mu_{lrk}$, may be rendered as exemplified by Equations 124, $$D(X_l) = \frac{1}{\sigma_{lrk} \sqrt{2\pi}} e^{-\frac{(\mu_{lrk} - X_l)^2}{2(\sigma_{lrk})^2}}, \tag{124}$$

wherein the $\mu_{lrk}$ represent actual or successive estimates of mean values for the considered likely variable measurements. In accordance with the present invention, said mean values $\mu_{nrk}$ may be approximately rendered by corresponding elements of respective ICDS, i.e., determined values for root solution elements of respective ICDS being conversely considered to represent said mean values, e.g., $$\begin{aligned}(X_{1k}, \ldots, X_{n-1k}, x_{nrk}, X_{n+1k}, \ldots, X_{Nk}) \Rightarrow \\ (\mu_{1rk}, \ldots, \mu_{nrk}, \ldots, \mu_{Nrk}).\end{aligned} \tag{125}$$

With this assumption, the integrands, which include $x_l$ and the respective $x_n$, along with each of the included integrals and functions of Equations 94, may be digitally or alternately evaluated in correspondence with displacements around said respective ICDS or successive estimates of the same. In recognition of the fact that not all probability distributions are Gaussian, appropriate renditions of variability may characteristically require establishing respective probability distribution descriptions.

Mean Square of Normalized Data-Point Projections:

Mean square values for the normalized data-point projections $<N^2(X-x)^2>$ may be defined in terms of composite projection normalizing coefficients $N_{nrk}$. In accordance with the present invention, said mean square values for the normalized data-point projections should be constant, as considered in the limit as the number of random measurement samples which correspond to the approximative contour is made to approach infinity and, hence, need not necessarily be included in representing maximum likelihood.

Composite Projection Normalizing Coefficients:

In accordance with the present invention, composite normalizing of data-point projections, in fact, composite normalizing in general can be rendered in accordance with the present invention, as proportional to the product of a slope compensating coefficient and a proportionate or specific normalization coefficient. In accordance with the present invention, slope compensating coefficients represent a somewhat more general replacement for slope-handling coefficients, as implemented for weighting of data-point projections. They are alternately represented as equal to the square root of fundamental weight factors, said square root of fundamental weight factors being referred to in accordance with the present invention as slope-compensating coefficients, herein designated by the calligraphic character S as defined for normalization of data-point projections, assuming single root solutions, as exemplified by Equations 126, $$S_{nrk} = \left| \prod_{\eta=1}^{N} \frac{\partial \mathcal{F}_{xnr}}{\partial x_\eta} \right|_k^{-\frac{1}{N}} \sim \left| \left( \frac{\partial \mathcal{F}_{yr}}{\partial y} \right) \prod_{\eta=1}^{N} \frac{\partial \mathcal{F}_{yr}}{\partial x_\eta} \right|_k^{-\frac{1}{N+1}}, \tag{126}$$

$$\sim \frac{\left| \frac{\partial \mathcal{F}_{X_n} / \sqrt{_c\mathcal{V}_{X_n}}}{\partial X_n / \sqrt{\mathcal{V}_{X_n}}} \right|_{rk}^{\frac{2}{N}}}{\left| \frac{\partial \mathcal{F}_{X_n} / \sqrt{_c\mathcal{V}_{X_n}}}{\partial X_n / \sqrt{_c\mathcal{V}_{X_n}}} \prod_{\eta=1}^{N} \frac{\partial \mathcal{F}_{X_n} / \sqrt{_c\mathcal{V}_{X_n}}}{\partial X_\eta / \sqrt{\mathcal{V}_{X_\eta}}} \right|_{rk}^{\frac{2}{N}}}.$$

In the past, normalizing of single component displacements has been rendered by a variety of respective measurement related expressions, including the inverse of standard deviations $1/\sigma$, the square root of the inverse of considered measurement variance $1/\sqrt{<\delta^2>}$, and the square root of the inverse of a considered effective variance (i.e., $1/\sqrt{v_\phi}$).

Composite projection normalizing coefficients. e.g., N, being considered in accordance with the present invention, are assumed to represent the square root of fundamental weight factors multiplied times whatever coefficient or divided by whatever divisor is deemed as appropriate to establish the respectively considered data-point point projection or residual deviation, so as to be characterized by a non-skewed homogeneous uncertainty distribution. In accordance with the present invention, composite normalizing coefficients in general, N, including said composite projection normalizing coefficients, $$N = SC, \quad (127)$$

may include any considered normalizing expressions, C, together with respective slope-compensating coefficients, S, being implemented to provide normalizing of data-point projections in rendering forms of ICDS processing in correspondence with one or more variable degrees of freedom, or these composite normalizing coefficients may be similarly rendered to provide normalizing of single component residual deviations, as the case may be.

In accordance with the present invention, said normalizing expressions may be extended to represent or include the square root of the inverse of associated dispersion-accommodating variability or, alternately and more preferably, to represent or include the inverse of dispersion-accommodating variability, as associated with the variability, $\sqrt{c}\bar{V}_{vrk}$, of inversion-conforming data sets or respective forms of variability, as may be associated with that of considered single component residual deviations.

Considering the ramifications of slope handling, in accordance with the present invention, composite normalizing coefficients in general, including composite residual deviation normalizing coefficients as well as said composite composite projection normalizing coefficients, may be considered equal to the product of the square root of fundamental weight factors and proportionate or specific deviation normalization coefficients. For applications in which all variables are normalized on uncertainty, and in which the normalization coefficients which provide normalization of the respective variables, are equivalent or directly proportional to the specific normalization coefficients which are to provide normalization of deviations, said fundamental weight factors as implemented for the weighting of squared residuals, may be alternately replaced by the square of dispersion-accommodating slope-handling coefficients, H. Also, for the weighting of squared residuals, said composite projection normalizing coefficients may be alternately replaced by simple slope-handling coefficients, H, for applications in which direct proportion of said composite weight factors can be and is represented without including uncertainty or other weighting restraints, and the square of said simple slope-handling coefficients may alternately replaced for applications of discriminate reduction data processing by transformation weight factors, in accordance with U.S. Pat. No. 5,619,432, for applications involving the square root of fundamental weight factors, $\sqrt{W}$. Common forms for representing composite normalizing coefficients which might be implemented with single component residual deviations might include $S/\sigma$, $S/\sqrt{V}$, or $S/\sqrt{v}$. In actuality, appropriate rendition will rely entirely upon the form of the availed data and respective fitting approximation.

In accordance with the present invention, in order to appropriately accommodate the variability of inversion-conforming data sets, proportionate or specific normalization coefficients, C, may be represented as function related complementary estimates which are associated with uncertainties in pertinent orthogonal measurements, such as, $1/_c\sigma$, $1/\sqrt{_c v}$, or $1/\sqrt{_c V}$.

The concept that allows the establishment and workability of composite weight factors in accordance with the present invention is that they can be expressed as functions of successive approximations that do not need to be acted upon by minimizing and maximizing procedures which may be provided by operations of calculus of variation during reduction processing. Whatever normalization is necessary to render respective deviations as represented by homogeneous non-skewed uncertainty distributions should not significantly complicate the actual likelihood estimating process.

In accordance with the preferred embodiments of the present invention, composite projection normalizing coefficients are most commonly rendered to include correspondence with complements of variability by forms such $H/_c\sigma$, $H/\sqrt{_c v}$, $H/\sqrt{_c V}$. Each form of said normalizing expressions may have merits which are more compatible with particular assumptions or with a particular form of data point projection. Depending upon the characteristics of the data and respective approximative form, the rendering of ideal dispersion accommodating coefficients may not always be necessary to establish an appropriately representation. In accordance with the present invention, the explicit form of the fitting function and respective data will dictate the specific requirements for deviation representation and relative deviation weighting that are required to render preferred forms of maximum likelihood estimating and respective least-squares regression approximating.

SPD Weight Factors:

Squared projection displacement weight factors, or SPD weight factors, are alternately dubbed "SPD weighting coefficients" as limited for use related to the square of slope-handling coefficients in pending patent Ser. No. 10/347,279. In accordance with the present invention, SPD weight factors are not limited to said use, but can be alternately rendered to incorporate slope-handling and/or other coefficients, as required to implement composite weighting of squared data-point projections, in accordance with the present invention. SPD weight factors as may be modified, in accordance with the present invention, are considered to be a form of composite weight factors, $W_{nrk}$, which are limited by use as represented by implementation, nomenclature, and/or subscript definition to the weighting of squared data-point projections.

In accordance with the present invention, factors of weighting coefficients that can be considered to be constant for all included coordinate representations over the entire ensemble of variable measurements need not be included in said weighting coefficients for rendering respective weighting.

In accordance with the present invention SPD weight factors, as a form of composite weight factors, will generally comprise a product of fundamental weight factors and proportionate or specific normalization coefficients, said fundamental weight factors being generated in correspondence with said proportionate or specific normalization coefficients, as illustrated in the previous Examples 12 and 13. However, for rendering projection normalizing coefficients in correspondence with assumed homogeneous uncertainty, valid SPD weight factors may at times be rendered by replacing the considered homogeneous uncertainty representations by a constant value, preferably unity, thus providing a convenient weighting for rendering both preliminary and reasonably accurate data inversions of homogeneous data without consideration of measurement uncertainty.

Selecting an Inversion Estimator:

While it is true that, for linear applications which are directly related to matrix algebra, results may be achieved with some ease, such is not necessarily the case when dealing with nonlinearly related data samples. Algorithms for several nonlinear maximum likelihood and least-squares estimators and associated inversion techniques are available by methods other than those that will be described herein. Some seem to be preferable above others; however conversion is often tedious or unobtainable. For assurance of appropriate and more readily achieved convergence, such algorithms may possibly be modified to include novel weight factors described in accordance with the present invention. In accordance with the present invention, by including parameter estimates in rendering weight factors and excluding those estimates from maximizing and/or minimizing operations, the associated nonlinear inversions (including appropriate inversions of sparse data) will not necessarily correspond to a minimum value for the sum of squared deviations when considered with respect to all of the included fitting parameters.

The principles of least-squares and maximum likelihood estimating which are discussed herein should bring to light necessary adjustments to traditional inversion techniques and respective weight factors that may be required to statistically represent accurate function related data models.

Only two methods of nonlinear inversion and respective processes for solving systems of equations are exemplified in this disclosure and considered in accordance with the preferred embodiment of the present invention. Others will be left to model selection and innovation of the reader. Said two methods used herein may be dubbed "estimation by function linearization" (EFL) and "linearization of successive corrections" (LSC). The first involves transforming the fitting function to a form which is compatible with linear forms of regression analysis. Modifications are made to the respective sum of squared linearized deviations by including appropriate weighting, in accordance with the present invention. Applications of the EFL method are demonstrated in the provided Examples 7, 8, and 9. Example 8 describes a traditional counterpart. The second, or LSC method, is an innovation for generating successive approximations for corrections to estimates and incorporating the corrections to generate subsequent estimates. Implementation of the LSC method is exemplified in Examples 10, 12, 13, and 15 (which will be presented later,) and included in the compact disk appendix as referenced in the detailed description of the invention.

The selection of parametric approximative form for representing variability and respective weighting may correspondingly reflect the explicit rendition type for a least-squares or maximum likelihood estimator, or it may reflect a compromise related to execution time or memory allotment, without regard to an appropriate formulation of maximum likelihood. Due to the fact that only proportionate weighting is generally required for homogeneous applications, alternate SPD weighting may (for some applications) indeed provide quite similar results. In accordance with the present invention, corrections to preliminary data inversions can be considered by rendering similar inversion results from successively corrected data representations, being combined with characterized dispersions to generate respective data simulations of characteristic form for said rendering; however, in order to account for errors in more than a single variable while representing maximum likelihood, individual coordinate corresponding weighting should be considered with respect to each included error deviation, and said weighting may need to include dispersion effects of related, prominently coupled antecedent measurements.

For considering linear approximations, or for considering data inversions over regions of negligible or small curvature (said curvature being considered as negligible over a range corresponding in length to the respective data-point projections), in accordance with the present invention, by assuming normal homogeneous error distribution functions, with the root designator $\Psi$ set equal or nearly equal to N, a simple dispersion-accommodating variability may be expressed by Equations 128:

$$\mathcal{V}_\eta \wedge^{\mathcal{A}} \sim \sum_{l=1}^{N} \left( \sigma_l \frac{\partial X_\eta}{\partial X_l} \right)^2. \tag{128}$$

In accordance with the present invention, Equations 128 establish the following provisions:
1. the rendered variability, $V_\eta$, may represent any or each of N coordinate-oriented measurement dispersions, and
2. orthogonal components for e between 1 and N that are not considered to contribute to dispersions in the measurement of $x_\eta$ need not be included.

In accordance with the present invention, the sum designator with a superimposed tilde, $\sim\Sigma$, as included in Equations 128, is assumed to imply exclusion of components that are not considered to contribute to dispersions in the measurement of $x_\eta$. For example, one might measure a first variable from an absolute reference frame; hence, the variability of the first variable measurement would be equal to its respective measurement variance. It then might be necessary to measure a second variable from the location of the first variable measurement. The second variable measurement would correspondingly reflect its associated measurement variance plus the dispersion caused by error in establishing the location of the first variable. A third variable measurement could include dispersions of both the first and the second variable measurements. Thus, the order of measurements may be viewed as a factor in determining the overall variability of each respective measurement.

The Complement of Orthogonal Measurement Variability:

In accordance with the present invention, collected measurements (e.g. $X_{nk}$) may be considered to be constant in value. That is to say, once a measurement has been established and recorded, so long as record containing the measurement is not altered and the memory containing the record remains reliable, the measurement will remain invariant regardless of its accuracy. Hence, in accordance with the preferred embodiment of the present invention, the variability (e.g., $V_{nrk}$) of data-point projections (whether said projections are correspondingly oriented or oppositely directed, e.g., $X_{nk}-x_{nrk}$ or $x_{nrk}-X_{nk}$) may be considered equivalent to the parametrically determined variability of the root solution elements (e.g., $x_{nrk}$) of respective ICDS, as related to the inherent uncertainty in the sampling of respective orthogonal elements, being restricted to the confines of a respective approximating relationship.

Although measurement variability corresponding to respective root element designated locations might be spuriously rendered as a variability which would correspond to sampling measurements of $x_n$ at root element designated locations $x_{nrk}$, or by respective proportions, innovations, or approximations of the same. In accordance with the preferred embodiment of the present invention, the variability of actual root solution elements are more aptly rendered as related to complements of orthogonal measurement variability, which are functions of the variability of the orthogonal elements of said respective ICDS. In accordance with the preferred embodiment of the present invention, said complements of orthogonal measurement variability may be rendered as the sum of orthogonal bi-coupled variability dispersion components, as exemplified by Equations 129:

$$_cV_{nrk} = -\int (\mu_{nrk} - X_n)^2 \mathcal{D}(X_n) dX_n + \sum_{l=1}^{N} \int (\mu_{nrk} - X_n)^2 \mathcal{D}(X_l) dX_l, \quad (129)$$

or by alternate renditions, innovations, or approximations of the same.

In accordance with the present invention, the variability-related probability density functions $D(x_l)$ of the variables $x_l$ and the respective probability density functions $D(x_n)$ of the variables $x_n$, as related to the considered mean values, may be estimated in correspondence with an appropriately selected probability distribution by replacing the included measurement variance, e.g. $\sigma_{lrk}^2$ or $\sigma_{nrk}^2$, with respective dispersion-accommodating variability, e.g., $V_{lrk}$ or $V_{nrk}$.

In accordance with the present invention, for assumed normal distributions of data-point projections over the entirety of possible orthogonal measurements (e.g. for linear applications and normal distributions of respective deviation components) the variability-related probability density functions $D(x_l)$, as considered in correspondence with the mean values $\mu_{lrk}$, may be estimated as exemplified by Equations 130, $$\mathcal{D}(X_l) \sim \frac{1}{\sqrt{2\pi V_{lrk}}} e^{-\frac{(\mu_{lrk} - X_l)^2}{2V_{lrk}}}; \quad (130)$$

however, distributions of variable measurements, as related to nonlinear functions when rendered to include significant antecedent measurement dispersions, are not generally expected to be truly Gaussian.

In accordance with the present invention, for assumed Gaussian distributions and statistically independent measurements, complements of dispersion-accommodating variability may be alternately approximated as the complements of the respective mean squared deviations, e.g., $$_cV_{nrk} \sim {_c\sigma_{nrk}^2} = -\int (\mu_{nrk} - X_n)^2 D(X_n) dX_n + \quad (131)$$
$$\sum_{l=1}^{N} \int (\mu_{nrk} - X_n)^2 D(X_l) dX_l \sim \left[ -\sigma_n^2 + \sum_{\eta=1}^{N} \left( \sigma_\eta \frac{\partial X_n}{\partial X_\eta} \right)^2 \right]_{nrk}.$$

In accordance with the preferred embodiment of the present invention, complements of orthogonal measurement variability may be implemented to characterize the uncertainty of adjustment dependent root elements of the ICDS and to correspondingly establish the variability of respectively determined data-point projections as functions of related inversion parameters or successive estimates of the same.

Representing Measurement Precision

Unfortunately, the collecting of information on the precision of measurements is often neglected, and respective estimates may need to be based upon the scatter in the collected data samples, or a relative or approximate "guess". Past efforts to establish uncertainty in measurement precision has been generally limited to establishing standard deviations of considered statistically independent variable measurements, while at times, intentionally or unavoidably including multivariate dispersions in representing said variable measurements. (In accordance with the present invention, the word "multivariate" is assumed to imply more than one variable.)

Normally one would think of precision as being high for close tolerances and low for loose tolerances. i.e., basically the inverse of uncertainty, and such is the case for the "precision weight factor" as defined in U.S. Pat. Nos. 5,619,432; 5,652,713; and 5,884,245. Said precision weight factor is there defined as the inverse of a root of uncertainty, being high for small degrees of uncertainty and low for high levels of uncertainty. On the other hand, in each of these patents, as well as in U.S. Pat. No. 6,181,976 B1 and pending patent Ser. No. 10/347,279, the word "precision" is alternately recognized as a form of uncertainty which is related to sample acquisition. In accordance with the present invention, to be consistent with prior patent applications of the present inventor, the coordinate-related precision estimates or in other words, estimates of precision uncertainly, as herein designated by the symbol $\sigma$, preferably represent point-wise standard deviations or alternate estimates for representing displacements, as related to isolated single variable measurement precision, which is not related to antecedent measurement dispersions. In accordance with the present invention, for homogeneous precision, the independently considered coordinate-related precision estimates are assumed to be constant over respective measurements corresponding to the represented values of a respective single variable. Thus, for uniform non-skewed error distributions in the measurement of the respective orthogonal variables, $X_l$, the relative measurement-related precision estimates, $\sigma_{lrk}$, of respective coordinate sample measurements, $X_{lk}$, are assumed to be constant for all respective ICDS.

In accordance with the present invention, for heterogeneous precision, the measurement-related precision estimates may be correspondingly represented as empirical or analytical functions of respective coordinate locations.

In addition to considered homogeneous or heterogeneous precision, for applications which involve errors in the measure of more than one variable, a spurious bias in measurement will generally be imposed when attempting to measure or evaluate a variable with respect to an error-affected antecedent measurement. In order to represent variability by Equations 94 or alternate renditions there of, estimates of the included measurement precision (e.g., $\sigma_{nrk}$) should presumably reflect measurement techniques as might be related to single, statistically independent variable measurements. Effort should be made to establish considered measurement precision as related to measurement techniques which can be considered uncontaminated by related orthogonal measurement dispersions. Recognizing that the considered estimates of uncertainty may necessarily include effects from related orthogonal measurement dispersions, an alternate approach might be to represent actual variability by originally assumed or estimated values. In accordance with the present invention, the measurement scatter and associated bias caused by effects of related variable measurement error may be referred to as dispersion effects. Said dispersion effects may be assumed to be included or excluded by representing variability as exemplified by respective renditions of Equations 94 through 118 or as alternately rendered by considering the deviations in measurements which directly reflect local multivariate dispersions as related to a specific measurement order.

Maximum Likelihood for Errors-in-Variables Applications:

Past efforts to establish maximum likelihood in correspondence with errors in the measurement of more than one variable may be characterized as related to single component residual displacements. The terminology "single component residual displacement" is herein considered to imply assumed direct representation of the variation of a data-point from a respective unknown true value and/or a corresponding unknown true coordinate location, with likelihood being defined in correspondence with the variability of said datum measurement, or measurement related function, as rendered to represent a respective variance or effective variance from said unknown true value and/or said corresponding unknown true coordinate location.

In accordance with the present invention, alternate terminology, that of "data-point projection", is applied to estimates of the difference between a respective inversion-conforming data set and the corresponding data-point set (or vice versa). In accordance with the present invention, likelihood which is related to data-point projections may be referred to as ICDS likelihood. By representing orthogonal data-point projections which are correspondingly related to respective ICDS, maximum likelihood may be alternately rendered to include multivariate constraints which tend to minify function deviations in correspondence with each coordinate axis, and said maximum likelihood may be simultaneously rendered, in accordance with the present invention, to include both slope handling and related coordinate corresponding variabilities. In accordance with the present invention, a multi-dimensional ICDS likelihood can be expressed by Equation 132, $$L = \prod_{k=1}^{K} \prod_{n=1}^{N} \tilde{\prod}_{r=1}^{R_{nk}} \mathcal{P}(\mathcal{N}_{nrk} X_{nk} - \mathcal{N}_{nrk} \mathcal{X}_{nrk}), \tag{132}$$

comprising products of data-point projection probability density functions $\mathcal{P}$ wherein the data, $X_{nk}$, are assumed to be invariant, and the variability of the normalized data-point projections, $\mathcal{N}_{nrk} X_{nk} - \mathcal{N}_{nrk} \mathcal{X}_{nrk}$ (for $\mathcal{N}_{nrk}$ independent of adjustments during calculus of variation optimization operations) can be represented by the variability of the normalized root solution elements $\mathcal{N}_{nrk} \mathcal{X}_{nrk}$ of respective ICDS. In accordance with the present invention, the product designator with a superimposed tilde, $\tilde{\prod}$, is herein assumed to allow for the exclusion of non-considered multipliers from the product. The selection of roots should generally be limited to only one real root solution for each value of n and k. Said only one root solution should be the root corresponding to respective said n and k that characterizes the associated data-point projection with the least variability, or, generally, the root that lies closest to the respective data point, as measured along the respective line of projection. Selections may be considered in correspondence with pre-estimated fitting parameters. Inclusion of more than one root solution can be implemented to include respective coordinate root normalization so that no one data point is overly weighted.

In accordance with the present invention, the multi-dimensional likelihood probability density function, as expressed by Equation 132, may be alternately rendered by a form which includes compensation for extraneous measurement bias, which may be indistinguishably associated with respective coordinate offsets, e.g., $$L \sim \prod_{k=1}^{K} \prod_{n=1}^{N} \tilde{\prod}_{r=1}^{R_{nk}} \mathcal{P}(\mathcal{N}_{nrk} X_{nk} - \mathcal{N}_{nrk} \tilde{o}_n - \mathcal{N}_{nrk} \mathcal{X}_{nrk} + \mathcal{N}_{nrk} \tilde{o}_n). \tag{133}$$

In accordance with the present invention, Equation 133 establishes form for a bias-free likelihood estimator, i.e., in said Equation 133, representation for measurement and/or offset bias is subtracted from the data and corresponding root solutions in order to disassociate the respective offsets and measurement bias from the orthogonal data-point projections and, thereby, establish a respective nonbiased distribution of addends for rendering maximum likelihood. The $\tilde{o}_n$ represent adjustment bias which may parametrically correspond to any one or any combination of coordinate offsets and/or respective coordinate-oriented bias. Unfortunately, the coordinate corresponding offsets and respective measurement bias are indistinguishably linked, and, at least for linear applications, may only be considered simultaneously for all coordinate axes by the inclusion of additional estimates or estimating restrains. Restraints on or valid estimates of one or more coordinate-related offsets may be useful in attempting to establish valid convergence. Slight variations in estimating a single component of bias may have devastating effects upon respective evaluations of the remaining inversion parameters. For nonlinear applications, this problem may be compounded by the rendering of inappropriate probability density functions and by associated curvilinear distortion bias, said curvilinear distortion bias being related to linear error deviations being imposed upon a curvilinear coordinate system. However, adjustments for inappropriate probability density representation and/or included curvilinear distortion bias may be attempted after inversion processing for specifically considered error distribution functions by rendering corrected inversion approximations, as suggested earlier in this disclosure.

At least for linear applications, a single adjustment bias may be rendered to represent the combined offsets and measurement bias of all of the respective coordinates, said single adjustment bias being generally oriented along the dependent variable coordinate. The remaining, all, or any combination of adjustment bias parameters $\tilde{o}_n$, as included in Equation 133, can often be:

1. omitted along with respective bias estimates;
2. included along with associated defining restraints; or
3. rendered as close proximity coordinate offset estimates, with provision for bias being rendered by respective optimizing adjustments or first order variation estimates during inversion processing.

An accent tilde ~ is inscribed over the adjustment bias $\tilde{o}_n$ in Equation 133 to indicate optional inclusion(s).

The bold type $\tilde{o}_n$ with superinscribed tilde are simultaneously included along with the adjustment $\tilde{o}_n$ to represent values or estimates (or successive estimates) of said offsets and measurement bias. The difference $X_{nk}-\tilde{o}_n$ represents each sample measurement of $x_{nk}$, being optionally corrected for both offset and/or related bias, and subsequently being held constant during maximizing or minimizing differentiation.

In accordance with present invention, maximum likelihood may be established by maximizing forms of Equations 132 or 133, with respect to the included adjustment parameters, or by maximizing other devised forms of likelihood which alternately establish likelihood in correspondence with orthogonal data-point projections, as related to respective ICDS.

For example, by:
1. assuming Gaussian distributions to represent the probability density of normalized root solutions $N_{nrk}x_{nrk}$ of respective coordinate determined ICDS about respectively normalized variable measurements $N_{nrk}X_{nk}$, and
2. assuming minified function deviations and appropriately considered measurement error distributions, as conversely rendered relative to respective ICDS, then, for normalized projections $NM_{nrk}[X_{nk}-x_{nrk}]$ of the determined said root solutions $x_{nrk}$ from the respective measurements $X_{nk}$ for a set of variables $x_n$, being simultaneously represented over an ensemble of K sample measurements, the N-dimensional bias-corrected ICDS likelihood probability density function L representing the coordinate corresponding plurality of ICDS being respectively considered in correspondence with respectively included orthogonal measurement $X_{1k}, \ldots, X_{n-1k}, X_{n+1k}, \ldots, X_{Nk}$ may be approximated, for example, by Equation 134, $$L \sim \prod_{k=1}^{K} \prod_{n=1}^{N} \sim \qquad (134)$$

$$\prod_{r=1}^{R_{nk}} \mathcal{P}(\mathcal{N}_{nrk}X_{nk} - \mathcal{N}_{nrk}\tilde{o}_n - \mathcal{N}_{nrk}X_{nrk} + \mathcal{N}_{nrk}\tilde{o}_n) \sim e^E \prod_{k=1}^{K} \prod_{n=1}^{N} \sim$$

$$\prod_{r=1}^{R_{nk}} \frac{1}{\sqrt{2\pi <\mathcal{N}^2(X-\mathcal{X})^2>}},$$

wherein the included exponent E may be expressed by Equation 135, $$E = -\sum_{k=1}^{K} \sum_{n=1}^{N} \sim \sum_{r=1}^{R_{nk}} \frac{\mathcal{N}_{nrk}^2 [(X_{nk}-\tilde{o}_n) - \mathcal{X}_{nrk} + \tilde{o}_n]^2}{2 <\mathcal{N}^2(X-\mathcal{X})^2>}, \qquad (135)$$

and wherein the ratio of squared composite projection normalizing coefficients $N_{nrk}^2$ to mean normalized variability, $<N^2(X-x)^2>$, may be alternately rendered in direct proportion to an appropriate weighting coefficient. The included tilde which is superimposed upon the r subscripted product designator in Equations 132, 133, and 134, and upon the respective sum designator in Equation 135 is assumed in accordance with the present invention, to allow for the exclusion of non-considered ICDS (e.g., ICDS that may not reflect roots that correspond with the considered approximative contour, and/or ICDS that correspond to data that may not satisfy expected deviation requirements).

The composite projection normalizing coefficients, $N_{nrk}$, should be appropriately rendered to establish a respective projection normalization in correspondence with respectively considered data-point projections. For example, implementing fundamental weight factors or appropriately considered slope-handling coefficients of $\Psi=N$ will establish same units for all represented data-point projections.

In accordance with the present invention, said composite projection normalizing coefficients may be alternately rendered to include variance, variability, but more appropriately, complements of variance or of variability with considered regard for likelihood, and in accordance with the present invention, said composite projection normalizing coefficients may be rendered to include slope-handling coefficients or alternate forms of slope compensating. Estimates for mean normalized variability may be omitted or rendered, as included in correspondence with respective weighting coefficients. Respective complements of dispersion-accommodating variability may be rendered in correspondence with Equations 129 or alternate renditions, approximations, or innovations of the same.

The actual maximizing of Likelihood may be correspondingly accomplished by any of a variety of means of parameter estimating and/or optimizing which are readily available and which may be alternately implemented. For Example, forms of calculus of variation optimizing and respective parameter estimating, which involve maximizing or minimizing, may be accomplished by equating partial derivatives to zero, respectively replacing adjustment parameters with approximating parameters (or parametrically represented inversion parameters) and solving the resultant equations.

Setting the derivatives of Equation 135 to zero and replacing the ratio of squared composite projection normalizing coefficients to mean normalized variability by proportionate SPD or composite weighting will yield a respective set of independent equations, as exemplified by Equations 136:

$$\sum_{k=1}^{K} \sum_{n=1}^{N} \sim \sum_{r=1}^{R_{nk}} W_{nrk} \left[ (X_{nk}-\chi_{nrk}) \left( \frac{\partial(\chi_{nrk}-\tilde{o}_n)}{\partial P_j} \right) \right]_{P_0,\ldots,P_J} = 0, \qquad (136)$$

said weighting being configured by rendition, in accordance with the present invention, to either include or exclude said slope-handling, and said weighting being configured by rendition to either include or exclude dispersion accommodations for representing homogeneous or heterogeneous precision.

One or more bias parameters and/or respective offsets may be alternately included, as expressed by Equations 137:

$$\sum_{k=1}^{K}\sum_{n=1}^{N} \sim \sum_{r=1}^{R_{nk}} W_{nrk}\left[(X_{nk}-\chi_{nrk})\left(\frac{\partial(\chi_{nrk}-\tilde{o}_{n})}{\partial \tilde{o}_{b}}\right)\right]_{P_0,\dots,P_J} = 0, \quad (137)$$

which may be rendered such that $\tilde{o}_b = P_j$ for each instance in which j corresponds to b. The adjustment parameters $P_j$, including any represented bias adjustments $\tilde{o}_b$, may be respectively replaced by determined approximating parameters $P_j$, including $\tilde{o}_b$, in correspondence with the rendition of differentials being equated to zero during minimizing or maximizing operations.

For addends of Equations 137 in which n=b, the partial derivative of the quantity $x_{nrk}-\tilde{o}_b$, as expressed in terms of orthogonal measurement and taken with respect to included $\tilde{o}_b$, will normally vanish. Alternately, for addends in which n≠b, the derivatives taken with respect to $\acute{o}_b$ will generally not vanish, thus providing for rendering means, in accordance with the present invention, to isolate and evaluate respective measurement bias and/or respectively considered bias-affected coordinate offsets.

In accordance with the preferred embodiment of the present invention, implementing data inversions in correspondence with ICDS likelihood, as expressed by Equations 132 or 133 or as estimated by Equations 134 and 135, for Ψ=N, should appropriately account for errors in more than one variable and compensate for the bias which is introduced by a nonuniformity of slopes corresponding to respective orthogonal variables. And, in accordance with the present invention, implementing data inversions in correspondence with likelihood, as expressed by Equation 133 or as estimated by Equations 134 and 135, as rendered with appropriate offset estimates and bias restraints, may also provide for possible isolation of related measurement bias.

Rendering an Example of Maximum Likelihood:

Assuming a summation over both k and n for all considered data sets and respectively considered roots and subsequently rendering a respective solution set for Equations 136 and 137 should establish a respective representation of maximum likelihood and simultaneously minify function deviations in correspondence with the represented ICDS and respective orthogonal data-point projections $X_{nk}-x_{nrk}$.

In accordance with the present invention, alternate methods of solution may be employed.

EXAMPLE 15

Considering the form of Equations 136 and 137, render an iterative solution using the LSC method by representing first order Taylor series expansions around successive approximations to the inversion parameters and correspondingly establishing a set of linear independent equations for evaluating respective corrections.

Assuming the bias to be included in representation of coordinate offsets and implementing said Taylor series expansions of the expressions on the left hand side of Equations 136 and 137 and combining the notation of Equations 136 to include Equations 137 will directly yield the set of linear independent Equations 138, $$\sum_{k=1}^{K}\sum_{n=1}^{N} \sim \sum_{r=1}^{R_{nk}} \sum_{\epsilon=0}^{J} \delta P_\epsilon \quad (133)$$

$$W_{nrk}\left[\frac{\partial \chi_{nrk}}{\partial P_\epsilon}\frac{\partial \chi_{\oplus nrk}}{\partial P_j} - (X_{nk}-\chi_{nrk})\frac{\partial^2 \chi_{\oplus nrk}}{\partial P_\epsilon \partial P_j}\right]_{P_0,\dots,P_J} =$$

$$-\sum_{k=1}^{K}\sum_{n=1}^{N} \sim \sum_{r=1}^{R_{nk}} W_{nrk}\left[(X_{nk}-\chi_{nrk})\frac{\partial \chi_{\oplus nrk}}{\partial P_j}\right]_{P_0,\dots,P_J},$$

wherein the $x_{\oplus nrk}$ are assumed to represent the determined ICDS root variable measures $x_{nrk}$, being parametrically rendered as functions of orthogonal measurement, and also including parametric correction for any inversion-related offset and/or any considered data-related bias.

The included $\delta P_\epsilon$ represent corrections to estimates for the included inversion parameters. In accordance with this considered example, said corrections may be evaluated in correspondence with said estimates for said inversion parameters and implemented in correcting said estimates in order to establish successive approximations.

A matrix equation may be rendered to evaluate successive corrections to inversion parameters while respectively minifying function deviations, implementing multivariate dispersion coupling, and rendering maximum likelihood estimates in correspondence with Equations 134 through 138. Exemplary form for the respective matrix equation, may be expressed, for example, by Equation 139:

$$\begin{bmatrix} a_{0,0} & \dots & a_{\epsilon,0} & \dots & a_{J,0} \\ \dots & \dots & \dots & \dots & \dots \\ a_{0,j} & \dots & a_{\epsilon,j} & \dots & a_{J,j} \\ \dots & \dots & \dots & \dots & \dots \\ a_{0,J} & \dots & a_{\epsilon,J} & \dots & a_{J,J} \end{bmatrix} \begin{pmatrix} \delta P_0 \\ \dots \\ \delta P_\epsilon \\ \dots \\ \delta P_J \end{pmatrix} = \quad (139)$$

$$\begin{Bmatrix} -\sum_{k=1}^{K}\sum_{n=1}^{N} \sim \sum_{r=1}^{R_{nk}} W_{nrk}C_{nrk0} \\ \dots \\ -\sum_{k=1}^{K}\sum_{n=1}^{N} \sim \sum_{r=1}^{R_{nk}} W_{nrk}C_{nrkj} \\ \dots \\ -\sum_{k=1}^{K}\sum_{n=1}^{N} \sim \sum_{r=1}^{R_{nk}} W_{nrk}C_{nrkJ} \end{Bmatrix},$$

wherein the included elements of the square matrix are correspondingly represented by Equations 140:

$$a_{\epsilon,j} = \sum_{k=1}^{K}\sum_{n=1}^{N} \sim \sum_{r=1}^{R_{nk}} \sum_{\epsilon=0}^{J} \quad (140)$$

-continued $$\mathcal{W}_{nrk}\left[\frac{\partial \chi_{nrk}}{\partial P_\epsilon}\frac{\partial \chi_{\oplus nrk}}{\partial P_j} - (X_{nk} - \chi_{nrk})\frac{\partial^2 \chi_{\oplus nrk}}{\partial P_\epsilon \partial P_j}\right]_{P_0,\ldots,P_J},$$

and the coefficients $C_{nrkj}$, which are included in the equivalence column matrix, may be expressed by Equations 141:

$$C_{nrkj} = \left[(X_{nk} - \chi_{nrk})\frac{\partial \chi_{\oplus nrk}}{\partial P_j}\right]_{P_0,\ldots,P_J}. \quad (141)$$

End of Example 15

Data reductions being rendered in correspondence with ICDS and respective data-point projections, should provide for rendering statistically accurate inversions of considered data, which may be rendered in correspondence with Equations 132 or 133, or in correspondence with the approximations of Equations 135 through 141, and including alternate innovations, renditions, or approximations of the same, with or without consideration of bias reflection, provided that appropriate weight factors are implemented in accordance with the present invention.

Implementing Two Dimensional Segment Inversions for Multivariate Processing

Another problem of great concern is the difficulty in rendering multi-dimensional inversions, due to the increased number of adjustment parameters required. In accordance with the present invention, the same technique that is explained herein for the representation of two dimensional segments for the quantification of dependent variables can be implemented to reduce multivariate data to two dimensional segments (which can either represent actual dependent sample data or pre-evaluated multivariate functions) which can be analyzed while holding orthogonal variations constant.

A BRIEF DESCRIPTION OF RELATED ART

Traditional forms of likelihood estimating are based upon the statistics of representative measurement, whereby likelihood is presumably established as related to variations or effective variations of measurements from unknown true values. M. Clutton-Brock (Ref. Technometrics, Vol. 9, No. 2, pp. 261-269, 1967) briefly discussed rendering maximum likelihood in terms of variations of dependent variable measurements from unknown true values. He also briefly discussed an alternate approach of maximizing likelihood in terms of maximum likelihood estimates of said unknown true values. He concluded that such an alternate approach, being considered when errors exist in the measurement of more than one variable, would be "both inefficient and tedious . . . ". He then went on to suggest a model for estimating nonlinear maximum likelihood based upon single component residual displacements. R. A. Fisher suggested in a much earlier paper (Ref. Royal Society of London, Vol. 222, pp. 309-368. 1922) that "We must confine ourselves to those forms which we know how to handle . . . ". Hence, past efforts to render inversions of both linear and nonlinear data, as considered for errors in more than a single variable, have focused on representing approximate forms of maximum likelihood estimating as limited to single component residual displacements.

With these considerations, and without innovations of the present invention, a traditional first order maximum likelihood estimator may be respectively established as related to single component residual displacements by:

1. neglecting slope compensating normalizations,
2. neglecting pertinent second and higher order Taylor expansion series terms,
3. representing single component residual displacements, and
4. ignoring measurement and offset bias.

The single component likelihood, as traditionally rendered, might be considered by the simplified form of Equations 142, $$L_n = \prod_{k=1}^{K} \mathcal{D}(e_{nk}), \quad (142)$$

wherein the $e_{nk}$ represents error deviations as single component residual displacements between the error affected measurements $X_{nk}$ and the assumed mean representations $x_{nk}$ for true values, which are actually unknown, i.e., $$e_{nk} \approx X_{nk} - x_{nk}. \quad (143)$$

The assumed mean representations $x_{nk}$ for said true values are dubbed invariant, and consequently, the considered variability of said single component residual displacements $e_{nk}$ are represented for traditional applications by estimates of variability, as considered over the ensembles of all possible error affected measurements, which would include the actual measurements, $X_{nk}$, said estimates of variability comprising the variance in the measurements of $X_{nk}$ plus the considered dispersion effects caused by pertinent errors in antecedent measurements. Said estimates of variability are traditionally rendered by an effective variance $\upsilon_{nk}$, being generally considered as for linear application in the form of Equations 144:

$$\upsilon_{nk} = \sum_{\eta=1}^{N}\left(\sigma_\eta \frac{\partial \chi_n}{\partial \chi_\eta}\right)_{nk}^{2}. \quad (144)$$

Alternately, in accordance with the present invention, measurements, once taken, are presumably invariant, and hence, probability densities of respective data-point projections should establish a more reliable likelihood which is related directly to variations in the locus of approximating points as established by respective fitting parameters in correspondence with possible errors in the respective orthogonal variable measurements.

Other currently available renditions of maximizing likelihood may incorporate alternately considered or spuriously rendered higher order approximations and/or they may represent effective variance either independent of, or as a rendered function of, included adjustment parameters to correspondingly provide somewhat deficient nonlinear models as generalized extensions of the respective linear models. Unfortunately, depending upon the order of vanishing derivatives, by neglecting higher order terms by the single component assumption of Equations 142, the resulting variety of single component equations may include unwarranted representation for related function deviations which are not inclined to vanish during subsequent inversion processing.

Early references describing the above mentioned traditional approach to linear and non-linear regression analysis include the work of D. York who followed earlier works of Adcock, Pearson, Jones, Deming. Worthing, Teissier, and Kermack in representing a form of maximum likelihood estimating as considered for linear applications being limited to representing single component residual displacements (Ref. D. York. "Least-Squares Fitting of a Straight Line," Canadian Journal of Physics, 44, pp. 1079-1086, 1966.) Concurrently. MI. Clutton-Brock applied the same linear assumptions and single component limitations to correspondingly establish limited application maximum likelihood for nonlinear fitting functions of the form $y=f(x)$ (Ref. M. Clutton-Brock, "Likelihood Distributions for Estimating Functions when Both Variables are Subject to Error," Technometrics 9, No. 2, pp. 261-269 1967.)

Credit is certainly due to these early pioneers as well as to their even earlier predecessors, Legendre and Gauss, and others who helped to established original and traditional methods and respective means for rendering simple data inversions. The linear single component residual displacement models for representing maximum likelihood are sufficiently adequate for simple linear applications. The generalized extensions to the linear models may alternately provide for nonlinear applications which restrict errors to a single dependent variable, and which may also require sufficient measurements to represent normal uniform error distributions corresponding to each represented independent variable coordinate location. These single component residual displacement models are somewhat less effective for handling inversions of sparse data and inversions of data with significant errors in more than a single variable.

The slightly inadequate reduction concepts provided by these early efforts continue to be implemented by alternate processing techniques (e.g., Ref. ISBN 0-521-43064-X, Cambridge University Press, New York, pp. 650-700, ®1986-1992), however even more recent efforts to render accurate data inversions continue to reflect original developments and extensions of maximum likelihood estimating as originally considered for linear applications or as alternately adapted for nonlinear applications (Ref. Austral. J. Statist. Vol. 42, pp. 500, 2000.)

Recent efforts also include earlier inventions of the present inventor. These inventions are:
1. Discriminate Reduction Data Processor (Ref. U.S. Pat. No. 5,619,432.),
2. Discriminate Reduction Data Processing (Ref. U.S. Pat. No. 5,652,713.),
3. Discriminate Reduction Data Acquisition (Ref. U.S. Pat. No. 5,884,245.), and
4. Adept Data Processor Implementing Function Similation with Inverse Deviation Variation Weighting (Ref. U.S. Pat. No. 6,181,976 B1.),
5. Inversion-conforming data sets Processing (Ref. U.S. Pending patent Ser. No. 10/347,279.)

Each of the first four of said earlier inventions of the present inventor include either transformation weight factors or alternate forms of inverse deviation variation weighting and, thereby, establish means for rendering accurate inversions for sparse two dimensional data in the limit as the error deviations in represented independent variable measurements become insignificant and also for multivariate data when the error deviations in the measure of all included variables can be neglected. Alternate means, such as implementing characteristic form iterations and/or rendering forms of conformal analysis to include zeta parameter iterations, are provided by the forth of said four inventions to compensate for errors in more than a single variable.

In accordance with U.S. Pat. No. 6,181,976 B1, implementation of inverse deviation variation weighting includes at least the following:
1. representing at least one weighting coefficient,
2. rendering said at least one weighting coefficient in a form compatible to be included in representing a respective weighting factor of a corresponding addend,
3. representing at least one equation, and
4. representing said at least one weighting factor to implement said at least one form of inverse deviation variation weighting in representing said at least one equation;

said at least one equation being rendered in a form compatible to be included in representing a set of independent equations as rendered for solution by said data processing system;

said at least one weighting coefficient being included in representing said at least one equation;

representation for said at least one weighting coefficient being generated in correspondence with representative measure of respective proportion to at least one evaluation for at least one derivative;

said at least one derivative being a variable dependent derivative of a function comprising at least one isolated term function of a represented function deviation;

said variable dependent derivative being a function of at least one variable;

said function deviation being a function of a plurality of variables;

said representative measure of said at least one derivative being determined in correspondence with represented measure of at least one of said plurality of variables;

said at least one weighting coefficient being represented as substantially corresponding in proportion to the absolute value of said representative measure of said at least one derivative being raised to a negative power other than negative two.

In accordance with U.S. Pat. Nos. 5,619,432; 5,652,713; and 5,884,245;a transformation weight factor can be defined as inversely proportional to the absolute value of the $N^{th}$ root of the square of the product of differential changes in phenomenon (or related approximation deviation) with respect to each of N express fundamental variables (as sampled or evaluated at representative data points) or constant proportion of the same.

Each of said first four inventions of the present inventor consider the rendition of transformation weight factors or include representing forms or degenerate forms of inverse deviation variation weighting, or both. Said four inventions do not correspondingly establish any rendered form for including multivariate dispersion coupling, none of said four inventions provide means for representing ICDS processing, and none of said four inventions provide adequate means for minifying or representing minified function deviations when errors exist in the measurement of more than a single variable.

The fifth above mentioned patent application Ser. No. 10/347,279, introduces the process of rendering forms of maximum likelihood estimating with respect to data-point projections and implements two forms of slope-handling coefficients which are alternately defined by taking the derivatives of respective component variables, rather than taking derivatives of appropriately normalized deviations and/or data-point projections to establish respective weighting.

Prior to considerations of said fifth patent, The present inventor had not recognized any need for representing said deviations and/or data-point projections as reflecting both homogeneous and non-skewed uncertainty distributions in order to establish appropriate compensation for changes in fitting function slope. Only in said fifth patent application has the present inventor considered the need for taking derivative with respect to variables as normalized on variability, and then only as considered for all of said variables being so normalized as represented in dispersion accommodating slope-handling coefficients and not thereby allowing for less than all variables to be so normalized. Hence, in accordance with the present invention, no weight factors previously available are fully capable of both compensating for variability by normalizing variables on uncertainty and simultaneously compensating for variation in slope which may be associated with appropriate normalization of respective deviations or data-point projections. The composite weight factors as disclosed, in accordance with the present invention, do provide said simultaneously compensating for both single component residual deviations (or singly defined unidirectional residual deviations) and for said data-point projections. Further consideration of the current state of the art, with regard to general multidimensional analysis as related to statistical modeling theory, seems to be quite adequately discussed in "Lectures on Statistical Modeling Theory" by J. Rissanen and in his brief report on "Complexity and Information in Modeling. (Helsinki Institute for Information Technology; Tampere and Helsinki Universities of Technology, Findlan; and University of London, England.)

SUMMARY OF THE INVENTION

In view of the foregoing, it is an object of the present invention to compensate for variability by rendering or representing weight factors which both compensate for sample variability and simultaneously compensate for variation in slope which may be associated with appropriately normalized representation of squared deviations, including squared residuals and squared data-point projections, as considered in accordance with the present invention. It is an object of the present invention to provide automated forms of data processing and corresponding processes which will include specific normalizations for deviations, including residuals and data-point projections, as considered in accordance with the present invention. It is an object of the present invention to provide automated forms of data processing and corresponding processes which will compensate for variations in slope which may be associated with appropriately normalized representation of squared deviations, including squared residuals and squared data-point projections, as considered in accordance with the present invention. It is an object of the present invention to provide automated forms of data processing and corresponding processes which will include representation of composite weight factors which will include representation of fundamental weight factors multiplied by the square of proportionate or specific deviation normalization coefficients. It is an object of the present invention to provide automated forms of data processing and corresponding processes which will establish maximum likelihood in correspondence with single component residual deviations or singly defined unidirectional residual deviations. It is an object of the present invention to provide automated forms of data processing and corresponding processes which will establish maximum likelihood in correspondence with data-point projections being related to inversion-conforming data sets. It is an object of the present invention to provide automated forms of data processing and corresponding processes which will consider minifying function deviations in correspondence with orthogonal data point projections being represented in rendering forms of inversion conforming data sets processing. It is a further object of the present invention to provide an option for rendering component measurement variability as the square of estimate measurement uncertainty plus the added dispersion caused by error deviations in related antecedent variable measurements. It is another object of the present invention to provide an option for respectfully including coordinate-related estimates of dispersion-accommodating measurement variability and respective complementary weighting in correspondence with each considered sample and each pertinent, or simultaneously considered, degree of freedom in order to establish maximum likelihood with respect to individually considered orthogonal data-point projections. It is another object of the present invention to provide an option for rendering dispersion in determined measure as a function of the variabilities of orthogonal measurement sampling to establish respective representation for complements of orthogonal variability and provide for rendering considered forms of composite weighting. It is an object of the present invention to provide optional means to isolate and evaluate coordinate offsets as associated with respective measurement bias. It is a further object of the present invention to allow for design implementation of fundamental weight factors for maximum likelihood estimating, and to provide the respective option of slope unification by normalizing on the $N^{th}$ root of the product of differential change in the normalized deviations or respectively considered data-point projections. It is another object of the present invention to allow for implementing represented uncertainties as either heterogeneous or homogeneous over the range and domain of the considered data. It is a further object of the present invention to provide for rendering inversions of simulated data to correct reduction processing for either or both coordinate related uncertainty and/or inversion related bias.

Due to the difficulty of providing adequate processing for more than two dimensional observations, and due also to the difficulty of establishing processing for data which may represent an unquantifiable dependent variable, it is a further object of the present invention to provide means to represent two-dimensional data segments which can be operated on with two dimensional processing to render adequate forms of multivariate statistical modeling, and to establish a conceivable form for processing independent sample measurements which can at least partially represent otherwise unquantifiable dependent variable observations.

It is also an object of the present invention to generate reduction products as processing system output to represent or reflect corresponding data inversions and to provide means for producing data representations which establish descriptive correspondence of determined parametric form in order to establish values, implement means of control, or characterize said descriptive correspondence by generated parameters and product output in forms including memory, registers, media, machine with memory, printing, and/or graphical representations.

The foregoing objects and other objects, advantages and features of this invention will be more fully understood by reference to the following detailed description of the invention when considered in conjunction with the accompanying drawings and the included compact disk appendix.

BRIEF DESCRIPTION OF THE DRAWINGS

In order that the present invention may be clearly understood, it will now be described, by way of example, with reference by example number to the previously stated examples which are included with the background of the invention, and with reference, by figure number, to the accompanying drawings, wherein like numbers indicate the same or similar components as configured for a corresponding application and wherein:

FIG. 1 depicts an exemplary flow diagram for rendering weighted maximum likelihood estimating in accordance with the present invention.

FIG. 2 depicts an example of dedicated QBASIC code for rendering linearized regression analysis as incorporating representation of composite weight factors in accordance with the present invention.

Figure 3:
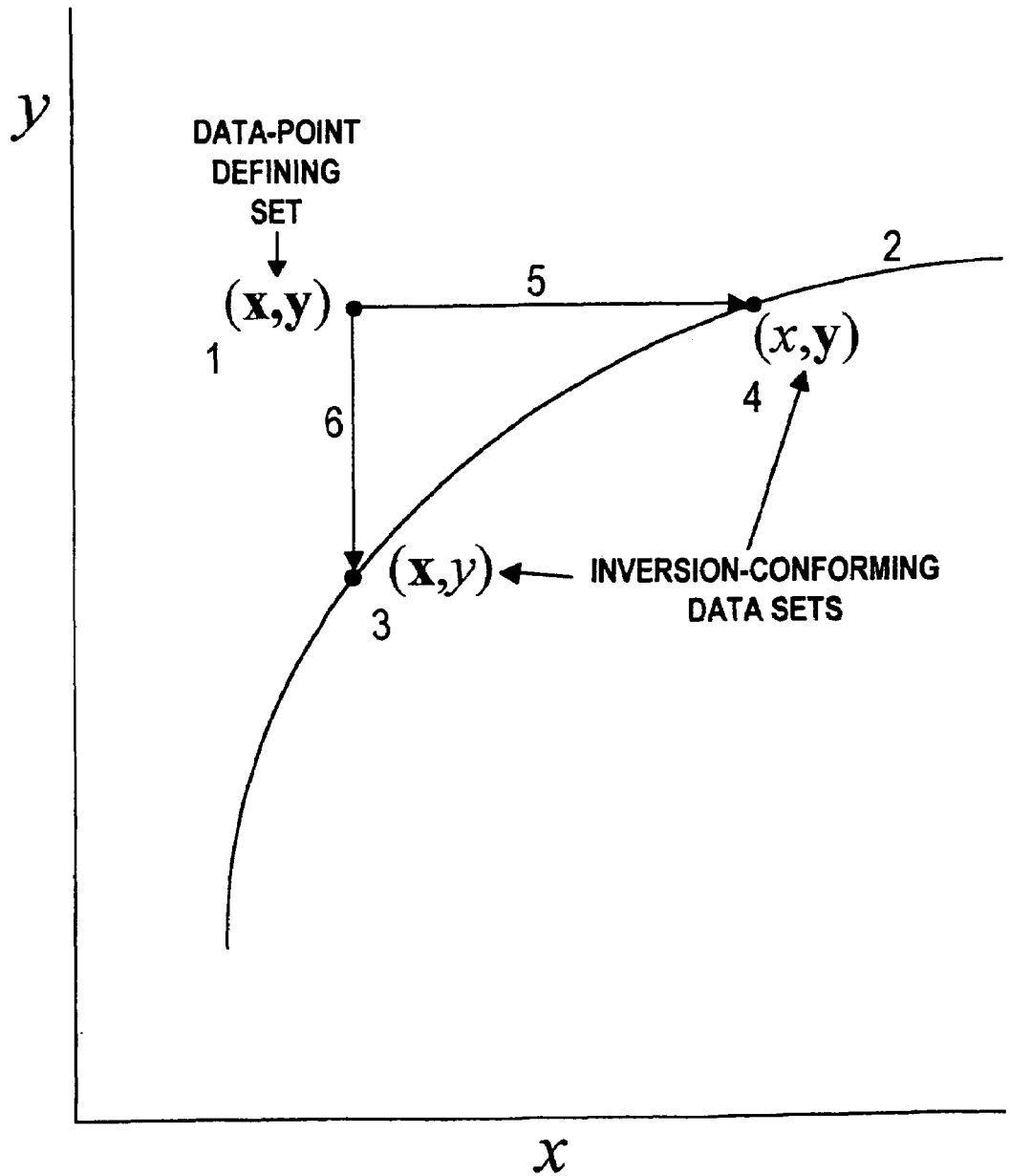

FIG. 3 depicts inversion-conforming data sets for two dimensions and illustrates the concept of orthogonal data-point projections.

being generated as the difference between the elements of data-point sets and respective inversion-conforming data set root solutions while rendering approximating representation for a fitting function in accordance with the present invention.

FIG. 4 depicts an example of dedicated QBASIC code for rendering inversion-conforming data sets processing as incorporating representation of composite weight factors in accordance with the present invention.

Figure 5:
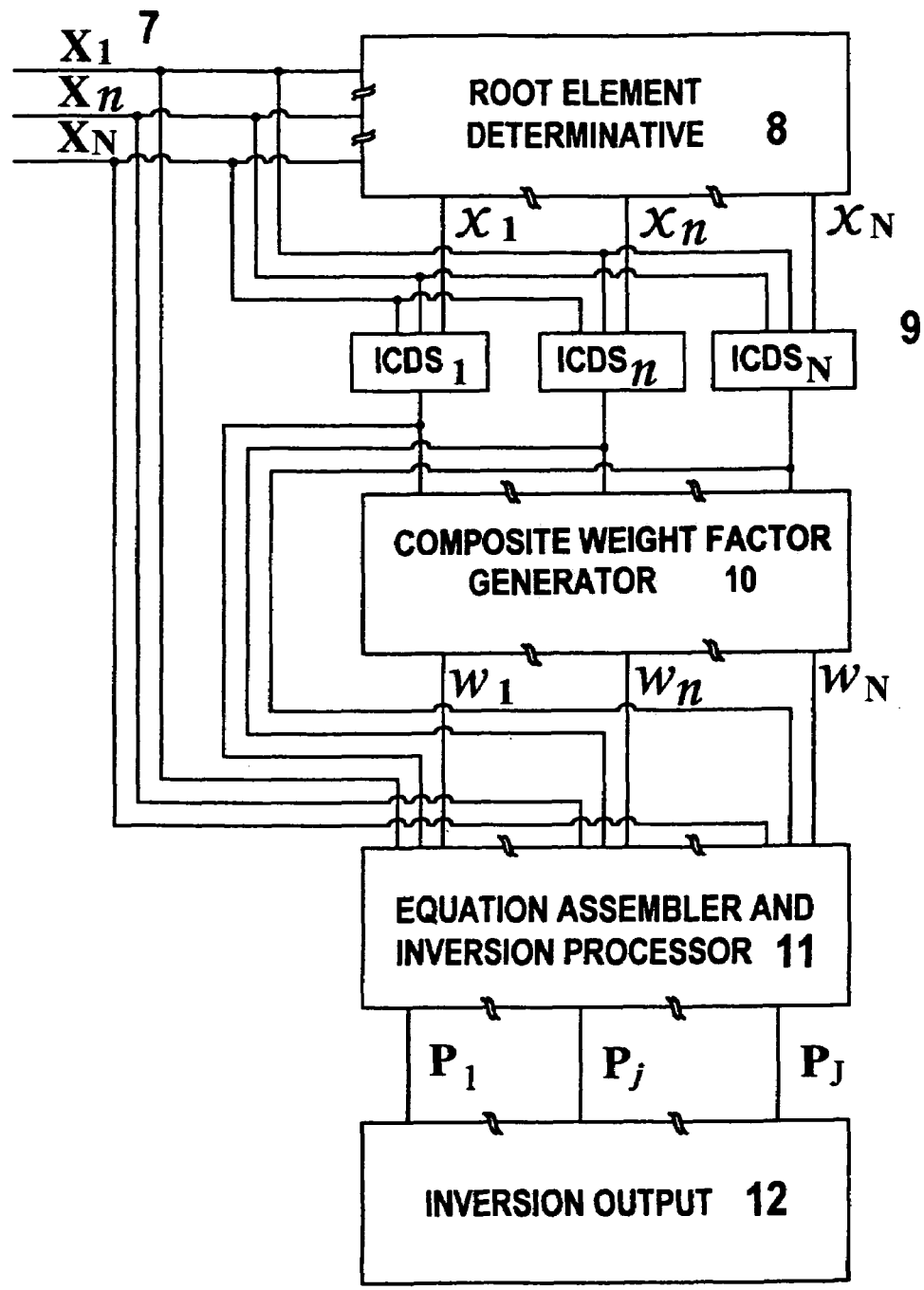

FIG. 5 depicts an example of multivariate inversion-conforming data sets processing including implementation of composite weight factors as related to the representation of inversion-conforming data sets in accordance with the present invention.

Figure 6:
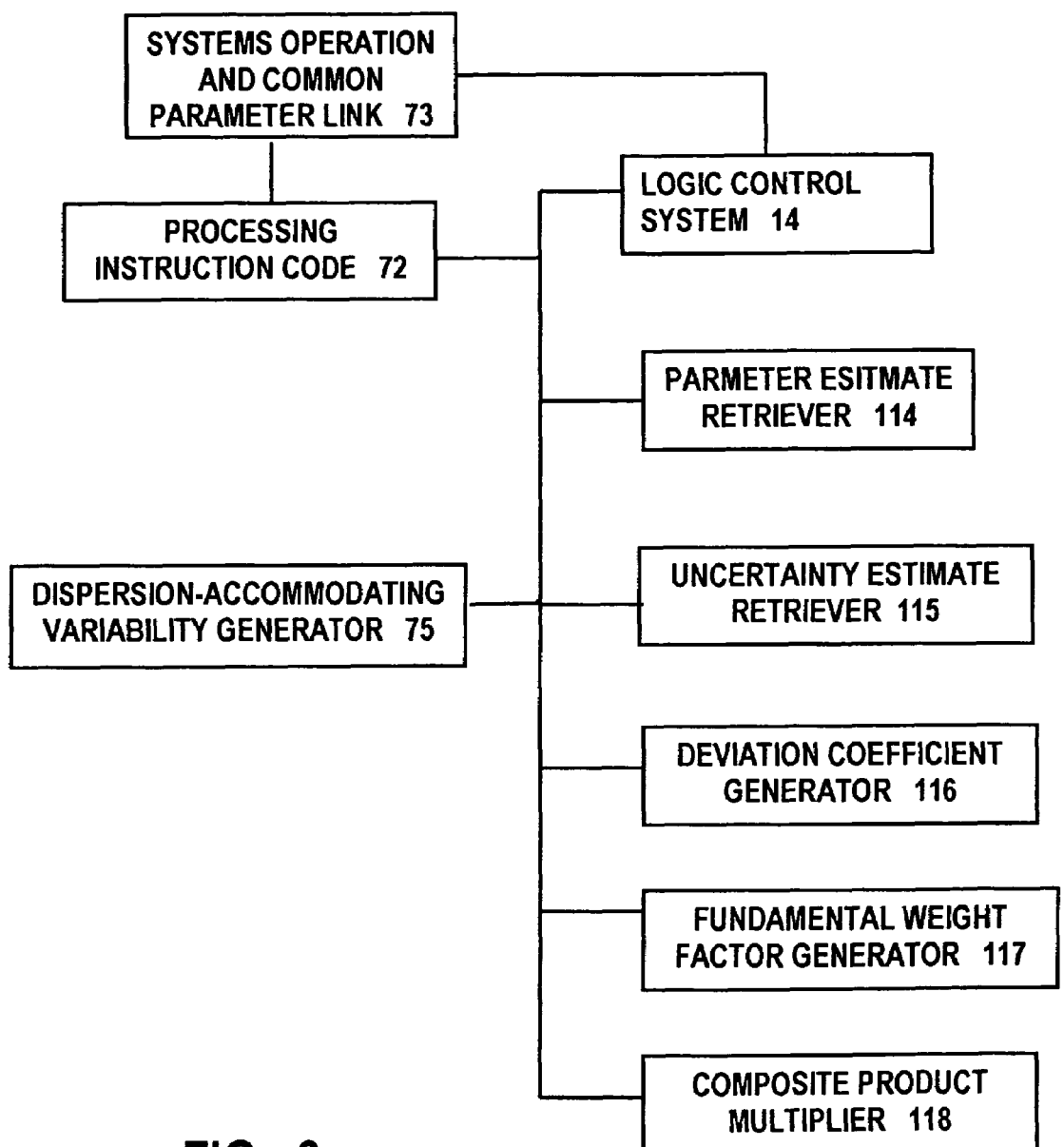

FIG. 6 depicts a composite weight factor generator comprising a logic control system and functional components which are activated in accordance with the present invention.

Figure 7:
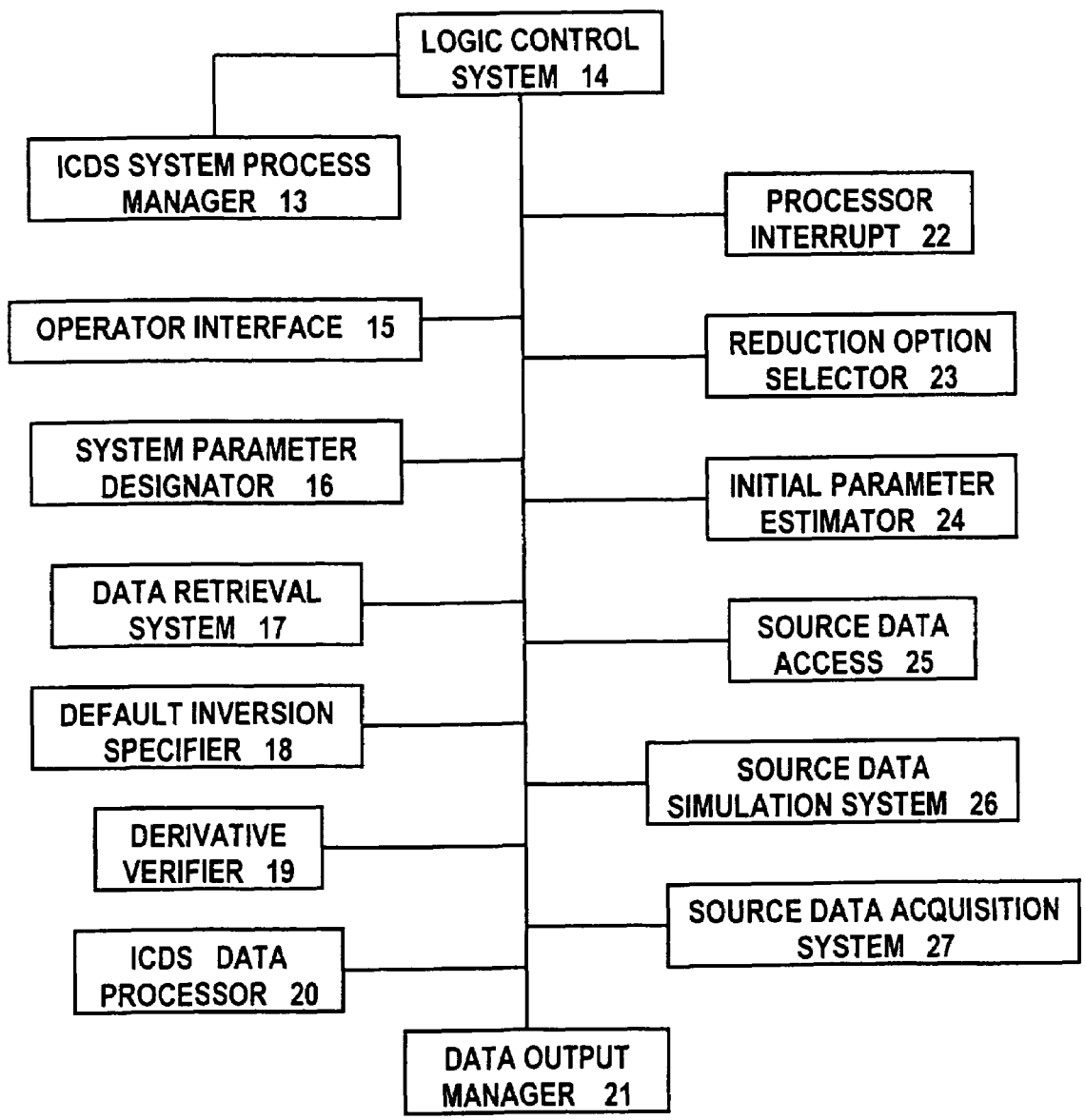

FIG. 7 depicts an inversion-conforming data sets processing system comprising a logic control system and functional components which are activated in accordance with the present invention.

Figure 8:
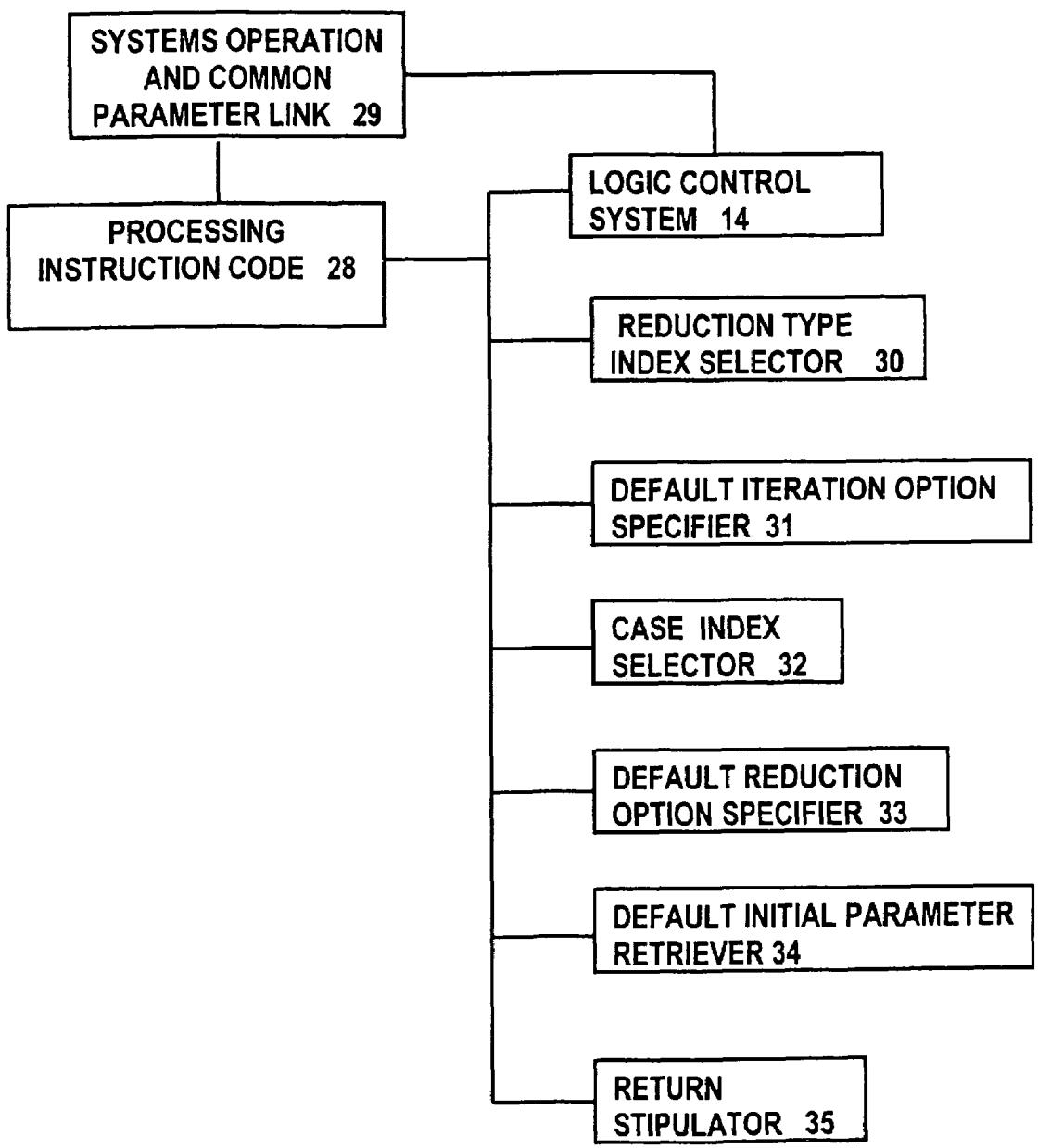

FIG. 8 depicts a default inversion specifier as including processing instruction code which is interfaced with a systems operation and common parameter link and functional components which are activated in accordance with the present invention.

Figure 9:
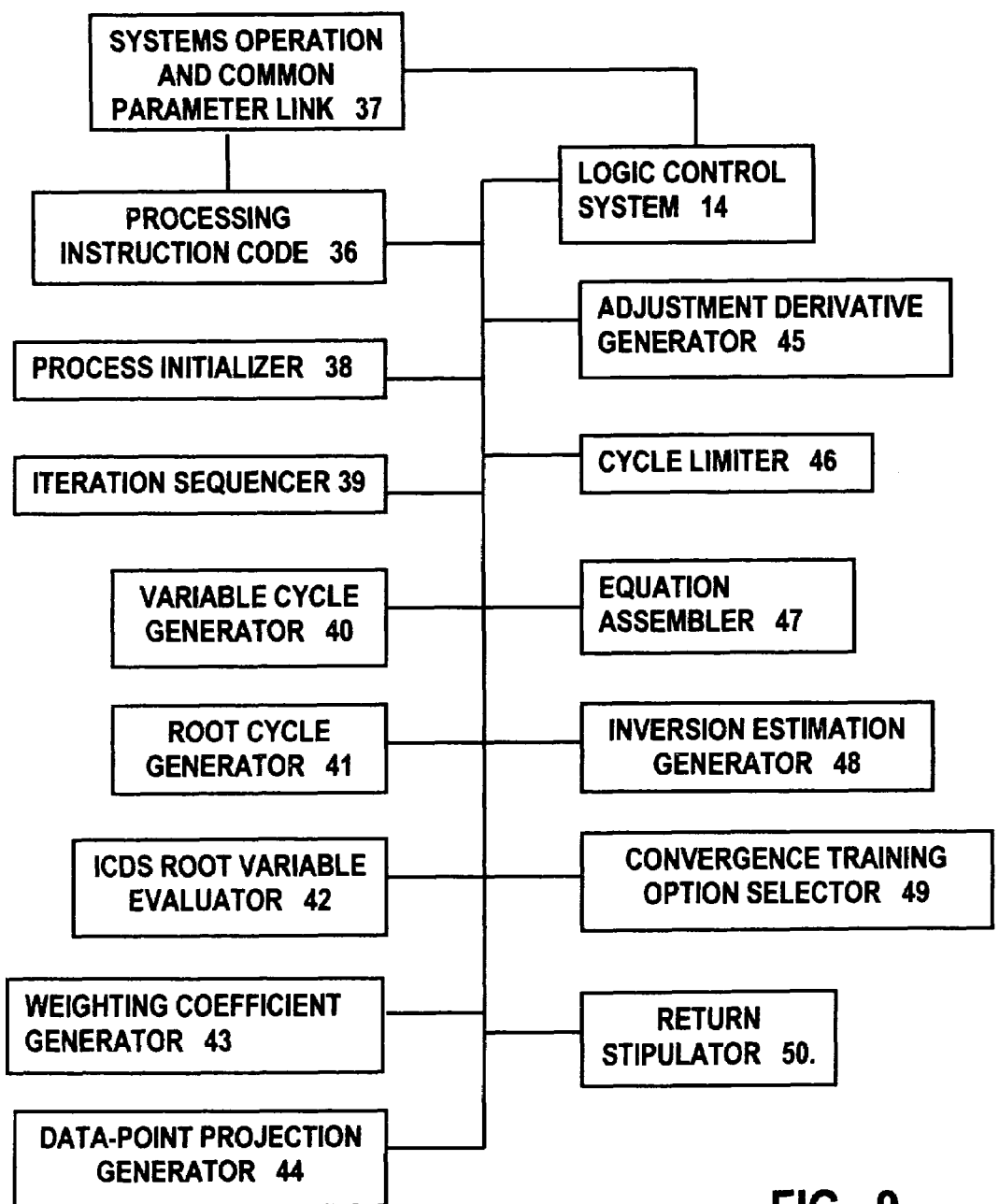

FIG. 9 depicts an inversion-conforming data sets data processor as including processing instruction code which is interfaced by a systems operation and common parameter link and functional components which are activated in accordance with the present invention.

Figure 10:
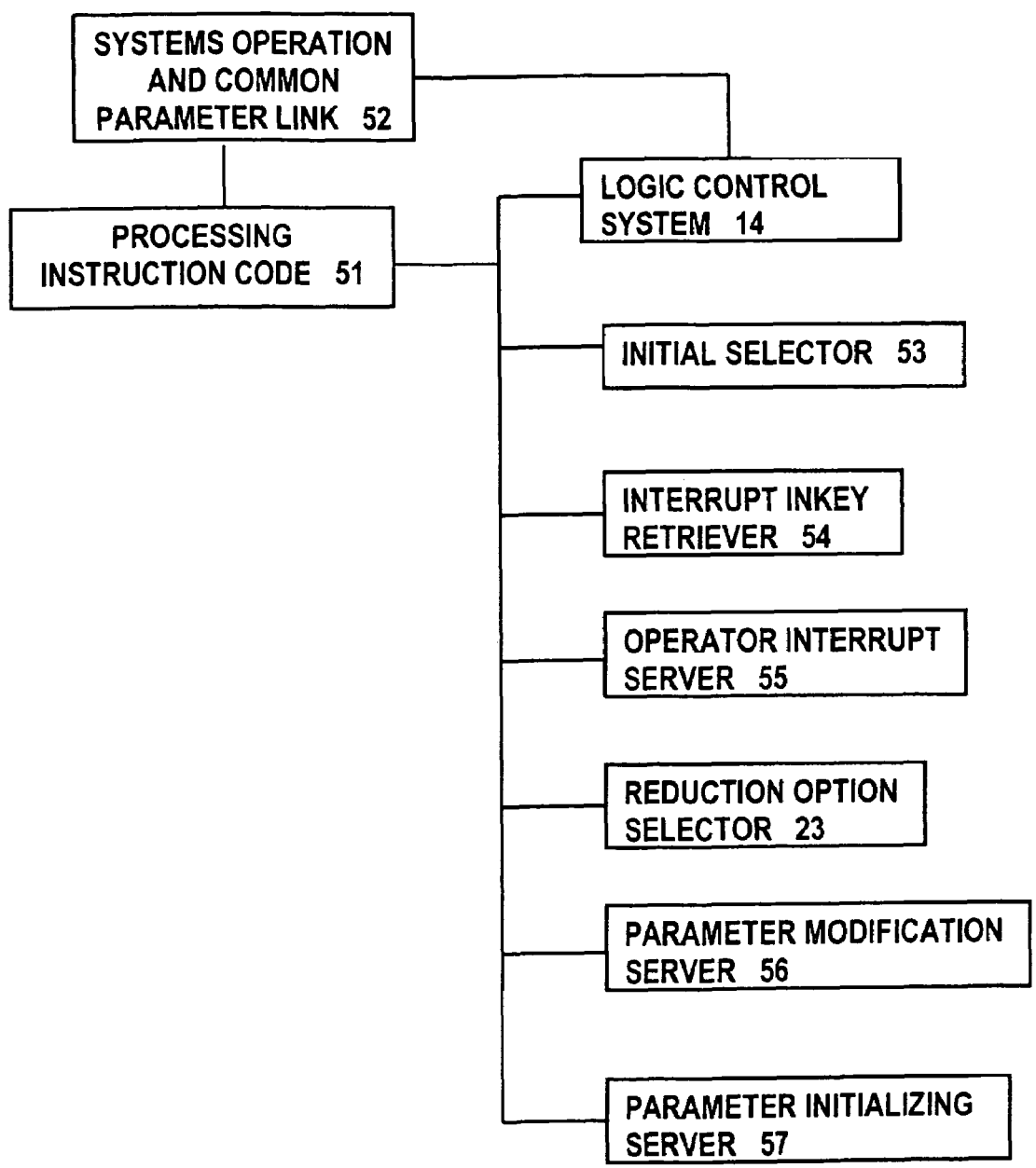

FIG. 10 depicts a processor interrupt and a respective interrupt service as including processing instruction code which is interfaced by a systems operation and common parameter link and functional components which are activated in accordance with the present invention.

Figure 11:
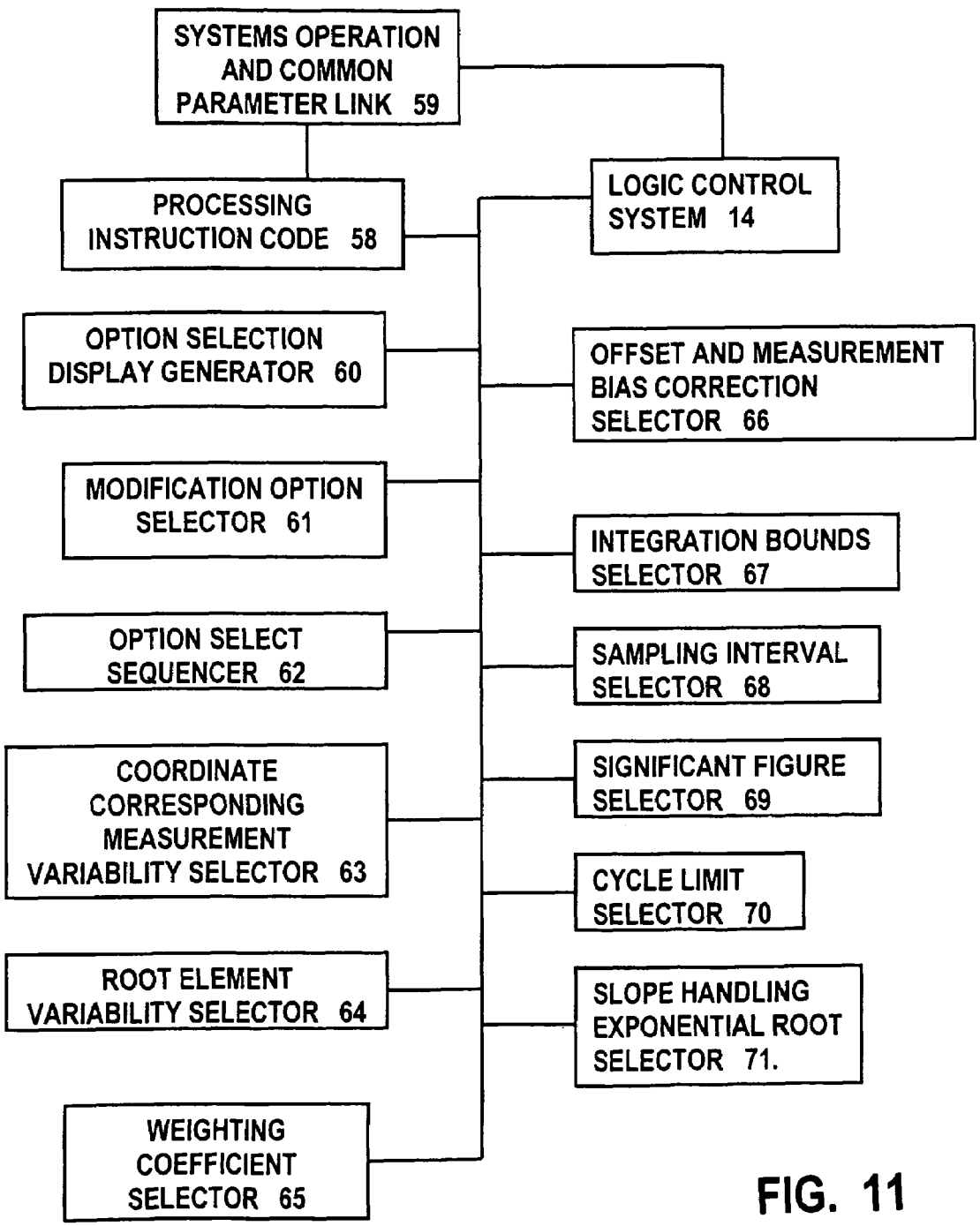

FIG. 11 depicts a reduction option selector as including processing instruction code which is interfaced by a systems operation and common parameter link and functional components which are activated in accordance with the present invention.

Figure 12:
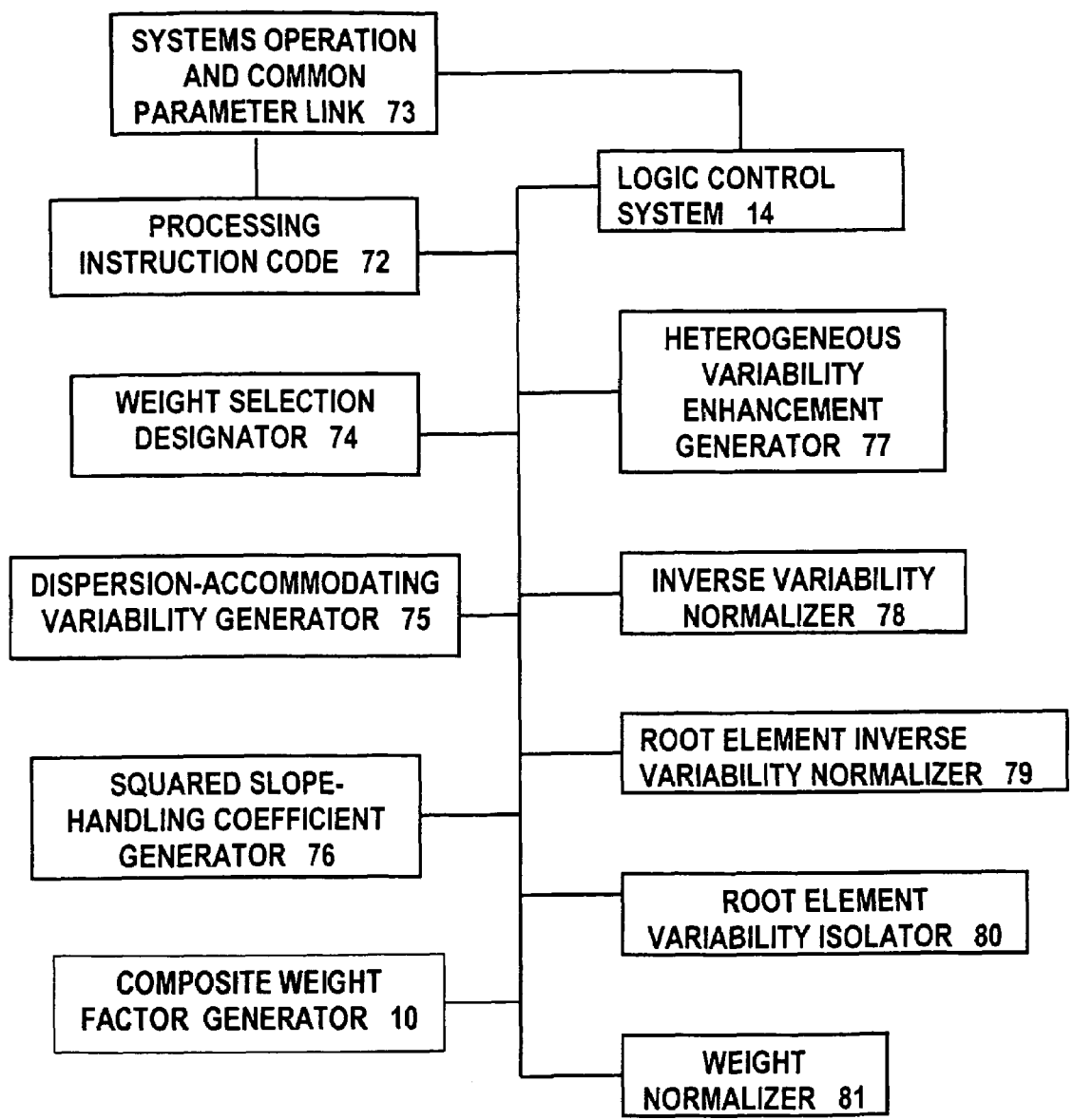

FIG. 12 depicts a weight factor generator as including processing instruction code which is interfaced by a systems operation and common parameter link and functional components which are activated in accordance with the present invention.

Figure 13:
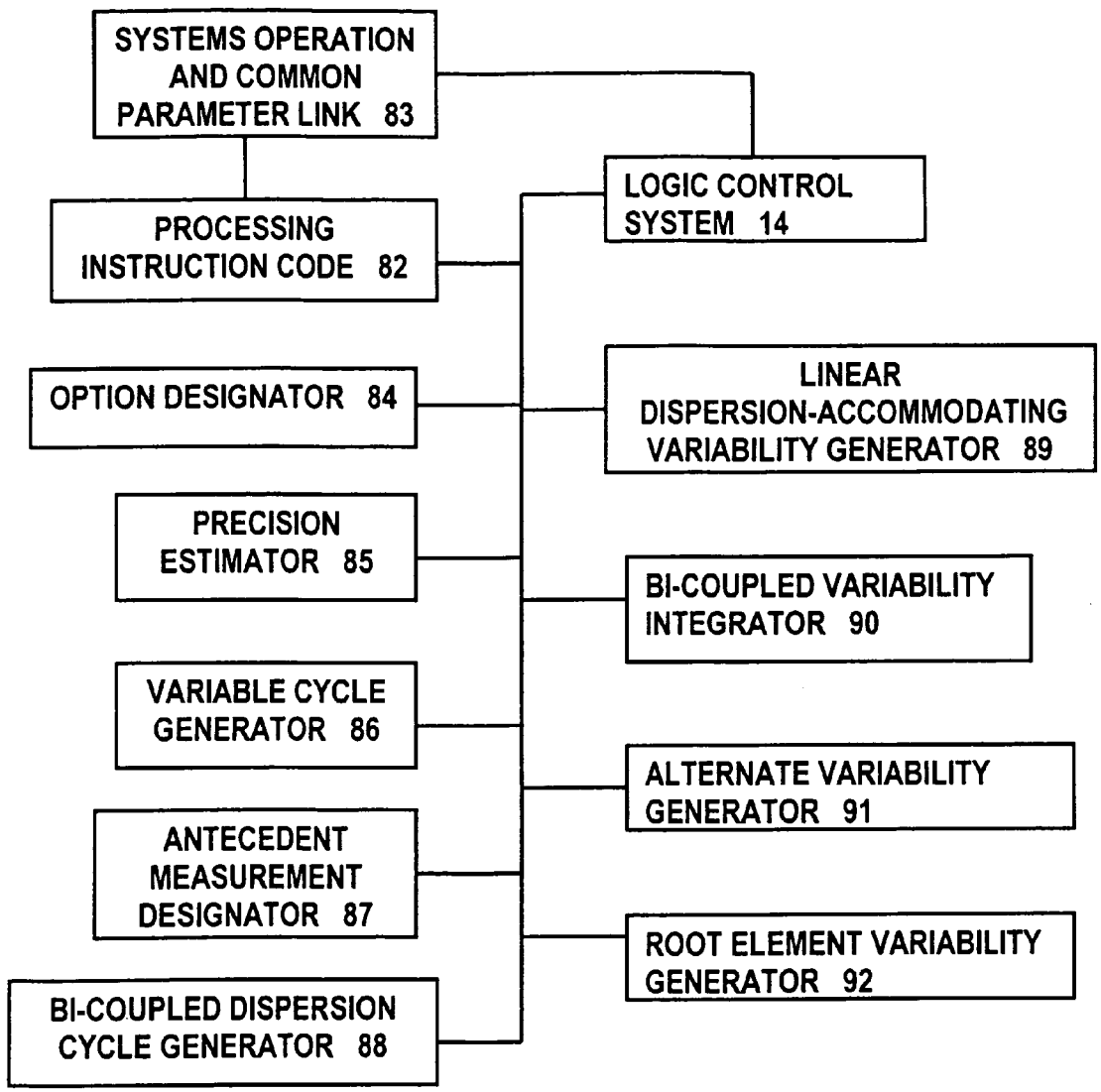

FIG. 13 depicts a dispersion-accommodating variability generator as including processing instruction which is interfaced by a systems operation and common parameter link and functional components which are activated in accordance with the present invention.

Figure 14:
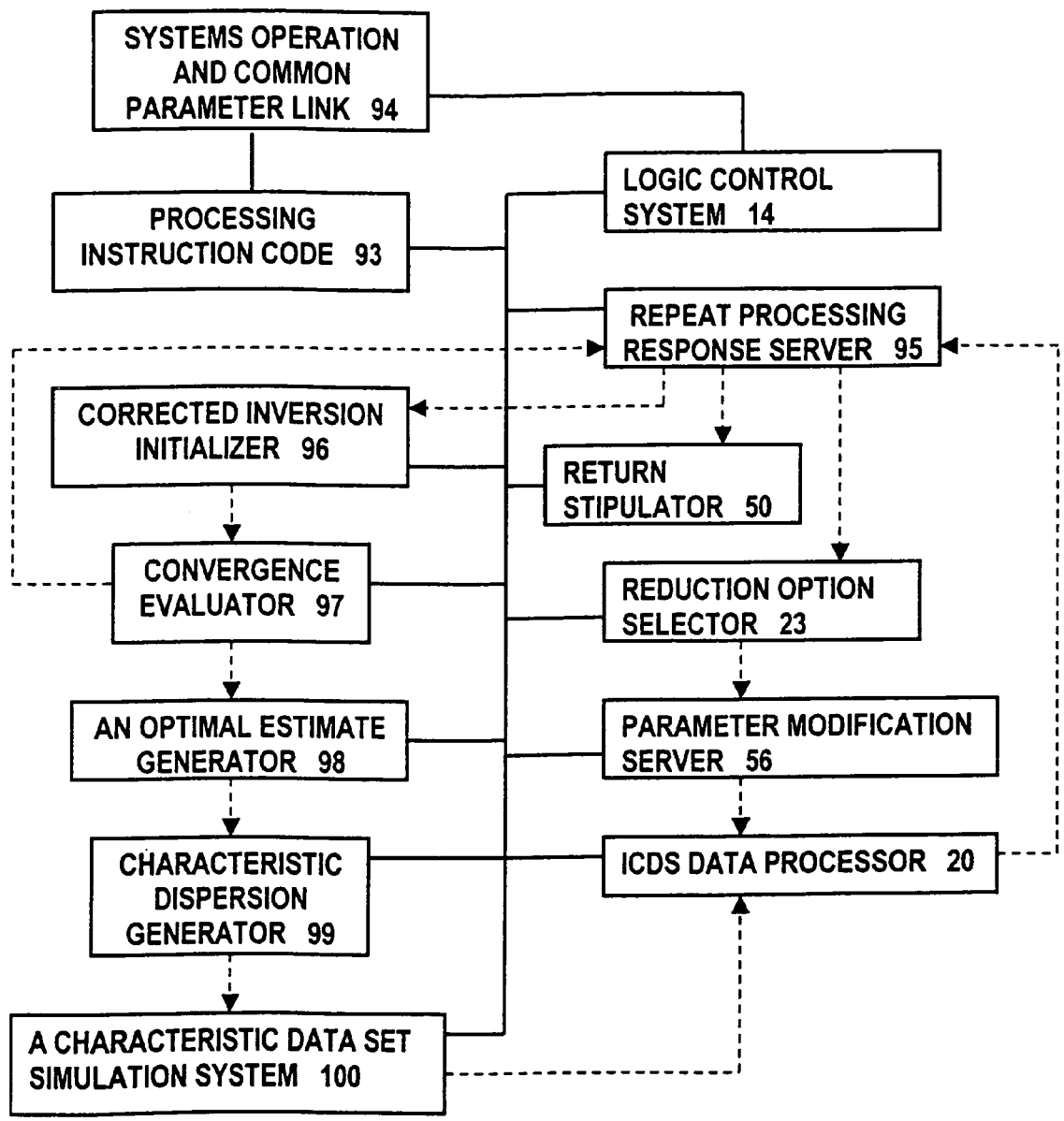

FIG. 14 depicts an example of a convergence training option selector as including processing instruction which is interfaced by a systems operation and common parameter link and functional components which are activated in accordance with the present invention.

Figure 15:
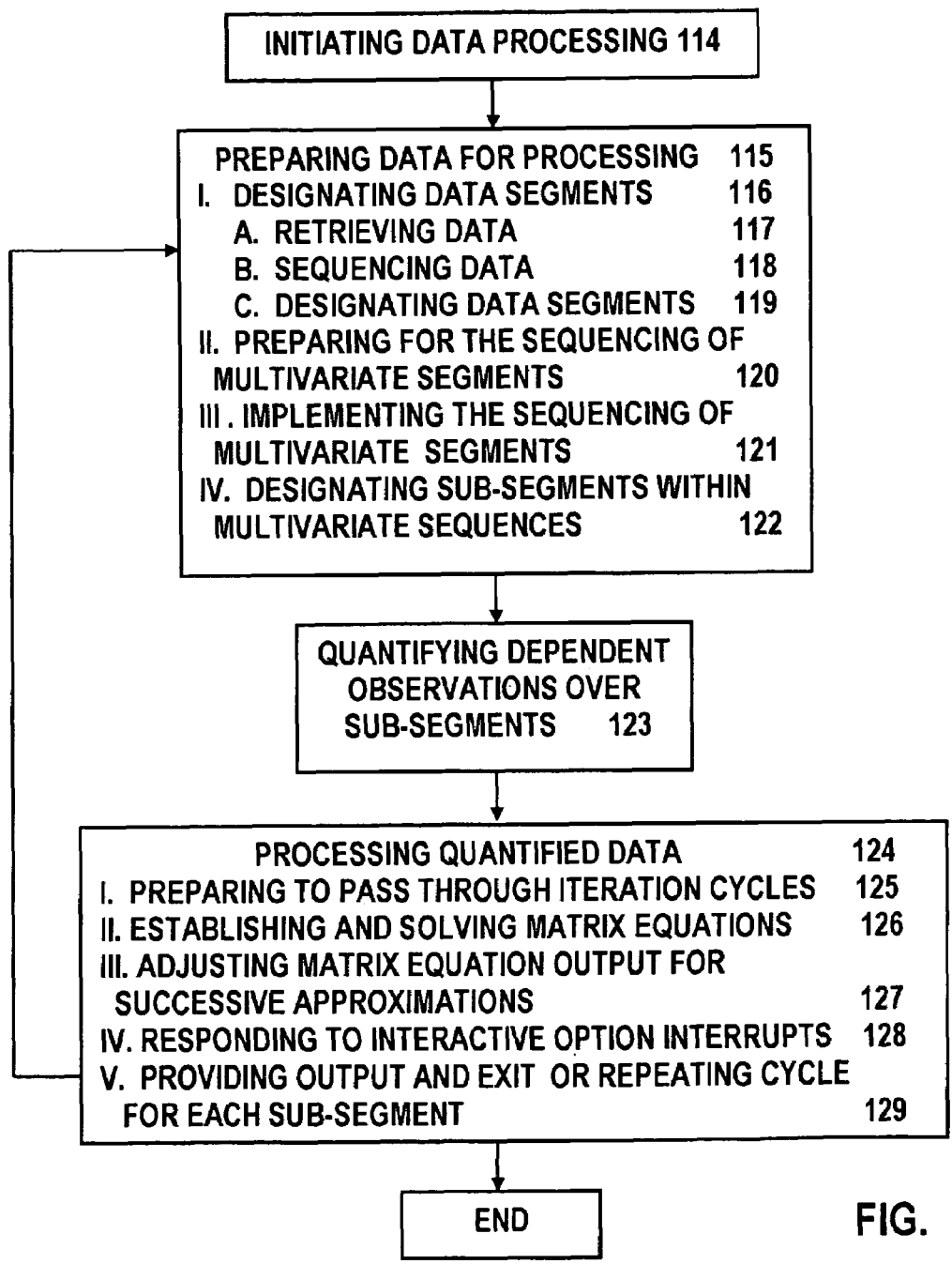

FIG. 15 enumerates exemplary steps for processing unquantifiable observations by methods which include two dimensional segment inversions in accordance with the present invention.

FIG. 16 depicts exemplary QBASIC command code for quantifying dependent observations in accordance with the present invention.

FIG. 17 depicts exemplary QBASIC command code for preparing independent observation samples for quantifying dependent observations in accordance with the present invention.

FIG. 18 depicts exemplary QBASIC command code for segmenting independent observations in accordance with the present invention.

FIG. 19 depicts exemplary QBASIC command code for preparing simulated independent observation samples for two dimensional application in accordance with the present invention.

FIG. 20 depicts exemplary QBASIC command code for preparing simulated independent observation samples for three dimensional application in accordance with the present invention.

FIG. 21 depicts exemplary QBASIC command code for sequencing numerical representations in accordance with the present invention.

FIG. 22 depicts exemplary QBASIC command code for distinguishing constant variable segments in accordance with the present invention.

FIG. 23 depicts exemplary QBASIC command code providing means for sequencing multivariate segments in accordance with the present invention.

FIG. 24 depicts exemplary QBASIC command code for quantifying dependent observations in accordance with the present invention.

FIG. 25 depicts exemplary QBASIC command code being implemented to process quantified data in accordance with the present invention.

FIG. 26 depicts QBASIC command code establishing an exemplary matrix equation for processing quantified observations in accordance with the present invention.

FIG. 27 depicts exemplary QBASIC command code providing an interactive selection of reduction options in accordance with the present invention.

Figure 28:
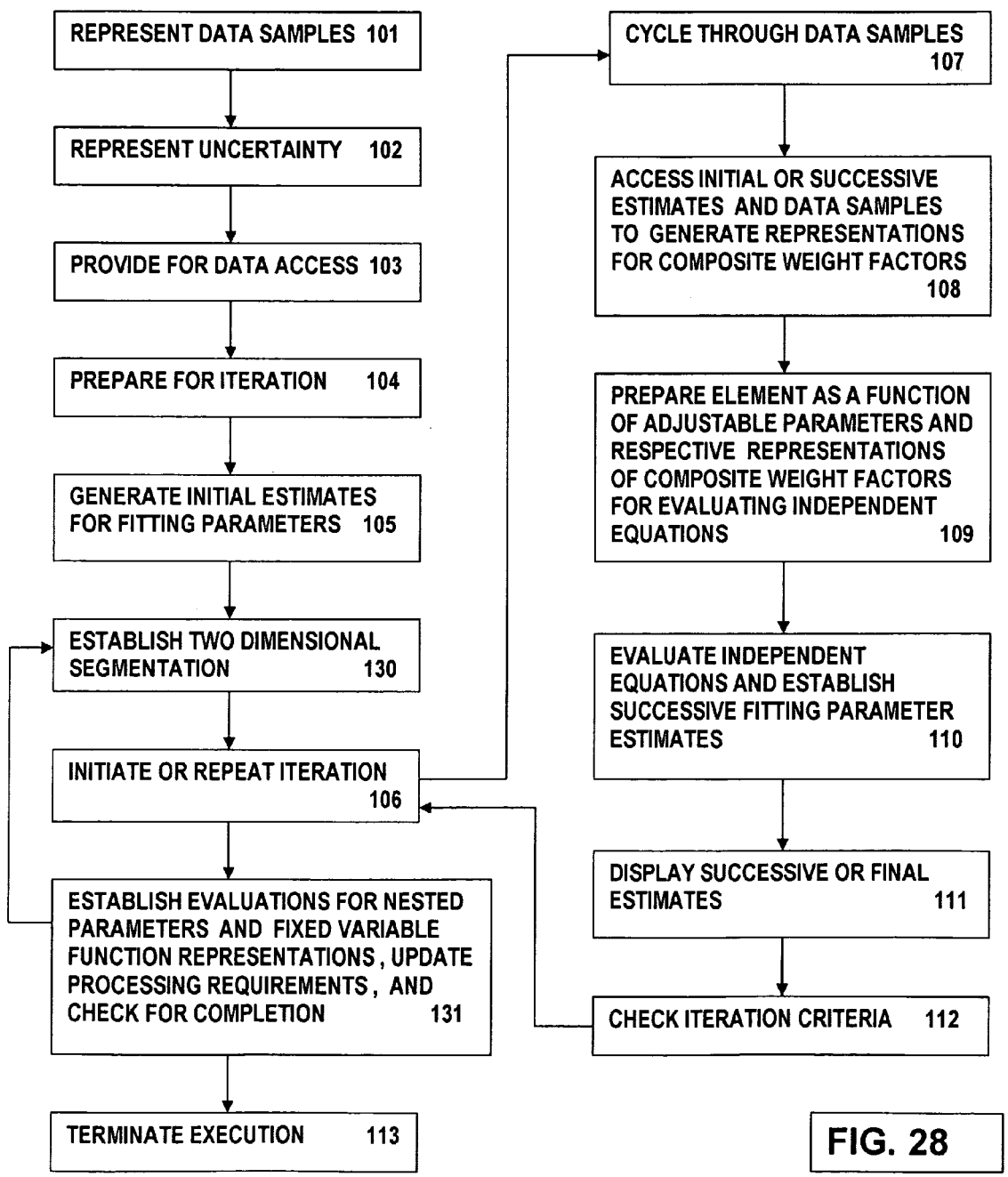

FIG. 28 depicts an exemplary flow diagram for rendering weighted maximum likelihood estimating as enhanced by two dimensional segment inversions in accordance with the present invention.

DETAILED DESCRIPTION OF THE INVENTION

Figure 1:
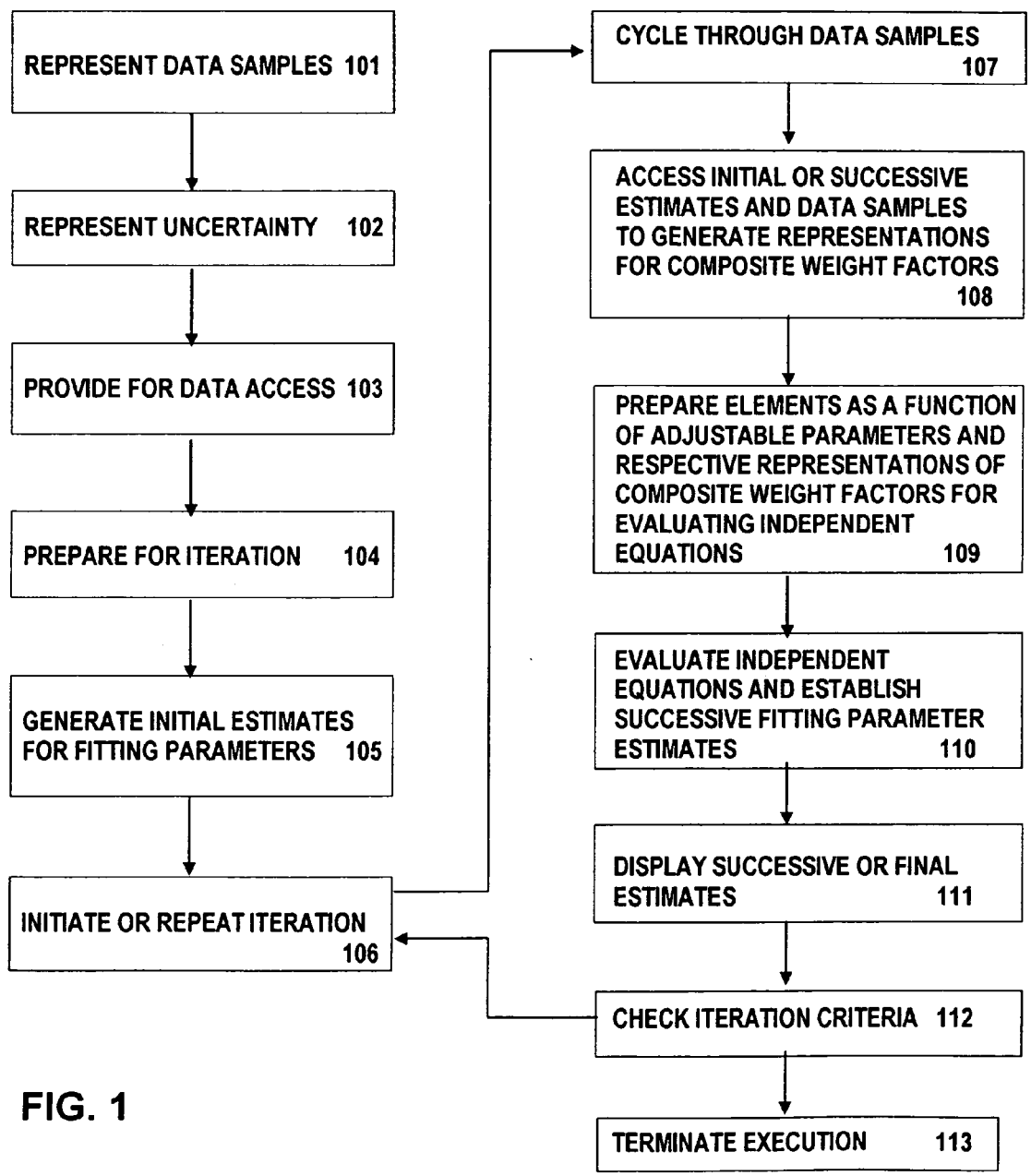

Referring now to FIG. 1 with reference to Examples 8 and 9, FIG. 1 represents a typical flow diagram for rendering automated forms of maximum likelihood estimating including simple forms of inversion-conforming data sets processing and alternate forms of regression analysis which involve rendering weight factors as a function of successive estimates for fitting parameters. The general process involves acquiring and representing data sample 101, establishing and representing measurement uncertainty 102, providing means for controlled data access 103 as associated with at least some form of automated data processing, preparing for iteration 104, inputting or generating initial estimates 105, initiating and continuing with iteration 106, and in correspondence with successive approximating, retrieving and cycling through data samples 107, accessing and implementing current estimates and respective data to establish respective weighting of squared residuals or squared data-point projections 108, preparing elements for data inversion 109, evaluating fitting parameter successive approximations 110, providing output of results 112, checking iteration criteria 113, and either continuing iteration or providing final results 114.

With reference to Examples 8 and 9, the parametric fitting equation ln Y=E ln X+ln A represents a classic equation which is associated with linearization of the nonlinear fitting function $y=Ax^E$. Anyone who is familiar with exponential curve fitting will most likely be aware that, for said parametric fitting equation, the transformed data samples, ln Y, are almost always represented by skewed error distributions.

Examples 8 and 9 illustrate the contrast between regression analysis of linearized data rendered with and without including composite weight factors in accordance with the present invention. Example 8 presents traditional manipulations which provide only one or two significant figures. Example 9 demonstrates the merits of rendering data processing systems and respective forms of data processing, as considered with respect to single component residual deviations so as to include the implementing of composite weight factors as defined and respectively implemented in accordance with the present invention. Results demonstrated in Example 9, in accordance with the present invention, are accurate within the computational limits of the processing system and associated algorithms. Also, in accordance with the present invention, Example 9 provides an example which allows for both slope handling and heterogeneous uncertainty by including an appropriate representation of composite weight factors.

Concepts unique to the results demonstrated in Example 9 and to other applications of the the present invention, which can be alternately applied to any number of maximum likelihood and least-squares processing variations and respective data processing equipment, include the data processing steps of:

1. determining proportionate or specific form for rendering normalization weighting coefficients, such that said coefficients when respectively multiplied times corresponding error deviations will render said error deviations as assumed to be represented by a non-skewed homogeneous uncertainty distribution. If said error deviations already are assumed to be represented by a non-skewed uncertainty distribution, or if there is assumed to be no error in said residual deviations, said proportionate or specific normalization coefficients should be alternately replaced by zero or an appropriate constant value. In accordance with the present invention, determination of an appropriate form for representing said proportionate or specific normalization coefficients may either be provided by external effort and correspondingly included in the automated aspects of data processing or alternately established by internal workings of multiple stage data processing.

2. determining proportionate or specific form for representing a set of fundamental variables as representative of data samples either by an inherent property associated with the method of sample acquisition or by variable and respective data transformations or by variable and respective data normalizations, such that all considered, associated, and assumed-to-be error-affected sample observations can be represented by respective non-skewed homogeneous data representations for the generating or representing of fundamental weight factors. In accordance with the present invention, it may not be necessary to actually subject variables and respective data to said transformation or said normalization in order to establish said respective non-skewed homogeneous data representations in manipulations for the generating of said fundamental weight factors. Variables which might be assumed or considered to be error-free may, but need not, be transformed, manipulated, or normalized to be considered as part of said set of fundamental variables.

3. representing form for fundamental weight factors, in correspondence with said fundamental variables and a functional description as equal to the inverse of the square of the products of the $N^{th}$ roots of the partial derivatives of normalized function deviations, individually taken with respect to said fundamental variables which are assumed to be representative of said data samples, said function deviation representing established form for considering said error deviations in correspondence with said functional description.

4. representing form for composite weight factors as the product of said proportionate or specific form for rendering normalization weighting coefficients and said form for fundamental weight factors. It may be assumed that the respective set of associated composite weight factors may be alternately represented as multiplied or divided by constant values. Hence, said weighting coefficients which correspond to assumed homogeneous error-free deviations need not be included, and said weighting coefficients which correspond to homogeneous representations of uncertainty may, but need not necessarily, be included.

5. representing addends which are weighted in proportion to said composite weight factors and which combine to establish a functional description of said observations.

Referring now to FIG. 2 with reference to Example 8 and continued reference to FIG. 1 and Examples 8 and 9, FIG. 2 depicts an example of dedicated QBASIC code for rendering linearized regression analysis along with representing a pre-considered form for including composite weight factors in accordance with the present invention. The code of FIG. 2 has been written in an easy-to-follow format following the flow diagram as presented in FIG. 1, and representing the data and equations as presented in Example 9. FIG. 2 does, in fact, illustrate the code that was used in generating the results of Example 9, and clearly demonstrates the effectiveness of implementing composite weight factors over the commonly suggested reduction techniques (Amir WVadi Al-Khafaji and John R. Tooley, *Numerical Methods in Engineering Practice*, Holt, Rinehart and Winston Inc., pp. 315-318, 1986.) as exemplified in Example 8, and over the method of discriminate reduction data processing including the representation of transformation weight factors (Ref. U.S. Pat. No. 5,619,432.) as exemplified in Example 7.

Referring now to FIG. 3, in accordance with the present invention, inversion-conforming data sets (ICDS) are sets of coordinate designating elements which correspond to the projection of elements of data-point sets (or data-point defining sets) along corresponding coordinates onto a representation of a data inversion comprising an approximating relationship or a considered estimate of the same. For example, the Y element of the two dimensional error-affected data-point set, (X, Y), 1, being respectively projected parallel to the y coordinate axes onto the locus of a fitting approximation 2, as in FIG. 3; will establish the inversion-conforming data set, (x, y), 3, comprising a determined measure for the y variable being restricted to the confines of said fitting approximation as a function of the orthogonal datum sample X. Assuming said fitting approximation to represent a true approximating relationship, then the uncertainty of a correct placement of said determined measure along said confines is dependent solely upon possible dispersions in the sampling of orthogonal measurements being related to said determined measure by said fitting approximation.

Similarly, the X element of said two dimensional error-affected data-point set being respectively projected parallel to the x coordinate axes onto the locus of said fitting approximation, will establish the inversion-conforming data set, (x, Y), 4, comprising a determined measure for the x variable being restricted to the confines of said fitting approximation as a function of the datum sample Y, said determined measure for the x variable being considered dependent upon the sampled value of Y as represented in correspondence with respective fitting parameters estimates and a respectively rendered fitting approximation.

Hence, in accordance with the present invention, and assuming an appropriate approximating relationship, variability in the representation of respective data-point projections 5 and 6 can be considered to be dependent solely upon considered variability in the sampling of the orthogonal elements of respective ICDS. Each respective inversion conforming data set will comprise a root solution element and at least one other element which is orthogonal to said root solution element. The elements of each of said ICDS will correspondingly designate the coordinates of a respective point which will conform to the locus of said data inversion or a current estimate of the same. The corresponding orthogonal data-point projections, X–x, 5, and Y–y, 6, as demonstrated in FIG. 3 (or alternately oriented as x–X and y–Y) may be generated as the difference between the error-affected data-point set elements. X and Y, and the root solution elements, X and y, of the respective ICDS; or since proportionate representation of said data-point projections is sufficient for rendering ICDS processing, said data-point projections can be alternately represented as the difference between said root solution elements and said error-affected data-point set.

In accordance with the present invention, the rendering of FIG. 3 in correspondence with only two dimensions does not imply limiting applications of the present invention to only two degrees of freedom. Symbols and pictorial representation are included herein for purposes of clarification, and not for designating nor limiting the specific number of degrees of freedom.

Referring now to FIG. 4 with reference to Examples 12, 13, and 15, and continued reference to FIG. 1, concepts of composite deviation weighting by generating and implementing composite weight factors combined with concepts of inversion-conforming data sets processing (Ref. U.S. patent disclosure Ser. No. 10/347,279.) provide for a whole new vista in the processing of errors-in-variables data. Examples 12, 13, and 15 illustrate concepts for incorporating composite weight factors into the formulating of maximum likelihood estimators for errors-in-variables applications. Example 12 is limited to a linear bivariate application, the discussion in the example establishes concepts for general multivariate applications, including both homogeneous and heterogeneous errors-in-variables ICDS processing. Iterated results are presented which verify the method for both homogeneous and heterogeneous applications, and in consideration of the discussion in Example 13, the results as provided for homogeneous uncertainty establish means for rendering homogeneous errors-in-variables applications without requiring foreknowledge of relative uncertainty in orthogonal variable measurements. Example 15 provides for extending applications from the bivariate linear example of Examples 12 and 13 to nonlinear multivariate applications. FIG. 4 illustrates an example of dedicated QBASIC code for rendering linear bivariate errors-in-variables inversion-conforming data sets processing and implementing composite weight factors. The code of FIG. 4 has been written in an easy to follow format following the flow diagram, as presented in FIG. 1, and representing the data and equations as presented in Example 12. The command code presented in FIG. 4 is the same code that was used in generating the results of Example 12.

Referring now to FIG. 5, in accordance with the present invention ICDS processing (i.e., inversion-conforming data sets processing) is a form of data processing which implements means for accessing and processing information whereby parameter related approximations may be generated in correspondence with a plurality of data-point projections, said data-point projections being considered in correspondence with respective ICDS.

Referring back to FIG. 3, data processing is considered to be a form of inversion-conforming data sets processing, if said data processing substantially includes at least one of the following:

1. the summing together of at least some addends over at least two variable degrees of freedom during or prior to inversion processing, said at least some addends being rendered with normalized and/or weighted or alternately corresponding consistent units for addition processing, and said at least some addends being generated in correspondence with respective data-point projections (e.g. 5 and 6), said data-point projections being related to corresponding ICDS (e.g. 3 and 4), at least two of said ICDS corresponding (in one to one correspondence) to two orthogonal data-point projections along (or parallel to) coordinates which respectively correspond to said at least two variable degrees of freedom, said data-point projections intersecting a respective approximating relationship (e.g. 2) at said corresponding ICDS (e.g. 3 and 4);

2. the weighting of squared deviations in correspondence with more than one degree of freedom with respective composite weight factors, said composite weight factors comprising a product of fundamental weight factors and squared deviation normalizing coefficients, said fundamental weight factors being rendered in correspondence with the product of said deviations and said squared deviation normalizing coefficients, said deviations being representative of respective data-point projections, said deviation normalization coefficients being rendered in correspondence with orthogonal variable uncertainty so as to establish normalized said data-point projections as characterized by non-skewed homogeneous error distributions;

3. the rendering of composite projection normalizing coefficients in proportion to the square root of at least one form of fundamental weight factor, said composite projection normalizing coefficients being rendered and implemented to establish normalizing of data-point projections respectively corresponding to at least one variable degree of freedom in correspondence with said ICDS.

Considering these three items of technique in accordance with the present invention:

Item 1, The summing together of addends over at least two variable degrees of freedom during inversion processing establishes a plurality of data-point projections in correspondence with at least two variable degrees of freedom and allows for optimizing data inversions in correspondence with more than a single dimension.

Item 2, Composite weight factors being rendered in correspondence with the present invention as products of fundamental weight factors and the square of proportionate or specific normalization coefficients may be implemented to provide forms of inversion-conforming data sets processing. And, Item 3, The rendering of composite projection normalizing coefficients in proportion to the square root of fundamental weight factors provides for the unifying of local slopes and the establishing of equivalent units for combining representations of a plurality of data-point projections in correspondence with respective ICDS.

Depending upon the specific application, any one or any combination of these three items of technique may be combined with or replaced by other reduction techniques in whole or in part to alternately generate suitable, preliminary, or spurious renditions of said ICDS processing in correspondence with the present invention.

Now referring back to FIG. 1 with reference to Examples 9, 10, and 11, in accordance with the present invention, FIG. 1 depicts a simple generic representation for rendering alternate forms of weighted maximum likelihood estimating, including both ICDS processing and weighted regression analysis and including both errors-in-variables representations and errors limited to the representing of single component residuals. Example 9, 10, and 11 demonstrate composite weight factors being implemented along with residual deviations, for representing forms of nonlinear bivariate regression analysis applications in accordance with the present invention. Example 11 establishes form for representing errors-in-variables regression analysis in accordance with the present invention. In contrast to IDCS processing, composite weight factors and/or composite normalizing coefficients may be rendered in accordance with the present invention and implemented in conjunction with evaluation techniques which are limited to considering single component variations or combined component error deviations as assumed to be represented by single vector displacements of scattered measurements from unknown true values, excluding alternately considered normalizing coefficients of similar construct being implemented to establish weighting of displacements of sampled measurements from assumed true values (i.e. excluding inverse deviation variation weighting coefficients being implemented as a form of inverse deviation variation weighting to provide weighting of function-related deviations, (Ref. U.S. Pat. No. 6,181,976 B1.); also excluding weight factors of similar construct being implemented for the weighting of squared deviations or "squared approximation deviations" while providing at least one form of Discriminate Reduction Data Processing for the evaluation of approximating parameters which substantially minimize parametric expressions which are assumed to represent sums of squares of coordinate-normalized datum variances (Ref. U.S. Pat. Nos. 5,619,432; 5,652,713; and 5,884,245.)

Referring back to FIG. 5, FIG. 5 depicts an example of ICDS processing as related to the representation of inversion-conforming data sets. In accordance with the present invention information being considered for inversion is passed as an ensemble of samples comprising variable measurements or provided data, e.g., $(X_{1k}, \ldots, X_{nk}, \ldots X_{\mathbf{u}k})$, 7, to a root element determinative 8, where they are interfaced with approximative form to determine root solution elements which establish respective ICDS 9. Said respective ICDS as determined are availed to a composite weight factor generator 10, for rendering composite weight factors or alternate weighting as specified. Said weight factors or said alternate weighting together with pertinent elements of said ensemble and said respective ICDS are passed to an equation assembler and inversion processor 11, wherein said samples are manipulated and combined by operations, which include the summing of addends, to render a respective data inversion and generate respective inversion output 12.

In accordance with the present invention, for applications in which uncertainty is either ignored or neglected, said uncertainty may be replaced by constant values for the purpose of rendering at least proportionate component representation of normalization coefficients, thereby establishing proportionate representation of composite weight factors.

Now referring to FIG. 6, with reference being also made to FIG. 4, a normalized deviation, as considered in the context of this disclosure, is either a residual deviation or a data-point projection which is characterized by a non-skewed homogeneous error distribution.

An evaluated function deviation would be an estimate of the variation of a fitting function from true form, said evaluation being considered by transferring all terms and represented variables to one side of an approximating equation and hypothetically evaluating said one side with respect to error-free data. The difference between said evaluation and zero would represent said variation. Such an evaluation can only be rendered for data in which the true values might be established.

A function deviation, without considering whether or not it can be evaluated, can be considered as all terms of an estimated fitting function being rendered on one side of an approximating equation. The function deviation is then defined as the difference between said one side and zero.

A normalized function deviation, as defined in accordance with the present invention, is a function deviation which is multiplied by a proportionate or specific normalization coefficient, so as to render the respective residual deviations or data-point projections when multiplied by the same said normalization coefficient to be characterized by non-skewed homogeneous uncertainty distributions. In applications in which measurement error is insignificant, representation of uncertainty may be replaced by zero or an appropriate constant value in representing a respective normalization coefficient.

Note that normalization coefficients provided for residual deviations are not of the same construct as normalization coefficients which are provided for data-point projections as the variability in representing data-point projections will not include the measurement variance of the determined variable.

In accordance with the present invention, composite weight factors provide the key to establishing statistically accurate representations of error-affected data. They are formulated as the product of fundamental weight factors and the square of respective deviation normalization coefficients. Fundamental weight factors are formulated by operating on normalized function deviations to establish an appropriate root of the square of the product of partial derivatives of said normalized function deviations taken with respect to appropriately normalized variables.

FIG. 6 depicts components which might be implemented in rendering an adaptable composite weight factor generator 10, including a systems operation and common parameter link 73, to a logic control system 14, for providing command control of functional components including: a parameter estimate retriever 114, an uncertainty estimate retriever 115, a dispersion-accommodating variability generator 75, a deviation coefficient generator 116, a fundamental weight factor generator 117, a composite product multiplier 118.

The parameter estimate retriever 114 maintains or retrieves updated estimates of approximating parameters or successive approximations to fitting parameters, as available for manipulations for generating updated equation array elements for the evaluation of successive approximations.

An uncertainty estimate retriever 115 provides for the access of representation for sample related uncertainty to be implemented in the formulating of said array elements in correspondence with said successive approximations. (Note that for homogeneous uncertainty, said representation should be constant, but need not be concise. For heterogeneous uncertainty, proportionate representation should be provided.)

The dispersion-accommodating variability generator 75 provides for the generating of dispersion-accommodating variability in accordance with the present invention, and may also provide for the selecting and generating of one or more alternate choices for the rendering of measurement variability.

The deviation coefficient generator 116 provides representation of said deviation coefficient as rendered in the products of fundamental weight factors mMultiplied by the square of said deviation coefficients; said deviation coefficient may be represented either in whole, in parts, or in correspondence with a template for representing addends to be summed together to establish equation elements.

The fundamental weight factor generator 117, and the fundamental weight factor generator 116 provides representation of fundamental weight factors as rendered in the products of fundamental weight factors multiplied by the square of said deviation coefficients, said fundamental weight factors being represented as a function of said deviations multiplied by said coefficients. Fundamental weight factors may be represented either in whole, in part, or in correspondence with a template for representing addends to be summed together to establish equation elements.

The composite product multiplier 118 provides representation of the products of said fundamental weight factors and said deviation coefficients. Said products may be represented either in whole, in part, or in correspondence with a template for representing addends to be summed together to establish equation elements.

The deviation coefficient generator 116, the fundamental weight factor generator 117, and the composite product multiplier 118 may be rendered as separate components, may be combined together into one or more component, or may be combined in whole or in part together with a data-point projection generator to establish said equation elements as, for at least one example, is demonstrated by the by the QBASIC code of FIG. 4.

Now referring to FIG. 7, in accordance with the present invention ICDS processing systems are equipped to receive data and to provide steps of automated or semi-automated ICDS processing, thereby providing data reductions and means or media to transfer, store, display, or produce data representations that are assumed to be consistent with variations which are characterized by information being processed. Also, in accordance with the present invention, the included components and peripherals of an ICDS processing system may be interrelated in providing non-independent functional components of integral system parts. The required complexity of a representative ICDS processing system may be dependent upon available information and the corresponding analytic or alternate form of the related approximative equation or descriptive representation, as well as the considered form for product output. Appropriate approximative relationships are generally determined by inherent characteristics of the data being processed.

The left hand portion of FIG. 7 depicts components which might be implemented in rendering an adaptable ICDS system process manager 13, including a logic control system 14, an operator interface 15, a system parameter designator 16, a data retrieval system 17, a default inversion specifier 18, a derivative verifier 19, an ICDS data processor 20, and a data output manager 21.

In accordance with the present invention, the system process manager 13 includes instruction code being acted upon by the logic control system 14 to retrieve data and establish the initial reduction selections and render general commands for executing subsequent processing and output controls.

In accordance with the present invention, a logic control system is a combination of systems or functional items, a machine or composite of machines, or a provided data processing component such as a computer chip, circuitry, or device, any of which provides controls, directly or indirectly, by signals which activate logic gate and/or switch control circuitry to provide at least some functions of data processing. A logic control system may also provide control by means of systems operation and common parameter links or alternate configurations for the receipt and transfer of parameters, commands, initial estimates, and/or coded function definitions as may be required. The logic control system 14 is configured with memory and means to effectuate sequential operation of functional components in compliance with operational design or command code which may be provided in the form of control-command logic such as binary code and/or integrated binary logic circuitry. In accordance with the present invention, said logic control system 14 is a logic control system which is configured to provide control to execute consecutively (or in order as designated) at least some steps that are essential to effectuate at least one form of ICDS processing.

The operator interface 15 provides for input commands, interrupts, and/or manual data entry as supported by the logic control system 14.

The system parameter designator 16 allocates representation for data and system-related parameters.

The data retrieval system 17 is an application adapted device, such as a user supplied subroutine or alternately dedicated system which, provides means for retrieving available data, including data that is to be operated upon during subsequent inversion processing.

The default inversion specifier 18 provides default initial estimates and default option selections for rendering said subsequent inversion processing.

The derivative verifier 19 provides an optional comparison of analytically represented or alternately rendered derivatives with assumed less accurate digitally evaluated derivatives in order to verify rendered form and to thereby establish valid representation for said subsequent inversion processing.

The ICDS data processor 20 provides said subsequent inversion processing.

The data output manager 21 provides for the handling of data output, including the rendering of inversions for representing and/or containment, and may include options such as portable memory management and/or enhanced forms of data-related display. Said data output manager may also provide means to transfer data representation to or from media and/or to provide alternate forms of product output.

Functions typical of an ICDS system process manager 13, as characterized in FIG. 7, are further exemplified by the command code which is listed in the included Appendix A, wherein exemplary management controls are rendered as QBASIC main program commands. Functions of data retrieval, default inversion specification, derivative verification, and ICDS processing are correspondingly exemplified by the rendered subroutines GETDATA, START, VERIFYD, and ICDSP, which are also included in Appendix A. The included examples of data output are limited to monitor display but may certainly be modified to provide alternate forms of data output management.

In addition to operations of said ICDS system process manager 13, the ICDS processing system, as rendered in FIG. 7, may support alternate functions and peripherals including: a processor interrupt 22, a reduction option selector 23, an initial parameter estimator 24, source data access 25, a source data simulation system 26, and a source data acquisition system 27.

The processor interrupt 22 allows for operator interrupt during inversion processing to modify parameters and option selections or to alternately train convergence to provide for an appropriate rendition.

The reduction option selector 23 may provide for either or both an initial or an interactive selection of inversion options. For the exemplary command code which is included in Appendix A, a processor interrupt is included in the subroutine ICDSP and a reduction option selector is there also provided by a call to the subroutine SETUP.

The initial parameter estimator 24 may be included to establish initial estimates of fitting parameters for rendering subsequent inversions by successive approximations. Quite accurate initial estimates may be required, especially for applications which involve higher numbers of parameter evaluations. In accordance with the present invention, said initial parameter estimator may include implementing forms of least-squares regression analysis and/or more advanced maximum likelihood estimators. The command code of Appendix A exemplifies an initial parameter estimator as an optional function of the subroutine ICDSP which is alternately implemented for evaluating estimates of coefficient type fitting parameters and/or adjusting parameter estimates by limiting the variable and root selection cycles to only render respective data-point projections in correspondence with a single coordinate axis, and by correspondingly rendering single component ICDS processing or by alternately rendering single component residual displacement processing, with weighting and reduction procedures corresponding to the default or selected options.

In accordance with the present invention, single component ICDS processing is any form of ICDS processing in which the considered data-point projections are limited to a single coordinate axis, said single component ICDS processing being primarily characterized by included representation of respectively rendered composite projection normalizing coefficients.

The source data access 25 may provide access to a representation of source data to be operated upon by the data retrieval system 17 prior to or during said subsequent inversion processing.

The source data simulation system 26 may be included and implemented to generate characteristic forms of simulated data which may be processed to evaluate considered reduction options in order to establish and verify considered options for selected inversion processing prior to rendering corresponding inversions of critical data. In accordance with the present invention, the source data simulation system 26 may also be implemented for rendering initial estimates of fitting parameters by rendering a display of the available data and allowing for renditions of the fitting approximation to be superimposed and visually inspected, while manually or systematically providing alternate fitting parameter estimates.

In addition to data processing operations which may be provided by characteristic ICDS processing systems, more specialized or dedicated systems may be alternately equipped to include a source data acquisition system 27, whereby source data of specific application may be directly collected or generated. For applications which may involve forms of real time data acquisition, both digital and/or analog processing techniques may be implemented in rendering or partially rendering respective data inversions. In accordance with the present invention, for some specific applications, the rendering of certain components of SPD weighting coefficients by analog or digital circuitry, while simultaneously collecting real time data samples, could both improve inversion accuracy and reduce processing time.

Referring now to FIG. 8, in accordance with the present invention, a default inversion specifier 18 is an application adapted user supplied subroutine, a processing device or alternately dedicated system which implements user supplied application-related information to provide default initial estimates and default option selections for rendering subsequent inversion processing. FIG. 8 depicts a default inversion specifier as including processing instruction code 28, which is interfaced with a systems operation and common parameter link 29 to a logic control system 14 for providing command control of functional components including: a reduction type index selector 30, a default iteration option specifier 31, a case index selector 32, a default reduction option specifier 33, a default initial parameter retriever 34, and a return stipulator 35.

The reduction type index selector 30 provides operator interface for the selection of alternate reduction configurations The default iteration option specifier 31 specifies default selections for the desired number of significant figures, the number of consecutive iteration cycles, the number of integration samples, the variability evaluation integration bounds, and the system computational limits.

The case index selector 32 provides access to respective configuration information.

The default reduction option specifier 33 stipulates the default configuration for adjustment parameter array sizing, parameter evaluation designating, variable cycling, and provides for derivative verification. Said default reduction option specifier also specifies default option selections for rendering variability, weighting, and slope handling.

The default initial parameter retriever 34 provides access to default values for initial parameter estimates.

The return stipulator 35 transfers the logic sequence control back to the instructions of the ICDS system process manager.

Now referring to FIG. 9, in accordance with the present invention, an ICDS data processor 20 is a data processor which provides means for accessing and processing information whereby fitting approximations may be generated in correspondence with data-point projections, said data-point projections being considered in correspondence with ICDS.

FIG. 9 depicts an exemplary ICDS data processor as including processing instruction code 36, which is interfaced by a systems operation and common parameter link 37 to a logic control system 14 for providing command control of functional components, including: a process initializer 38, an iteration sequencer 39, a variable cycle generator 40, a root cycle generator 41, an ICDS root variable evaluator 42, a weighting coefficient generator 43, a data-point projection generator 44, an adjustment derivative generator 45, a cycle limiter 46, an equation assembler 47, an inversion estimation generator 48 a convergence training option selector 49, and a return stipulator 50.

The process initializer 38 allocates representation of parameters, provides reduction option selection, and provides selected option verification and/or alteration.

The iteration sequencer 39 sets and resets iteration parameters, validates reduction, normalizes estimates, indicates reduction selection, and initiates iteration. Prior to each initiation the iteration sequencer may check for interrupt. Upon encountering interrupt, the iteration sequencer may service the interrupt and resume iteration or transfer the logic sequencing along with the interrupt instructions back to the process initializer 38.

The variable cycle generator 40 provides for cycling through each of the considered independent variable degrees of freedom and correspondingly provides for the summing of addends over one or more variable degrees of freedom during said data processing, said addends being generated in correspondence with respective ICDS.

The root cycle generator 41 provides for cycling through one or more considered root solutions, corresponding to each simultaneously considered variable degree of freedom, and correspondingly provides for the summing of addends over one or more root solutions for one or more simultaneously considered variable degrees of freedom during said data processing, said addends being generated in correspondence with respective ICDS. In accordance with the present invention, the root cycle generator need not necessarily be included if projected root solution elements are generated in one to one correspondence with respective data-point measurements. In accordance with the present invention, said projected root solution elements should be rendered in one to one correspondence with respective said data-point measurements, unless roots of multiple-valued functions are sufficiently grouped to not clearly establish said one to one correspondence.

An ICDS root variable evaluator 42 is an application adapted user supplied subroutine, a processing device or alternately dedicated system which establishes functional relationships and inverse function relationships for evaluating root solution elements of respective ICDS. At least one form for rendering a root variable evaluator is exemplified by the rendered subroutine FUN, which is included in Appendix A.

The weighting coefficient generator 43 is implemented to provide the option for weighting addends in correspondence with a plurality of ICDS for rendering at least one form of ICDS processing. At least one form for rendering instruction code for providing a selection of weighting coefficients is exemplified by the rendered subroutine SPDW, which is included in Appendix A. (Note: the concept of composite weight factors, in accordance with the present invention, was still unknown when when the subroutine SPDW was written. Consequently, the subroutine SPDW does not provide for the selection of composite weight factors. However, such addition could readily be included in accordance with the present invention.)

The data-point projection generator 44 provides for the evaluating or parametric representing of data-point projections in correspondence with each of the respectively considered ICDS, and correspondingly provides for implementing the option of rendering sums of weighted said data-point projections in correspondence with one or more considered variable degrees of freedom and each respectively determined and correspondingly included root solution.

The adjustment derivative generator 45 is an application adapted user supplied subroutine, a processing device, or an alternately dedicated system which implements user supplied application-related information to provide function derivatives taken with respect to adjustment parameters for implementing subsequent inversion processing. At least one form for rendering specified function derivatives with respect to adjustment parameters is exemplified by the rendered subroutine DXDP which is included in Appendix A.

The optional cycle limiter 46 provides the option of limiting the reduction cycles to less than the total number of degrees of freedom for implementing options of rendering reduced or single component ICDS processing in accordance with the present invention, or for alternately implementing the reduction processing to provide typical forms, including simple least-squares analysis, and single component residual displacement processing.

The equation assembler 47 renders provided data along with function definitions for implementing data inversions.

In accordance with the present invention, the rendering of data inversions may be implemented by alternate optimizing methods. For example, the processing instruction code of the ICDSP subroutine, as included in Appendix A, provides for the evaluating of corrections to successive estimates of included fitting parameters as an example of a method for optimizing likelihood for said rendering data inversions. Other optimization methods and techniques may include rendering gradient search, solving systems of equations, inverting matrices, rendering global or local search techniques, or implementing any one of several available numeric optimization packages.

The inversion estimation generator 48 implements at least one optimizing method for rendering data inversions. In accordance with the present invention, it may also include means for rendering alternate reduction options, such as:

1. rendering inversions with disregard for measurement bias,
2. rendering inversions which represent adjustment parameter removal of measurement bias from maximum likelihood estimating,
3. rendering inversions which represent bias as evaluated in correspondence with close proximity offset estimates,
4. rendering inversions which represent first order bias evaluations being evaluated in correspondence with close proximity offset estimates.

The convergence training option selector 49 allows for parameter modification and repeat processing in order to train specific convergence in correspondence with known or considered restraints. In accordance with the present invention, the convergence training option selector may alternately provide access to a characteristic form simulation generator for rendering characteristic dispersion simulations.

The return stipulator 50 transfers the logic sequence control back to the instructions of the ICDS system process manager.

Referring to FIG. 10, the processor interrupt 22 allows for operator interrupt during inversion processing to modify parameters and option selections.

FIG. 10 depicts an exemplary processor interrupt and a respective interrupt service as including processing instruction code 51 which is interfaced by a systems operation and common parameter link 52 to a logic control system 14 for providing command control of functional components including: an initial selector 53, an interrupt inkey retriever 54, an operator interrupt server 55, a reduction option selector 23, a parameter modification server 56, and a parameter initializing server 57.

The initial selector 53 displays the current reduction setup including initial estimates and current option selections and provides a variety of selection choices, such as portraying the inversion as rendered by the initial estimates, implementing an initial parameter estimator for generating alternate initial estimates, marking selected initial estimates as constant or rendered for evaluation, adjusting precision or standard deviation reference estimates, entering or modifying initial estimate values, continuing execution of the inversion, or aborting execution.

The interrupt inkey retriever 54 retrieves stroke instructions from the keyboard.

The operator interrupt server 55 responds to stroke instructions by resetting the iteration count and/or channeling command to the reduction option selector 23, the parameter modification server 56, or the parameter initializing server 57 and/or then continuing, aborting, or transferring control back to the initial selector 53.

The parameter modification server 56 provides for parameter modifications or updates and/or renders parameters to be evaluated or held constant during the pending reduction.

The parameter initializing server 57 provides for updating estimates, resetting initial estimates, modifying reduction options, and/or continuing reduction processing.

Referring to FIG. 11, the reduction option selector 23 provides for interactive option selection both prior to and during inversion processing. FIG. 11 depicts an exemplary reduction option selector as including processing instruction code 58, which is interfaced by a systems operation and common parameter link 59 to a logic control system 14 for providing command control of functional components including: an option selection display generator 60, a modification option selector 61, an option select sequencer 62, a coordinate corresponding measurement variability selector 63, a root element variability selector 64, a weighting coefficient selector 65, an offset and measurement bias correction selector 66, an integration bounds selector 67, a sampling interval selector 68, a significant figure selector 69, a cycle limit selector 70, and a slope-handling exponential root selector 71.

The option selection display generator 60 provides a display of options for interactive selection.

The modification option selector 61 provides a query for requesting modifications.

The option select sequencer 62 provides for cycling through specific modification queries.

The coordinate corresponding measurement variability selector 63 provides for selecting a form for rendering measurement variability. Selections for rendering measurement variability which are provided by the exemplary command code of Appendix A include:
1. rendering simple linear dispersion coupling,
2. generating representation for bi-coupled dispersions as a function of associated probability density.
3. including root element measurement variances as a function of associated probability density.
4. directly including root element measurement variance along with rendered dispersions.
5. excluding root element measurement variance from rendered dispersions.
6. directly equating variability to respective variance,
7. setting variability to effective variance,
8. setting variability for nonlinear effective variance,
9. setting variability to zero,
10. representing variability as one.

respective dispersion coupling being based upon the data-related order of antecedent measurements as supplied along with accompanying data. (Item numbering in this disclosure is not intended to correspond to the option selections provided by the command code of Appendix A.)

The root element variability selector 64, provides for selecting a form for rendering root element variability. Selections for rendering said root element variability which are provided by the exemplary command code of Appendix A include:
1. default settings which correspond to the complement of selected measurement variability,
2. the complement of simple linearly-related measurement variability,
3. the complement of bi-coupled measurement variability,
4. the complement of simple linearly-related measurement variance,
5. the complement of bi-coupled measurement variance,
6. the root element measurement variability,
7. the root element variance,
8. linear effective variability,
9. nonlinear effective variability.

The weighting coefficient selector 65 provides for selecting a form for rendering SPD weighting coefficients. Selections for rendering SPD weighting coefficients which are provided by the exemplary command code of Appendix A include:
1. no weighting.
2. simple slope-handling weighting,
3. weighting on selected root element variability,
4. simple slope-handling weighting being divided by selected root element variability,
5. simple slope-handling weighting being divided by mean normalized variability with the selected root element variability isolated,
6. simple slope-handling weighting being divided by coordinate corresponding mean normalized variability without selected root element variability isolation,
7. simple slope-handling weighting with variables normalized on respective variability,
8. weighting on selected root element variability with variables normalized on respective variability,
9. simple slope-handling weighting being divided by selected root element variability, with variables normalized on respective variability,
10. simple slope-handling weighting being divided by mean normalized variability, with the selected root element variability isolated with variables normalized on respective variability, 11. simple slope-handling weighting being divided by coordinate corresponding mean normalized variability, without selected root element variability isolation, with variables normalized on respective variability,
12. simple slope-handling weighting with variables normalized on respective variability with heterogeneous enhancements,
13. weighting on selected root element variability, with variables normalized on respective variability with heterogeneous enhancements,
14. simple slope-handling weighting being divided by selected root element variability with variables normalized on respective variability with heterogeneous enhancements,
15. simple slope-handling weighting being divided by mean normalized variability with the selected root element variability isolated with variables normalized on respective variability with heterogeneous enhancements.
16. simple slope-handling weighting being divided by coordinate corresponding mean normalized variability without selected root element variability isolation, with variables normalized on respective variability with heterogeneous enhancements.

The respectively rendered form for coordinate corresponding measurement variability is determined by the coordinate corresponding measurement variability selector 63 and the respectively rendered form for the root element variability. The offset and measurement bias correction selector 66, as rendered in exemplary command code of Appendix A, provides for either ignoring correcting for offset and measurement bias or including bias and offset correction adjustments in the likelihood estimator.

The integration bounds selector 67, as rendered in exemplary command code of Appendix A, provides an option for setting the limits of digital integrations as implemented in generating approximations for coupled dispersion variability.

The sampling interval selector 68 as rendered in exemplary command code of Appendix A provides an option for setting the number of interval samples to be provided for digital integrating of the coupled dispersion accommodating variability.

A significant figure selector 69, as rendered in exemplary command code of Appendix A, provides an option for setting the desired number of significant figures to be considered in rendering convergence.

A cycle limit selector 70, as rendered in exemplary command code of Appendix A, provides an option for setting the number of successive iteration cycles to be allowed between improved iteration estimates.

A slope-handling exponential root selector 71, as rendered in the exemplary command code of Appendix A, provides an option for setting the slope-handling exponential root. Said root should normally be set equal to the number of simultaneously considered degrees of freedom; however, in accordance with the present invention variations in said root may be alternately considered and correspondingly implemented in rendering respective form for normalizing coefficients.

Referring to FIG. 12, in accordance with the present invention, SPD weighting is a form of addend weighting which is implemented in rendering data inversions in correspondence with ICDS. Said SPD weighting is assumed to correspond in direct proportion to the ratio of the square of at least some form of addend normalizing coefficients divided by mean values for at least some form of respectively normalized variability.

In accordance with the preferred embodiment of the present invention, SPD weighting may be rendered in the form of complementary weighting coefficients and/or alternately rendered in proportion to the square of at least one form of slope-handling coefficients.

In accordance with the present invention, a SPD weighting coefficient generator provides means for the generating of at least one form of the SPD weighting coefficient. FIG. 12 depicts an exemplary SPD weighting coefficient generator 43 as including processing instruction code 72 which is interfaced by a systems operation and common parameter link 73 to a logic control system 14 for providing command control of functional components including: a weight selection designator 74, a dispersion-accommodating variability generator 75, a squared slope-handling coefficient generator 76, a heterogeneous variability enhancement generator 77, an inverse variability normalizer 78, a root element inverse variability normalizer 79, a root element variability isolator 80, and a weight normalizer 81.

The weight selection designator 74 directs the weighting coefficient generator to render a selected form for weighting coefficients.

The dispersion-accommodating variability generator 75 provides for the generating of dispersion-accommodating variability in accordance with the present invention and may also provide for the selecting and generating of one or more alternate choices for the rendering of measurement variability.

The squared slope-handling coefficient generator 76 renders squared slope-handling coefficients as considered in correspondence with each considered inversion-conforming data set, said squared slope-handling coefficients being rendered or approximated in accordance with the present invention, as equal to or in proportion to the inverse of a root of the square of the product of differential change of the determined element variable taken with respect to orthogonal element variable(s) and evaluated in correspondence with the respective measurement(s) or provided measure(s) of said orthogonal element variable(s) of said inversion-conforming data set.

The heterogeneous variability enhancement generator 77 provides option and means to generate and implement coefficients to correct for the effects of functional variations in variability.

The inverse variability normalizer 78 provides for implementing coordinate normalization in the generating of normalizing coefficients by dividing included variables by their respective variability. For applications which may simply render variability as represented by the square of precision uncertainty, said inverse variability normalizer may comprise a Discriminate Reduction Data Processor to implement Discriminate Reduction Data Processing for generating variant precision coordinate normalizing proportions, as considered with respect to inversions which render minimum values for parametric expressions, which may be assumed to represent sums of squares of coordinate-normalized datum variances (Ref. U.S. Pat. Nos. 5,619,432; 5.652,713; and 5,884,245.)

The root element inverse variability normalizer 79 provides for including the slope-handling coefficient multiplied by the inverse of selected root element variability to render respective weighting.

The root element variability isolator 80 provides for the isolating and rendering of included root element variability as a complement of orthogonal measurement variabilities while rendering respective forms for complementary weighting coefficients.

The weight normalizer 81 provides for generating a mean normalized variability as a normalizing divisor and respectively normalizing considered normalizing coefficients to render form for correspondingly specified weighting coefficients.

Referring to FIG. 13, in accordance with the present invention, a measure of the variability of an individual measurement event may be referred to as its variance; however, when the outcome of said measurement event is dependent upon the dispersion of prior (or antecedent) measurement events, the variability of said outcome may be assumed to reflect the pertinent antecedent measurement dispersions. In accordance with the present invention, the variability in the outcome of a measurement event will include any considered pertinent antecedent measurement dispersions. Alternately, in accordance with the present invention, if and when the outcome of a measurement event can be considered to be independent of prior measurements, said outcome may be considered as statistically independent of antecedent measurement dispersions, and the corresponding variability of such statistically independent outcomes may be considered as equivalent to the respective measurement variance. In accordance with the present invention, a measurement event may be either dependent upon, or independent of antecedent measurement dispersions. In accordance with the present invention, a dispersion-accommodating variability generator is equipped to provide representation of measurement outcome variability to include any considered pertinent antecedent measurement dispersions, with implication that if no antecedent measurement dispersions are to be included or considered pertinent, said measurement outcome variability will be alternately rendered to represent only the considered variations in the respective measurements.

FIG. 13 depicts a dispersion-accommodating variability generator 75 as including processing instruction code 82, which is interfaced by a systems operation and common parameter link 83 to a logic control system 14 for providing command control of functional components including: an option designator 84, a precision estimator 85, a variable cycle generator 86, an antecedent measurement designator 87, a bi-coupled dispersion cycle generator 88, a linear dispersion-accommodating variability generator 89, a bi-coupled variability integrator 90, an alternate variability generator 91, and a root element variability generator 92.

The option designator 84 coordinates the rendering of considered variability in correspondence with represented precision, specified approximative form, and respectively selected options.

The precision estimator 85 provides for rendering representation of measurement precision in correspondence with coordinate locations.

The variable cycle generator 86 provides for cycling through elements of ICDS while generating respective component measurement variability. In accordance with the present invention, it may also provide for rendering an additional cycle for implementing the generating of the determined root solution element variability.

The antecedent measurement designator 87 coordinates the rendering of dispersion-accommodating variability in correspondence with the respective order of consecutively dependent measurements.

The bi-coupled dispersion cycle generator 88 provides for cycling through orthogonal components of dispersion, for including orthogonal variable dispersions in generating dispersion-accommodating variabilities and complements of orthogonal variabilities.

The linear dispersion-accommodating variability generator 89 provides the option of generating simple linear dispersion-accommodating variability.

The bi-coupled variability integrator 90 provides for the integration of bi-coupled components of dispersion-accommodating variability and bi-coupled complements of orthogonal measurement variability.

The alternate variability generator 91 provides for rendering alternate options for replacing or representing forms of variability.

The root element variability generator 92 provides for rendering root solution element variability of a specified form.

Referring now to now to FIG. 14, the convergence training option selector 49 allows for parameter modification and repeat processing in order to train specific convergence in correspondence with known or considered restraints.

Also, in accordance with the present invention, said convergence training option selector may be alternately implemented to render corrections to considered data inversions in correspondence with characteristic dispersion models, including previously mentioned characteristic form iterations and renditions of alternate inversions correction techniques being related to characterized dispersions.

FIG. 14 depicts an example of a convergence training option selector 49 as including processing instruction code 93, which is interfaced by a systems operation and common parameter link 94 to a logic control system 14 for providing command control of functional components including, a repeat processing response server 95, a return stipulator 50, a reduction option selector 23, a parameter modification server 56, and the ICDS data processor 20. The repeat processing response server 95 provides response to operator request for repeat data processing. It also provides access to the reduction option selector 23 and parameter modification server 56 to allow selection of modifications for repeat processing.

In addition, the convergence training option selector 49 may also provide for the rendering of inversion correction techniques being related to characterized dispersions by including interface to: a corrected inversion initializer 96, a convergence evaluator 97, an optimal estimate generator 98, a characteristic dispersion generator 99, and a characteristic data set simulation system 100.

In accordance with the present invention, the herein considered inversion correction technique being related to characterized dispersions is represented by repetitive inversions of simulated data of characteristic form which are processed to generate inversion parameters equal to or nearly equal to those obtained by similarly processing actual data. Said simulated data of characteristic form is generated by adding characteristic representations of error deviations to successively corrected inversion representations. Said corrected inversion representations are rendered in correspondence with a considered data inversion by:

1. representing an initial estimate of said correction in correspondence with a respectively considered approximating relationship of an appropriate parametric approximative form,
2. rendering said simulations by combining successive estimates of said correction with a characteristic representation of error deviations.
3. rendering inversions of said successive simulations by implementing the same processing techniques for successively processing said simulations that were used in processing to generate said considered data inversion, 4. rendering said successive estimates of said correction by combining prior said estimates with said considered data inversion and with respective inversions of said successive simulations, and
5. implementing and effecting at least some form of successive estimate approximating and evaluating so as to render inversions of said successive simulations to more closely replicate said considered data inversion.

In accordance with the present invention, inversions of said successive simulations may be verified as closely replicating said considered data inversion by direct comparison of said considered data inversion with successive inversions of said successive simulations, by alternate approximation and evaluation methods, such as comparing successive approximations of said corrections, or by a combination of various evaluating techniques. For example, an alternately defined sequence of steps for rendering corrected inversions as related to characterized dispersions and characteristic form iterations has been disclosed in a previous invention of the present inventor to account for errors related to higher order nonlinear affects, said characteristic form iterations being rendered by a data processing system configured for implementing at least one form of inverse deviation variation weighting for representing the weight of respective function related deviations, wherein initial estimates are rendered as results from considered or preliminary data inversions. In accordance with U.S. Pat. No. 6,181,976 B1, considered characteristic form iterations would include the following steps:
1. storing initial estimates to provide both initial estimates and current approximations,
2. utilizing the represented current approximations to generate successive data simulations as characterized by the represented fitting function and a represented error distribution of assumed characteristic form.
3. storing the current approximations to represent stored values for previous approximations,
4. generating simulated estimates by processing said successive data simulations utilizing the same processing techniques that were implemented in generating the initial estimates,
5. computing new values for the current approximations as represented by the original initial estimates minus the simulated estimates plus the stored values for the previous approximations,
6. checking convergence by comparing the current approximations to said stored values for previous approximations, and
7. repeating steps 2 through 6 until a convergence criteria is satisfied.

In accordance with the present invention, said initial estimates may be represented by said considered data inversion or may be alternately rendered in consideration of said data inversion. Also, in accordance with the present invention, alternate techniques may be implemented in order to check for respective convergence. For example, by comparing inversions of successive simulations to the originally considered inversion, step number 3 (i.e. storing the current approximations to represent stored values for previous approximations) may be omitted. Alternately, it may be useful to store previous renditions of successive estimates and/or simulations in order to further enhance the rendering of successive estimates.

Still referring to FIG. 14, the corrected inversion initializer 96 allows the operator to select implementing corrections. It also provides for storing the originally rendered inversion parameters and allocating storage for retaining current correction estimates, initializing the allocated reduction storage, and providing initial estimates to the current inversion parameters storage locations.

The convergence evaluator 97 compares subsequently rendered reduction storage (as initialized or rendered with recent inversion results) to previously stored original inversion parameter values and either terminates the iteration and transfers operations back to the repeat processing response server 95 or transfers control of processing to the optimal estimate generator 98.

The optimal estimate generator 98 generates new estimates for the current inversion parameters as represented by the originally rendered inversion parameters plus the inversion parameters which are stored in the current inversion parameters location minus said most recent inversion results.

The characteristic dispersion generator 99 provides or generates coordinate related error deviations and respectively associated variability, as would be characteristic of the currently considered data.

The characteristic data set simulation system 100 generates a set of function-conforming data points, which correspond to said current correction for inversion parameters, and said simulation system also generates a characteristic data simulation by including said coordinate related error deviations.

The characteristic data simulation is then rendered as a data inversion by operations of the ICDS data processor 20, and control is returned to the convergence evaluator 97, where the iteration convergence criteria is evaluated for each successive approximation.

Referring now to FIG. 15, with reference to FIGS. 16 through 27, rendering processing to provide for the evaluation of unquantifiable observations by enhancements, which include two dimensional segment inversions, requires processing which will sort observation samples to allow for the sequential representation (within the assumed limits of uncertainty) of single independent variable data at observation points corresponding to assumed constant values for all associated orthogonal independent variable sampling, with the assumption that sampling of independent observations be considered to result from random representations of a dependent variable. With such sorting and corresponding assumptions, with respect to the randomness of sampling, the represented sequence of said single independent variable data should represent proportional rendition of the unquantified dependent observations, with offsets corresponding in similar proportion to a respective extreme of said unquantified observations. In accordance with the present invention, exemplary steps for processing unquantifiable observation by two dimensional segment inversions, as demonstrated by the QBASIC instruction code of FIGS. 16 through 27, can be categorized as follows: initiating data processing 114, preparing data for processing 115, designating data segments 116, retrieving data 117, sequencing data 118, designating data segments 119, preparing for the sequencing of multivariate segments 120, implementing the sequencing of multivariate segments 121, designating sub-segments within multivariate sequences 122, quantifying dependent observations over sub-segments 123, processing quantified data 124, preparing to pass through iteration cycles 125, establishing and solving matrix equations 126, adjusting matrix equation output for successive approximations 127, responding to interactive option interrupts 128, providing output and exit or repeating cycle for each sub-segment 129, FIG. 15 depicts a sequence of steps, suggested in accordance with the present invention, for abstracting two dimensional data segments and rendering respective processing.

Now considering initiating data processing 114, with reference to FIG. 16, FIG. 16 provides a simplified but effective rendition of a main computer program for initiating data processing and rendering computer control for quantifying dependent observations and processing the resulting quantified representation over the encountered two dimensional data segments. The program of FIG. 16 includes preparing data for processing 115, quantifying dependent observations 123, and processing quantified data 124.

Referring further to FIG. 15, with reference to FIG. 17, in consideration of preparing data 3 for processing 115, the QBASIC command code of FIG. 17 prepares independent data samples for quantifying dependent observations by designating data segments 116, preparing for multivariate sequencing 122, and designating segments within multivariate sequences 122. The process of designating data segments 116, as illustrated by FIG. 18, for example, includes the retrieval of data 117, the sequencing of data 118, and the designating of segments 119 by a general search of observation samples to establish sets of samples for which certain variables may be considered as being held constant.

Referring now to FIGS. 19 and 20, in order to render any form of data reduction, there must be data. It is assumed that those who might be implementing data reductions in accordance with the present invention will indeed have access to at least some form of data. If not, also in accordance with the present invention, simulated data my be implemented. In the rendition of the exemplary QBASIC instruction code, as presented in FIGS. 16 through 27, the retrieving data 117, as presented in FIG. 15, is replaced by simulation of data, as presented for two dimensions in FIG. 19, and for three dimensions in FIG. 20. The sequencing data 118 and the segmenting data 119 are respectively exemplified in FIGS. 21 and 22.

Referring back to FIG. 15, preparation for the sequencing of multivariate segments 120 is afforded by the QBASIC command code of FIG. 23, wherein all elements within each segment are represented in corresponding integer format corresponding to a 10 base number system, with each column in the integer representation corresponding to sampling for a different orthogonal variable. The resulting integers are then sequenced to extract segments over which samples for all but one independent variable are assumed to be represented by the same constant value. For simplicity, the code of FIG. 23 utilizes a 10 base number system, which allows only for 9 segments per variable, with the zero being alternately considered to apply to null or unsatisfactory segments. In accordance with the present invention, sorting need not be limited to a small number of segments per independent variable. Sequencing 121 and segmenting 122 of the multivariate segments, as provided in this example, are also rendered by the command code of FIGS. 21 and 22.

With reference now to FIG. 24, quantifying dependent observations over sub-sections 123 may be provided by the exemplary command code of FIG. 24, wherein the dependent observations are represented by the sequence of variable data within the respective segment. Note that, thus far, the discussion of FIG. 15 has been restricted to quantification of a dependent variable representation. In accordance with the present invention, by replacing the quantified representation of each respective data segment (with or without final sequencing) with an actual data representation, the same concepts and processing techniques can be and are to be considered in accordance with the present invention to be applicable to the processing of general forms of multivariate data, with or without unquantified dependent variables, and with or without errors-in-variables representation.

Referring back to FIG. 15 in consideration of the command code of FIGS. 25 through 27, the processing of quantified data 124, as provided by the exemplary command code presented in FIG. 25, includes preparing to pass through iteration cycles 125, establishing and solving matrix equations 126, adjusting matrix equation output for successive approximations 127, responding to interactive option interrupts 128, and providing output and exit or repeating cycle for each sub-segment 129.

Preparing to pass through iteration cycles 125, in the exemplary command code of FIG. 25, is rendered by accessing shared arrays, dimensioning matrix equation arrays, and calling a subroutine for rendering matrix elements and providing appropriate weighting (The subroutine EQN, as rendered in FIG. 26 provides an example for rendering a form of composite weighting and respective matrix elements as considered in Examples 10 and 13.) Establishing and solving matrix equations 126 includes rendering array elements by a call to said subroutine EQN. Solving the matrix equations is provided by a call to the subroutine SOLVE, which is provided as a part of the command code of Appendix A. The subroutine incorporates another subroutine, DETER to evaluate the respective determinates. The subroutine is also provided as a part of the command code of Appendix A. Adjusting matrix equation output for successive approximations is provided within the command code of FIG. 25 by adding corrections to previously estimated approximating parameters. Responding to interactive option interrupts 128 by a call to the command code presented in FIG. 27 allows interactive selection of a form of composite weighting or exclusion of deviation weighting and a choice of implementing inversion conforming data sets processing or processing of single component residuals. It is assumed that the error in the simulated data is negligible or constant and is, therefore, not included in the representation of the respective composite weighting as provided in the establishment of the matrix elements presented in FIG. 26.

Now referring to FIG. 28 with reference to FIG. 1, because of the lack of orthogonality of most functions, as related to adjustment parameters, the processing of data associated with more than two degrees of freedom, especially when errors are present in more than a single degree of freedom, is of concern. Findings of the present inventor establish that, even with improved weighting of deviations, convergence when working with more than two degrees of freedom, even as supported by accurate initial estimates, may pose a problem. Oft times processing may be simplified by rendering maximum likelihood as a series of bivariate processing, which is consistent with the order in which data samples are taken and the respective inter-relationship between represented variables. Unfortunately, an appropriately ordered inter-relationship may not always exist, and then, it becomes necessary to simultaneously evaluate adjustment parameters with respect to more than two degrees of freedom. In accordance with the present invention, provided random representation of the dependent variable can be assumed. Multivariate reductions may sometimes be accomplished by implementing forms including two dimensional data segment inversions. FIG. 28 represents a modified version of the maximum likelihood estimator which is illustrated in FIG. 1, comprising means to establish two dimensional segmentation 130 and means to establish evaluations for nested parameters and fixed variable function representations, update processing requirements, and check for completion 131. Including determined values for nested parameters should at least reduce the reduction to a linear combination of functions. Then, by representing respective deviation coefficients in terms of determined adjustment parameters, which have been previously evaluated by means of said two dimensional segment inversions, and representing appropriately derived component weighting, an appropriate likelihood estimate for the respective linear coefficients may be substantiated.

Referring now to the attached Appendices A and B, Appendix A provides an example of command code for rendering forms of ICDS processing as originally conceived and described in the pending patent disclosure Ser. No. 10/347,279. It does not establish composite weight factors in accordance with the present invention, but it does provide useful examples of configurations and subroutines which can be implemented in support of ICDS processing.

Appendix A provides for rendering forms of ICDS processing by means which include implementing digital circuitry. Appendix B presents sample listings which represent simulated data-point sets that may be transferred to respective system accessible data files to demonstrate examples of inversion by application of said command code of Appendix A. Said Appendix B includes listings for rendering all or any combination of the following simulated data files:

1. \InvDat\Linear1.fit, which corresponds to evaluated points of the three-dimensional linear function, $$x_1 = 2x_2 + 3x_3 - 4 \quad (145)$$

(The provided data of this first linear set is simulated as error-free, and corresponding inversions should provide exact representation of Equation 143 as considered within the computational accuracy of the command code and respective processing system.);

2. \InvDat\Linear2.fit, which corresponds to evaluated points of Equation 145 with random positive and negative values added to the evaluated coordinates to simulate statistically independent error affected data;
3. \InvDat\Linear3.fit, which corresponds to evaluated points of Equation 143 with random positive and negative values successively added and included in subsequently evaluating coordinates to simulate error affected data with antecedent measurement dispersion dependence;
4. \InvDat\Linear4.fit, which corresponds to evaluated points of Equation 145 with determined positive and negative values added to the evaluated coordinates to render simulated data to include uniform symmetrically applied deviations;
5. \InvDat\Linear5.fit, which corresponds to evaluated points of Equation 143 with determined positive and negative values added to the evaluated coordinates, said values corresponding in inverse proportion to the respective term coefficient in order to simulate a symmetrical, non-bias scatter in the provided data points (The provided data of this fifth linear set is simulated to artificially exemplify homogeneous statistically independent, non-skewed, bias-free, error distributions. Respective inversions of this fifth data set by an appropriately implemented ICDS processing system should be able to provide exact representation of Equation 145, as considered within the computational accuracy of the command code and said processing system.);
6. \InvDat\Poly1.fit, which corresponds to evaluated points of the nonlinear function, $$x_1 = 2x_2^2 + 3x_3^3 - 4 \quad (146)$$

(The provided data of this first nonlinear set is simulated as error-free, and corresponding inversions should provide exact representation of Equation 144 as considered within the computational accuracy of the command code and respective processing system.);

7. \InvDat\Poly2.fit, which corresponds to evaluated points of Equation 144 with random positive and negative values added to the evaluated coordinates to simulate nonlinear statistically independent error affected data;
8. \InvDat\Poly3.fit, which corresponds to evaluated points of Equation 144 with random positive and negative values successively added and included in subsequently evaluating coordinates to simulate error affected data with antecedent measurement dispersion dependence;
9. \InvDat\Poly4.fit, which corresponds to evaluated points of Equation 144 with determined positive and negative values added to the evaluated coordinates to render simulated data to include uniform symmetrically applied deviations.

Referring back to Appendix A, in accordance with the present invention, ICDS processing is not necessarily limited to digital reduction processes. ICDS processing systems may represent analog, digital, or even mechanical techniques in rendering component parts, and data retrieval systems may implement either real time data acquisition or retrieval of samples from memory or both real time data acquisition and retrieval of samples from memory for rendering corresponding data inversions.

Appendix A provides exemplary command code for implementing at least one form of ICDS processing. The included GETDATA subroutine provides for the retrieval of data samples from memory by implementing DOS QBASIC commands to:

1. select a data file.
2. retrieve information regarding the number of available data points and the corresponding number of degrees of freedom,
3. allocate digital memory for data storage and manipulation,
4. retrieve information regarding the precision of measurements,
5. retrieve information to establish the order of orthogonal measurements for rendering dispersion-accommodating variability, and
6. retrieve coordinate-related data as provided for the respective inversion.

The START subroutine initiates reduction processing by:

1. providing or requesting selection of a reduction type index,
2. establishing default reduction options,
3. setting evaluation designators to designate which adjustment parameters are to be preset and which are to be evaluated,
4. establishing which data-point projections are to be included in the reduction or whether or not single component residual displacements processing might be alternately implemented,
5. establishing an orthogonal measurement variability selection,
6. establishing the ICDS root element variability selection,
7. establishing a weight factor selection,
8. setting the slope-handling exponential root, and
9. setting default values for initial parameter estimates. In accordance with the present invention, said subroutine START may be alternately supplied or respectively modified to render appropriate initial estimates, designator settings, or default option selections in correspondence with the provided data and preferred approximative form of the data being processed.

The ICDSP subroutine effects the reduction processing by:
1. displaying the selected options and initial estimates and allowing interactive modifications and graphic display,
2. providing for the input of nested parameter estimates,
3. providing for the input or evaluation of coefficient estimates,
4. generating a respective inversion in correspondence with function definitions and derivatives which are rendered for a specific application in accordance with command code of subroutines FUN. DPDX, and DXDX.
5. cycling through interactive modifications and repeating inversions with updated estimates.

The subroutines FUN, DPDX, and DXDX as included in Appendix A render function definitions, inverse function definitions, and respective derivatives as command code for specified inversion applications. In accordance with the present invention, said subroutines FUN, DPDX, and DXDX may be alternately supplied or respectively modified to render appropriate function definitions and derivatives in correspondence with the preferred approximative form of any data being processed.

The PREC subroutine provides local measurement precision as related to a specific reference value which is provided by the GETDATA subroutine. In accordance with the present invention, said subroutine PREC may be alternately supplied or respectively modified to render appropriate homogeneous or heterogeneous precision estimates in correspondence with said reference value for the specific set of data samples being processed.

The LnPROB subroutine provides the log of the dispersion distribution functions for rendering dispersion-accommodating variability. In accordance with the present invention, said subroutine LnPROB may be alternately supplied or respectively modified to render appropriate distribution functions in correspondence with the specific set of data samples being processed.

The VAR subroutine provides for the generating of a variety of alternate forms for rendering variability and complements of variability. It also includes command code for rendering integrations to generate bi-coupled forms of dispersion-accommodating variability and respective variability complements.

The SPDW subroutine provides for the generating of a variety of weighting coefficients including forms of complementary weighting and slope-handling weighting for rendering respective SPD weighting or for rendering weighting in correspondence with alternately considered reduction procedures.

Other subroutines included in Appendix A are rendered, for example, to solve matrix equations, and provide graphic display. The PRINT and SHOWFIT subroutines render simplified output data management to illustrate respective inversion outcome. More elaborate systems may be alternately implemented in accordance with the present invention to respectively implement data inversions for specific or general application and for correspondingly generating data inversion representations being respectively rendered in substance.

The example of command code, as rendered in Appendix A, is not expected to be completely without flaw; however, said command code and included comments, along with other descriptive information which is provided in this disclosure, is sufficient for one skilled in the art to understand and practice the present invention, whether by digital processing entire or by alternate implementation including analog or mechanical apparatus.

Forms of the present invention are not intended to be limited to the preferred or exemplary embodiments described herein. Advantages and applications of the present invention will be understood from the foregoing specification or practice of the invention, and alternate embodiments will be apparent to those skilled in the art to which the invention relates. Various omissions, modifications and changes to the specification or practice of the invention as disclosed herein may be made by one skilled in the art without departing from the true scope and spirit of the invention which is indicated by the following claims.

What is claimed is:

1. A method of using a data processing system for generating a data inversion in correspondence with at least one two dimensional segment comprising two dimensional data-related coordinates represented by a plurality of single-coordinate data samples and respective dependent variable correspondence;

said plurality of single-coordinate data samples being included in a set of coordinate designators comprising characteristic observation measurements selected from an ensemble of variable related observations;

said characteristic observation measurements corresponding to more independent variable coordinates than dependent variable coordinates, said set of coordinate designators comprising at least one subset defined by the criteria that said subset excludes said plurality of single-coordinate data samples and said dependent variable correspondence, and comprises only respective coordinate related observation measurements that correspond to substantially constant variable measurements along respective variable coordinates and are presumed to be orthogonal to respective measurements corresponding to said plurality of single-coordinate data samples;

said substantially constant measurements being associated with said respective variable coordinates and represented by respective coordinate related observation measurements, said respective coordinate related observation measurements being substantially constant as considered within prescribed limits, and said data inversion comprising a representation of evaluated adjustment parameters;

said method comprising:
activating means for accessing processing and representing information, accessing provided data,
designating said at least one two dimensional segment, said designating including identifying said set of coordinate designators in correspondence with the criteria which define said subset;
abstracting said plurality of single-coordinate data samples from said ensemble of variable related observations in correspondence with said at least one two dimensional segment,
establishing a parametric approximative form in correspondence with said plurality of single-coordinate data samples and said dependent variable correspondence, and
effecting at least one form of data manipulation whereby said adjustment parameters are evaluated.

2. A method as claimed in claim 1, wherein said abstracting includes sequencing a representation of multivariate data samples to establish a plurality of two dimensional segments, said sequencing including:

rendering each of a plurality of said observation measurements by coordinate corresponding digits of respective integer representations, wherein each of said digits of each said respective integer corresponds within said prescribed limits and over a respectively considered variable range to said respectively considered variable sample coordinates, and sequencing the respective integer representations of said observation measurements and isolating non-constant single coordinate data samples which correspond to substantially constant measurements associated with respective orthogonal variable coordinates.

3. A method as claimed in claim 1, wherein said dependent variable correspondence is represented by sample measurements included in said set of coordinate designators and excluded from said subset.

4. A method as claimed in claim 1, wherein said data manipulation includes rendering said at least one two dimensional segment in the absence of dependent variable sample measurements, and wherein said dependent variable correspondence is generated in correspondence with a sequenced digital representation of said plurality of single-coordinate data samples.

5. A method as claimed in claim 4, wherein the ensemble of variable related observations represents data samples corresponding to only one dimension, wherein said subset is a null subset, and wherein said data inversion is rendered with respect to two dimensions; one of said two dimensions corresponding to said plurality of single-coordinate data samples, and the other of said two dimensions corresponding to said dependent variable correspondence which is rendered in correspondence with said plurality of single-coordinate data samples.

6. A method as claimed in claim 1, wherein said data manipulation includes implementing proportionate composite weighting and generating said data inversion in correspondence with said implementing, said implementing including establishing said composite weighting in proportion to the respective products of fundamental weight factors multiplied times the squares of corresponding deviation normalization coefficients, said deviation normalization coefficients rendering the products of un-normalized deviations multiplied by said deviation normalization coefficients so as to be substantially characterized by non-skewed homogeneous uncertainty distributions, said fundamental weight factors being established in correspondence with normalized function deviations comprising the products of said un-normalized deviations multiplied by the respective deviation normalization coefficients;

said deviation normalization coefficients being considered as constant during the rendition of representation for the respective fundamental weight factors;

said data manipulation including optimizing said parametric approximative form in correspondence with a sum of addends, and said addends being established as represented by the squares of said un-normalized deviations being rendered to include said proportionate composite weighting, wherein successive approximations for said proportionate composite weighting are held constant during said optimizing.

7. A method as claimed in claim 6, wherein said un-normalized deviations are data-point projections and wherein said data manipulation includes effectuating at least one form of inversion-conforming data sets processing.

8. A method of using a data processing system for generating a data inversion in correspondence with at least one set of coordinate related measurements and a plurality of composite weight factors, said at least one set of coordinate related measurements comprising a plurality of single-coordinate data samples, said composite weight factors comprising products of fundamental weight factors multiplied times the squares of respective deviation normalization coefficients, said deviation normalization coefficients rendering the products of un-normalized deviations multiplied by said deviation normalization coefficients so as to be substantially characterized by non-skewed homogeneous uncertainty distributions, said fundamental weight factors being established in correspondence with normalized function deviations, said normalized function deviations comprising products of said deviation normalization coefficients and the respective un-normalized deviations, said deviation normalization coefficients being evaluated in correspondence with currently considered estimates for adjustment parameters, said fundamental weight factors being related to products of change in said normalized function deviations, said change in normalized function deviations being considered with respect to change in pertinent fundamental variables, and said deviation normalization coefficients being considered as constant during the rendition of said change;

said method comprising:

establishing a parametric approximative form in correspondence with said plurality of single-coordinate data samples and respective dependent variable correspondence;

arranging a digitized representation of the normalized function deviations in a form for computer processing;

arranging a digitized representation of the fundamental weight factors in correspondence with said normalized function deviations in a form for computer processing;

determining said composite weight factors in proportion to the respective products of multiplying the fundamental weight factors times the squares of the corresponding deviation normalization coefficients;

establishing initial estimates for said adjustment parameters;

activating means for accessing processing and representing information; accessing provided data;

evaluating initial estimates for the respective composite weight factors in correspondence with said plurality of single-coordinate data samples, said initial estimates for adjustment parameters, and said parametric approximative form, and effecting at least one form of data manipulation whereby said adjustment parameters are evaluated in correspondence with a plurality of said un-normalized deviations and successive approximations for said composite weight factors, said effecting including representing information whereby at least one form of automated data processing is effectuated in correspondence with said parametric approximative form, and said automated data processing including implementing at least one form of calculus of variation to optimize representation for said adjustment parameters in correspondence with a sum of addends, said composite weight factors being considered as constant during the optimizing steps related to application of said at least one form of calculus of variation;

said addends being established as represented by the squares of said un-normalized deviations being rendered to include proportionate successive estimates for said composite weight factors, and said data inversion comprising optimized representation for said adjustment parameters;

said at least one form of data manipulation excluding:

the generating and implementing of the square of inverse deviation variation weighting to establish the weighting of squared single component residual deviations, the generating and implementing of inverse deviation variation weighting to establish the weighting of single component residual deviations, the generating and implementing of cross term minimizing weight factors to establish the weighting of squared single component residual deviations, the generating and implementing of transformation weight factors to establish the weighting of squared single component residual deviations, and the representing and implementing of precision weighting as rendered in correspondence with forms of discriminate reduction data processing for the weighting of the squares of single component residual deviations.

9. A method as claimed in claim 8, wherein said un-normalized deviations are data-point projections and wherein said automated data processing includes rendering at least one form of inversion-conforming data sets processing;

said data inversion being generated in correspondence with a plurality of said data-point projections;

each of said data-point projections extending from respective data-related coordinates to intersect an approximating relationship;

intersections of said data-point projections with said approximating relationship substantially establishing respective inversion-conforming data sets which comprise projected coordinates for points that conform to a corresponding data inversion at the respective intersections.

10. A method as claimed in claim 8, wherein said data inversion is generated in correspondence with at least one two dimensional segment;

said at least one set of coordinate related measurements comprising an ensemble of variable related observations;

said at least one two dimensional segment comprising two dimensional data-related coordinates represented by said plurality of single-coordinate data samples and the respective dependent variable correspondence;

said plurality of single-coordinate data samples being included in a set of coordinate designators comprising characteristic observation measurements selected from said ensemble of variable related observations;

said characteristic observation measurements corresponding to more independent variable coordinates than dependent variable coordinates;

said set of coordinate designators comprising at least one subset defined by the criteria that said subset excludes said plurality of single-coordinate data samples and said dependent variable correspondence, and comprises only respective coordinate related observation measurements that correspond to substantially constant variable measurements along respective variable coordinates and are presumed to be orthogonal to respective measurements corresponding to said plurality of single-coordinate data samples;

said substantially constant measurements being associated with said respective variable coordinates and represented by the respective coordinate related observation measurements, and the respective coordinate related observation measurements being established to be substantially constant as considered within prescribed limits;

said method comprising:

designating said at least one two dimensional segment, said designating including identifying said set of coordinate designators in correspondence with the criteria defining subset;

abstracting said plurality of single-coordinate data samples from said ensemble of variable related observations in correspondence with said at least one two dimensional segment, and establishing parametric approximative form in correspondence with said plurality of single-coordinate data samples and said dependent variable correspondence.

11. A product comprising a memory device having stored thereon an electronic or electromagnetic representation of a data inversion generated by a data processing system, said data inversion comprising a proportionate representation of an un-quantified dependent variable response associated with a plurality of single-coordinate data samples abstracted from an ensemble of variable related observations, said data inversion being rendered in correspondence with at least one two dimensional segment, said two dimensional segment comprising two dimensional data-related coordinates represented by said plurality of single-coordinate data samples and respective dependent variable correspondence, said plurality of single-coordinate data samples being included in a set of coordinate designators, said set of coordinate designators comprising characteristic observation measurements selected from said ensemble of variable related observations, said set of coordinate designators comprising at least one subset defined by the criteria that said subset excludes said plurality of single-coordinate data samples and said dependent variable correspondence and comprises only coordinate related observation measurements which are presumed to be orthogonal to respective measurements corresponding to said plurality of single-coordinate data samples and coordinate designators which correspond to substantially constant measurements along respective variable coordinates;

said substantially constant measurements being associated with said respective variable coordinates and represented by corresponding coordinate related observation measurements which are substantially constant within prescribed limits, and said data inversion comprising a representation of evaluated adjustment parameters wherein said evaluated adjustment parameters are generated by:

activating means for accessing, processing and representing information, accessing provided data, representing information whereby at least one form of data processing is effectuated in correspondence with a parametric approximative form, and effectuating said at least one form of data processing, said effectuating including:

designating said at least one two dimensional segment, said designating including identifying said set of coordinate designators in correspondence with the criteria defining said subset, abstracting said plurality of single-coordinate data samples from said ensemble of variable related observations in correspondence with said at least one two dimensional segment, establishing said parametric approximative form in correspondence with said plurality of single-coordinate data samples and said dependent variable correspondence, and effecting at least one form of data manipulation whereby said adjustment parameters are evaluated, said effecting including processing said at least one two dimensional segment in the absence of dependent variable sample measurements;

wherein said dependent variable correspondence is generated in correspondence with a sequenced digital representation of said plurality of single-coordinate data samples.

12. A product as claimed in claim 11, wherein said abstracting includes sequencing a representation of multivariate data samples to establish a plurality of two dimensional segments, said sequencing including:

rendering each of a plurality of said observation measurements by coordinate corresponding digits of respective integer representations, wherein each of said digits of each said respective integer corresponds within said prescribed limits and over a respectively considered variable range to said respectively considered variable sample coordinates, and sequencing the respective integer representations of said observation measurements and isolating non-constant single coordinate data samples which correspond to substantially constant measurements associated with respective orthogonal variable coordinates.

13. A product as claimed in claim 11, wherein said ensemble of variable related observations represents data samples corresponding to only one dimension, wherein said subset is a null subset, and wherein said data inversion is rendered with respect to two dimensions; one of said two dimensions corresponding to said plurality of single-coordinate data samples, and the other of said two dimensions corresponding to said dependent variable correspondence which is rendered in correspondence with said plurality of single-coordinate data samples, and said data inversion being rendered with disregard to proportionate offset values corresponding to said un-quantified dependent variable response.

14. A product as claimed in claim 11, wherein said effectuating includes implementing proportionate composite weighting, said data inversion being generated in correspondence with said implementing, and said implementing including establishing said composite weighting in proportion to the respective products of fundamental weight factors being multiplied times the squares of corresponding deviation normalization coefficients;

said deviation normalization coefficients rendering the products of un-normalized deviations multiplied by said deviation normalization coefficients so as to be substantially characterized by non-skewed homogeneous uncertainty distributions;

said fundamental weight factors being established in correspondence with normalized function deviations comprising the products of said un-normalized deviations multiplied by said deviation normalization coefficients;

said deviation normalization coefficients being considered as constant during the rendition of representation for the respective fundamental weight factors; said data manipulation including optimizing said parametric approximative form in correspondence with a sum of addends;

said addends being established as represented by the squares of said un-normalized deviations being rendered to include said proportionate composite weighting, wherein successive approximations for said proportionate composite weighting are held constant during said optimizing.

15. A data processing system comprising means for accessing, processing, and representing information whereby a data representation is generated in correspondence with at least one two dimensional segment comprising two dimensional data-related coordinates represented by a plurality of single-coordinate data samples and respective dependent variable correspondence;

said plurality of single-coordinate data samples being included in a set of coordinate designators comprising characteristic observation measurements selected from an ensemble of variable related observations;

said characteristic observation measurements corresponding to more independent variable coordinates than dependent variable coordinates, said set of coordinate designators comprising at least one subset defined by the criteria that said subset excludes said plurality of single-coordinate data samples and said dependent variable correspondence, and comprises only respective coordinate related observation measurements that correspond to substantially constant variable measurements along respective variable coordinates and are presumed to be orthogonal to respective measurements corresponding to said plurality of single-coordinate data samples, and said substantially constant measurements being associated with said respective variable coordinates and represented by the respective coordinate related observation measurements, the respective coordinate related observation measurements being established to be substantially constant as considered within prescribed limits, and said data representation comprising representation of evaluated adjustment parameters;

wherein said data representation is generated by:

activating the means for said accessing processing and representing information, accessing provided data, designating said at least one two dimensional segment, said designating including identifying said set of coordinate designators in correspondence with criteria related to said subset;

abstracting said plurality of single-coordinate data samples from said ensemble of variable related observations in correspondence with said at least one two dimensional segment, establishing parametric approximative form in correspondence with said plurality of single-coordinate data samples and said dependent variable correspondence, and effecting at least one form of data manipulation whereby said adjustment parameters are evaluated.

16. A data processing system as claimed in claim 15, wherein said abstracting includes sequencing representations of multivariate data samples to establish a plurality of two dimensional segments, said sequencing including:

rendering each of a plurality of said observation measurements by coordinate corresponding digits of respective integer representations wherein each of said digits of each said respective integer corresponds within said prescribed limits and over a respectively considered variable range to said respectively considered variable sample coordinates, and sequencing the respective integer representations of said observation measurements thereby isolating non-constant said single-coordinate data samples which correspond to substantially constant measurements being associated with respective orthogonal variable coordinates;

wherein said prescribed limits are determined by the variable range of the data samples, the characteristic base of the respective integer representations, and the selective designation of the respective two dimensional segments.

17. A data processing system as claimed in claim 15, wherein said included in said set of coordinate designators and excluded from said subset.

18. A data processing system as claimed in claim 15, wherein said data manipulation includes processing said at least one two dimensional segment in the absence of dependent variable sample measurements;

said dependent variable correspondence being generated in correspondence with a sequenced digital representation of said plurality of single-coordinate data samples.

19. A data processing system as claimed in claim 18, wherein the ensemble of variable related observations represents data samples corresponding to only one dimension;

wherein said subset is a null subset;

wherein said data representation is rendered with respect to two dimensions corresponding to said plurality of single-coordinate data samples, and wherein said dependent variable correspondence is rendered in correspondence with said plurality of single-coordinate data samples.

20. A data processing system as claimed in claim 15, wherein said data manipulation includes implementing proportionate composite weighting;

said data representation is generated in correspondence with said implementing;

said implementing includes establishing said composite weighting in proportion to the respective multiplication products of fundamental weight factors times the square of corresponding deviation normalization coefficients;

said deviation normalization coefficients rendering the products of un-normalized deviations multiplied by said deviation normalization coefficients so as to be substantially characterized by non-skewed homogeneous uncertainty distributions;

said fundamental weight factors being established in correspondence with normalized function deviations comprising the products of said un-normalized deviations multiplied by the respective deviation normalization coefficients;

said deviation normalization coefficients being considered as constant during the rendition of representation for the respective fundamental weight factors;

said data manipulation including optimizing said parametric approximative form in correspondence with a sum of addends, and said addends being established as represented by the square of said un-normalized deviations being rendered to include said proportionate composite weighting;

wherein successive approximations for said proportionate composite weighting are held constant during said optimizing.

21. A data processing system as claimed in claim 16 comprising a composite weight factor generator comprising means for rendering composite weighting in correspondence with the multiplication product of the fundamental weight factors times the square of corresponding deviation normalization coefficients;

said fundamental weight factors being proportional to a root of the inverse of the product of derivatives of normalized function deviations taken with respect to pertinent system variables, said root corresponding to the number of said pertinent system variables, and said deviation normalization coefficients being considered as constant during the rendition of said derivatives.

* * * * *